United States Patent
Campbell et al.

(10) Patent No.: US 9,914,084 B2
(45) Date of Patent: *Mar. 13, 2018

(54) FILTER ARRANGEMENTS; COMPONENTS; ASSEMBLIES; AND METHODS

(71) Applicant: DONALDSON COMPANY, INC., Minneapolis, MN (US)

(72) Inventors: Steven Campbell, Lakeville, MN (US); Steven Gieseke, Richfield, MN (US); Andrew L. Albitz, Mulberry, IN (US)

(73) Assignee: Donaldson Company, Inc., Minneapolis, MN (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/441,090

(22) PCT Filed: Nov. 18, 2013

(86) PCT No.: PCT/US2013/070585
§ 371 (c)(1),
(2) Date: May 6, 2015

(87) PCT Pub. No.: WO2014/078796
PCT Pub. Date: May 22, 2014

(65) Prior Publication Data
US 2015/0292448 A1    Oct. 15, 2015

Related U.S. Application Data

(63) Continuation-in-part of application No. 13/833,002, filed on Mar. 15, 2013, now Pat. No. 9,089,804.
(Continued)

(51) Int. Cl.
*B01D 46/24*    (2006.01)
*F02M 35/024*    (2006.01)

(52) U.S. Cl.
CPC ... *B01D 46/2414* (2013.01); *F02M 35/02416* (2013.01); *F02M 35/02483* (2013.01);
(Continued)

(58) Field of Classification Search
CPC ............ B01D 46/2411; B01D 46/2414; B01D 2271/027; B01D 2201/291;
(Continued)

(56) References Cited

U.S. PATENT DOCUMENTS

| 5,484,466 A | 1/1996 | Brown et al. |
| 6,004,366 A | 12/1999 | Engel |

(Continued)

FOREIGN PATENT DOCUMENTS

| DE | 10 2006 054447 | 5/2008 |
| DE | 1020006054447 | 5/2008 |

(Continued)

OTHER PUBLICATIONS

International Search Report and Written Opinion for PCT/US2013/070585 dated May 23, 2014 (23 pages).
(Continued)

*Primary Examiner* — Robert Clemente
(74) *Attorney, Agent, or Firm* — Merchant & Gould P.C.

(57) ABSTRACT

Filter cartridge arrangements, features, and methods of construction are described. Also described are filter assemblies having the filter cartridge installed therein as a removable service component. The filter cartridge generally comprises a media pack having an end with an end piece positioned thereon. The end piece includes an end cap section and a seal support. A seal member is secured in the end cap. Methods of assembly and use are described.

19 Claims, 47 Drawing Sheets

Related U.S. Application Data

(60) Provisional application No. 61/728,091, filed on Nov. 19, 2012.

(52) U.S. Cl.
CPC .. *B01D 2201/291* (2013.01); *B01D 2201/347* (2013.01); *B01D 2265/021* (2013.01); *B01D 2271/025* (2013.01); *B01D 2271/027* (2013.01)

(58) Field of Classification Search
CPC .......... B01D 2201/34; B01D 2201/347; B01D 2265/021; B01D 2271/025; F02M 35/02416; F02M 35/02483
See application file for complete search history.

(56) References Cited

U.S. PATENT DOCUMENTS

| | | | |
|---|---|---|---|
| 6,139,607 | A | 10/2000 | Coulonvauz |
| 6,321,491 | B1 | 11/2001 | DiMauro |
| 7,455,707 | B2 | 11/2008 | Engel et al. |
| 7,658,777 | B2 | 2/2010 | Kopec et al. |
| 7,981,187 | B2 | 7/2011 | Gieseke et al. |
| 9,089,804 | B2 | 7/2015 | Campbell et al. |
| 2003/0184025 | A1 | 10/2003 | Matsuki |
| 2004/0068970 | A1 | 4/2004 | Hasegawa et al. |
| 2004/0084360 | A1 | 5/2004 | Janik |
| 2004/0084361 | A1 | 5/2004 | Janik |
| 2006/0054547 | A1 | 3/2006 | Richmond |
| 2007/0163945 | A1 | 7/2007 | Ehrenberg et al. |
| 2011/0017657 | A1* | 1/2011 | Jokschas ................ B01D 29/21 210/437 |
| 2012/0024771 | A1 | 2/2012 | Abdalla |

FOREIGN PATENT DOCUMENTS

| | | |
|---|---|---|
| EP | 1 354 617 | 10/2002 |
| GB | 2 005 777 | 4/1979 |
| WO | WO 89/01818 | 3/1989 |
| WO | 97/22394 | 6/1997 |
| WO | WO 97/22394 | 6/1997 |
| WO | 2004/041403 | 5/2004 |
| WO | WO 2006/026241 | 8/2005 |
| WO | WO 2006/119414 | 11/2006 |
| WO | WO 2009/014982 | 1/2009 |
| WO | WO 2009/014986 | 1/2009 |
| WO | WO 2009/014988 | 1/2009 |
| WO | WO 2012/116314 | 8/2012 |

OTHER PUBLICATIONS

Exhibit A, Pending Claims of U.S. Appl. No. 14/809,414 dated Jun. 23, 2017.

* cited by examiner

FILTER ARRANGEMENTS; COMPONENTS; ASSEMBLIES; AND METHODS

CROSS REFERENCE TO RELATED APPLICATION

This application is a Continuation-in-Part of International Application No. PCT/US2013/070585, filed Nov. 18, 2013, which claims benefit of U.S. Ser. No. 61/728,091, filed Nov. 19, 2012, and U.S. Ser. No. 13/833,002, filed Mar. 15, 2013, which issued as U.S. Pat. No. 9,089,804. The above referenced application includes, with edits and additions, the disclosure of PCT/US2013/070585 filed Nov. 18, 2013, U.S. Ser. No. 13/833,002 filed Mar. 15, 2013 and U.S. Ser. No. 61/728,091, filed Nov. 19, 2012. The complete disclosures of PCT/US2013/070585, U.S. Ser. No. 13/833,002 and U.S. Ser. No. 61/728,091 are incorporated herein by reference. To the extent appropriate, a claim of priority is made to PCT/US2013/070585, 61/728,091 and Ser. No. 13/833,002.

FIELD OF THE DISCLOSURE

The present disclosure relates to filter assemblies. In particularly concerns filter cartridges and features that are usable as service parts in filter assemblies, such as air (gas) cleaner assemblies. In certain specific examples, the filter cartridges include an end cap or end piece arrangement comprising a performed seal member non-removably secured in place on, and typically molded-in-place on, an end piece; the end piece having a radial seal support thereon.

BACKGROUND

A variety of filter assemblies are known in which a serviceable filter cartridge is positioned within a filter housing. By the term "serviceable", in this context, it is meant that the filter cartridge is a service component that is installed in the housing, and throughout the lifetime of the equipment involved, is at various times, removed and refurbished or replaced. Examples of such assemblies include, for example, air cleaner assemblies used to filter engine intake air for internal combustion engines. Such assemblies are used, for example, on vehicles and other equipment.

The serviceable filter cartridges are provided with a housing seal arrangement thereon. A housing seal arrangement is an arrangement that forms a releasable seal with an appropriate portion of a housing, when the serviceable filter cartridge is installed for use.

In general, improvements in filter cartridges with respect to end cap construction and/or the housing seal arrangement are sought. Improved arrangements and processes for assembly are described herein.

SUMMARY

According to an aspect of the present disclosure, a filter cartridge is provided. The filter cartridge can be configured, for example, as a gas (air) filter cartridge, although the principles can be applied in other applications.

In a typical application, the filter cartridge comprises a filter media pack. Typically the media pack is positioned surrounding and defining an open filter interior, although alternatives are possible. Such a media pack typically extends between first and second media pack ends. The media pack may include pleated media, but alternatives are possible.

The cartridge includes an end piece or end cap having a central gas flow aperture therethrough. The end piece is typically molded-in-place on an end of the media pack. The typical end piece comprises an end cap section and a seal support section. The end cap section and seal support section are typically formed integral with one another, for example molded from a moldable material. The seal support section generally projects away from the media pack. In some applications the seal support defines a seal support wall that slants radially (i.e. toward or away from a central axis) as it extends away from the end cap section, to define a seal recess.

A housing seal member is secured on the open end piece, for example within a seal recess (when a seal recess is present) and configured to form a releasable, radially directed, seal with a housing component, when the filter cartridge is installed for use.

The present disclosure also relates to preferred seal arrangements, methods of manufacture and assembly, and related cartridge features and filter assemblies.

As will be apparent from the following, there is no specific requirement that a filter cartridge, feature or component; or, a filter assembly, feature or component, include all of the feature detail and include applications of all of the techniques characterized herein, in order to obtain some benefit according to the present disclosure. That is, there is no requirement that a filter cartridge or component be configured to obtain all of the possible benefits achievable with techniques described herein, in order to be in accord with the general teachings herein.

BRIEF DESCRIPTION OF THE DRAWINGS

FIG. 1 is a schematic, open end, perspective view of a filter cartridge according to the present disclosure.

FIG. 2 is a schematic, closed end, perspective view of the filter cartridge depicted in FIG. 1.

FIG. 3 is a schematic perspective view of a filter assembly including a filter cartridge according to the present disclosure removably positioned therein.

FIG. 4 is a schematic cross-sectional view of the filter assembly of FIG. 3.

FIG. 5 is an enlarged fragmentary, schematic, cross-sectional view of a portion of the assembly depicted in FIGS. 3 and 4.

FIG. 6 is a schematic side elevational view of the cartridge depicted in FIGS. 1 and 2.

FIG. 7 is a schematic open end view of the filter cartridge depicted in FIGS. 1, 2 and 6.

FIG. 8 is a schematic closed end view of the filter cartridge depicted in FIGS. 1, 2, 6 and 7.

FIG. 9 is a schematic cross-sectional view of the filter cartridge, taken generally along line 9-9, of FIG. 8.

FIG. 10 is an enlarged, fragmentary, schematic view of a selected identified portion of FIG. 9.

FIG. 11 is a schematic cross-sectional view of a filter cartridge taken generally along line 11-11, of FIG. 8.

FIG. 12 is an enlarged, schematic, fragmentary view of an identified portion of FIG. 11.

FIG. 13 is a schematic cross-sectional view of a step of forming a seal member in accord with a process for constructing the cartridge of FIG. 1.

FIG. 14 is a schematic perspective view depicting a step of removing a molded seal member, as a preform, from the mold depicted in FIG. 13.

FIG. 15 is a schematic, fragmentary, cross-sectional view of a step of forming a portion of an example filter cartridge including a seal member and an end piece component, in accord with principles of the present disclosure.

FIG. 16 is a schematic fragmentary cross-sectional view of a step of forming a closed end piece on a filter cartridge in accord with the present disclosure.

FIG. 17 is a schematic perspective exploded view depicting features concerning structure, components and methods for forming a filter cartridge in accord with the present disclosure.

FIG. 18 is a schematic closed end perspective view of an alternate filter cartridge according to the present disclosure.

FIG. 19 is a schematic, fragmentary, cross-sectional view of a step of forming a filter cartridge in accord with FIG. 18.

FIG. 20 is a schematic, enlarged, cross-sectional view of an air cleaner assembly including a filter cartridge according to the present disclosure having a radially outwardly directed seal shown engaging a housing portion.

FIG. 21 is a schematic enlarged fragmentary cross-sectional view of a filter cartridge in accord with an example described herein, but implemented using radially outwardly directed seal thereon.

FIG. 22 is a schematic open end perspective view of a filter cartridge according to a further alternate example of the present disclosure.

FIG. 23 is a schematic perspective exploded view depicting features concerning structure, components and methods for more forming a filter cartridge with FIG. 22.

FIG. 24 is schematic fragmentary cross-sectional view of a step of forming a closed end piece on a filter cartridge in accord with FIG. 22.

FIG. 25 is a schematic fragmentary cross-sectional view of a step of forming a portion of example filter cartridge in accord with FIG. 22, including a seal member (preform) and an open end piece component in accord with the principles of the present disclosure.

FIG. 26 is a schematic cross-sectional view of a step of forming seal member or preform in accord with a process described herein, for constructing the cartridge of FIG. 22.

FIG. 27 is a schematic cross-sectional view of the filter cartridge of FIG. 22.

FIG. 28 is a schematic enlarged fragmentary cross-sectional view of an identified portion of FIG. 27.

FIG. 29 is a schematic open end plan view of a filter cartridge in accord with FIG. 22.

FIG. 30 is a schematic side elevational view of a filter cartridge in accord with FIG. 22.

FIG. 31 is a schematic cross-sectional view of a filter cartridge in general accord with FIG. 22 installed in an air cleaner assembly; it being noted than in FIG. 31, the filter cartridge is depicted without certain selected structural and functional detail, to emphasize certain points.

FIG. 32 is a schematic perspective view of an air cleaner assembly usable with the cartridge of FIG. 22.

FIG. 33 is a schematic closed end perspective view of the filter cartridge of FIG. 22.

FIG. 34 is a schematic open end perspective view of a filter cartridge according to yet another example of the present disclosure.

FIG. 35 is a schematic perspective exploded view depicting features concerning structure, components, and methods for forming a filter cartridge in accord with FIG. 34.

FIG. 36 is a schematic enlarged fragmentary cross-sectional view of a step of forming a closed end piece of a filter cartridge in accord with FIG. 34.

FIG. 37 is a schematic fragmentary cross-sectional view of a step of forming an open end piece with a seal member or preform thereon, in a process of forming a filter cartridge in accord with FIG. 34.

FIG. 38 is an enlarged fragmentary schematic cross-sectional view of a step of forming a seal member preform for use in a process in accord with FIG. 37 to form a filter cartridge in accord with FIG. 34.

FIG. 39 is a schematic cross-sectional view of a filter cartridge in accord with FIG. 34.

FIG. 40 is an enlarged fragmentary schematic view of an identified portion of FIG. 39.

FIG. 41 is a schematic, open end plan view of filter cartridge in accord with FIG. 34.

FIG. 42 is a schematic side elevational view of a filter cartridge in accord with FIG. 34.

FIG. 43 is a schematic cross-sectional view of a filter cartridge in accord with FIG. 34, installed in an air cleaner assembly for use.

FIG. 44 is an enlarged fragmentary schematic cross-sectional view of an identified portion of FIG. 43.

FIG. 45 is a schematic perspective view of an air cleaner housing for use with a cartridge in accord with FIG. 34.

FIG. 46 is a schematic closed end perspective view of the filter cartridge in accord with FIG. 34.

DETAILED DESCRIPTION

I. An Example Filter Cartridge and Filter Assembly, FIG. 1-12

Figure 1:
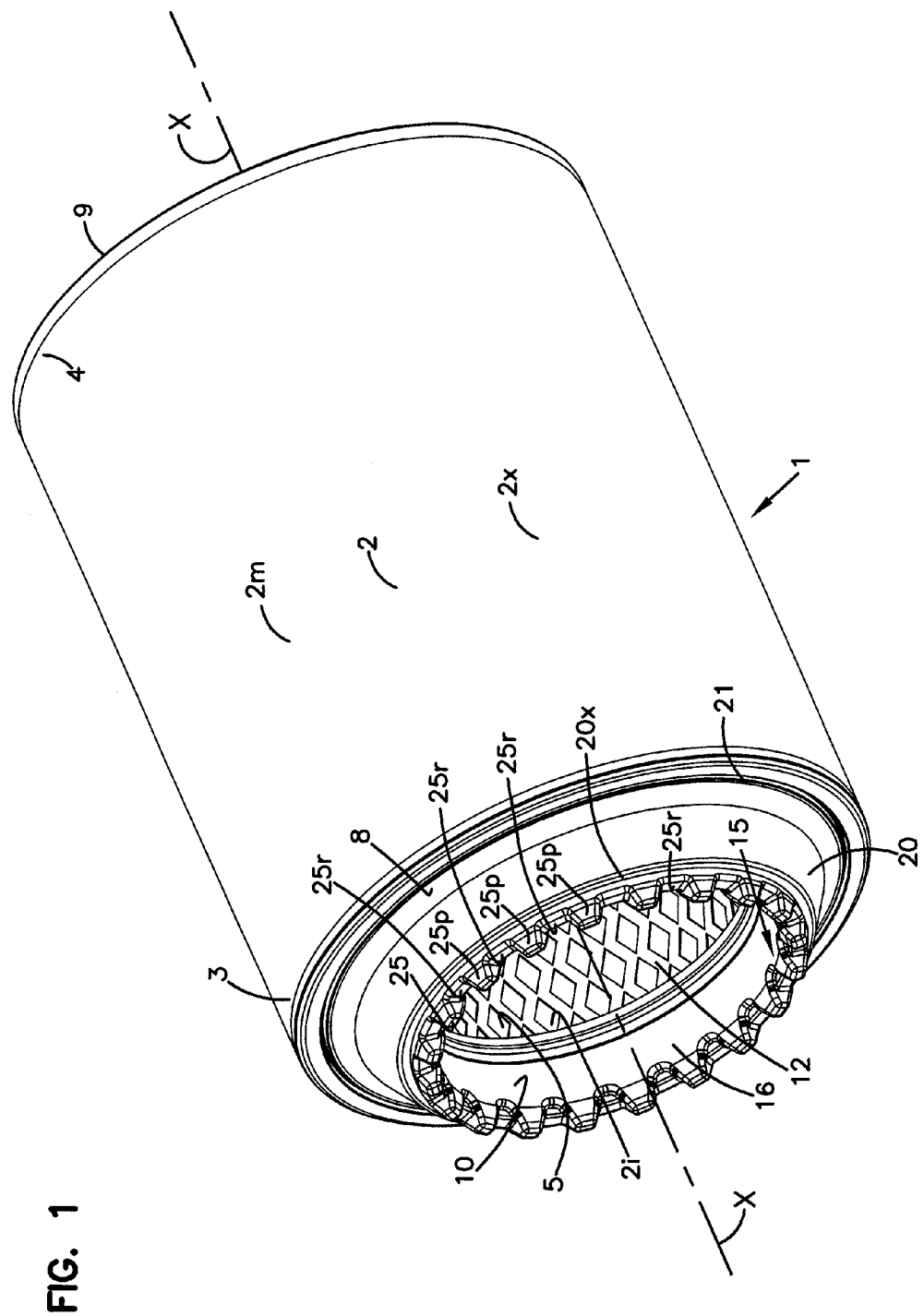
FIGS. 1-19 of the present application are also found in U.S. Ser. No. 13/833,002, filed Mar. 15, 2013 and incorporated herein by reference

Reference numeral 1, FIG. 1, generally represents an example filter cartridge incorporating features in accord with the present disclosure. The filter cartridge 1 depicted is configured as a gas filter cartridge, for example as would be used for filtering air; although techniques described herein can be applied in a variety of alternate constructions. In general, filter cartridge 1 comprises filter media 2*m*, or a media pack 2, through which gas (air) to be filtered is passed during a filtering operation.

The particular filter cartridge 1 depicted, comprises a media pack 2 including media 2*m* extending between first and second media ends 3, 4. In the example, the media pack 2 is configured to extend around an open filter interior 5, and a central axis X. This would be typical for application of techniques described herein, although alternatives are possible. The particular media pack configuration depicted is generally cylindrical, however alternative shapes are possible, including ones having non-circular cross-sections and/or ones that taper downwardly in cross-sectional dimension in extension between the ends 3, 4 (or 4, 3).

Herein, the term "media pack" is meant to refer to a media construction in the filter cartridge. The term "media pack" includes the media definition and may include additional material or structure; for example, the media pack may include an inner liner or an outer liner, or both, as discussed below.

The techniques described are particularly advantageous when applied in circumstances in which the media pack 2, or at least a portion thereof, is pleated, i.e. includes pleated media. However, the techniques can be applied in alternate applications.

The particular filter cartridge 1 depicted, is configured for use with "out-to-in" flow during filtering. By this it is meant that the carrier fluid (i.e., typically gas or air) being filtered is filtered as the carrier fluid passes from an exterior perimeter 2x of the media pack 2 to an interior perimeter 2i during filtering. The techniques can, however, be applied when the cartridge 1 is configured for an alternate direction of flow during filtering.

The cartridge 1 depicted is configured with the media pack 2 extending between first and second end pieces 8, 9. The first end piece 8 is positioned on the first end 3 of the media pack 2, and generally comprises an "open end piece;" i.e., the end piece 8 has a central opening 10 therein, through which the fluid (typically gas or air) passes during use. For the particular "out-to-in flow" assembly depicted, the central aperture 10 is an outlet aperture for filtered fluid (typically gas or air) to leave cartridge interior 5.

In a typical application, with the media 2m surrounding an open interior 2i, the second end piece 9 is positioned on the second end 4 of media pack 2, and is closed to passage of fluid (typically air or gas) therethrough; i.e., it is a closed end piece. The techniques described herein can be applied in different applications, however, for example ones in which the end piece 9 is open or is closed by additional structure.

Still referring to FIG. 1, the particular cartridge 1 depicted includes a media pack 2 that includes an optional inner media support or liner 12 around which media 2m, in the media pack 2, is positioned. The optional inner media support 12 provides a variety of functions including: support of the media 2m against collapse, radially inwardly, due to air or gas pressure against exterior 2x during filtering; retention of the media 2m in a desired configuration during manufacturing and assembly; and, provision of axial strength to the cartridge 2 in a direction of extension between media pack ends 3, 4 (i.e. in the direction of axis X) during manufacture, assembly handling, and/or use.

A variety of materials for the optional liner 12 can be used. The example liner 12 depicted, comprises an expanded metal liner. However, alternatively, a perforated metal tube can be used, and/or various plastic liner constructions can be used. In some instances, the cartridge 1 can be provided with a media pack that does not include an inner liner, although use of an inner liner will be typical in many instances. In some instances, when an inner liner is not provided in the cartridge, support to the media 2m, if desired, can be provided by a liner construction already positioned in a housing, in which the cartridge 1 is installed for use. For example, such support can be provided by a support structure that comprises a portion of (or attached to) the housing, or by support structure that comprises a portion of an internally positioned secondary or safety filter or other arrangement.

The cartridge 1 depicted, is shown with the media pack 2 and media 2m depicted schematically, i.e. individual surface detail and contours are not shown. Further, it is not indicated whether or not the media 2m, or media pack 2, includes an outer liner surrounding the media. In some applications, with out-to-in flow, such an outer liner will not be used. However, the techniques described herein can be applied in cartridges in which an outer liner is provided. The outer liner, when used, can comprise expanded metal, perforated metal, or plastic constructions, for example. Typically, when the media 2m is pleated, analogously to the inner liner, the outer liner will extend adjacent outer pleat tips.

A variety of media configurations can be used, including pleated media configurations. The media can be provided with pleat tip folding to support media pleat spacing, for example as widely used in air filtering and, for example, as can be found in media packs provided under the mark "PleatLoc" from Donaldson Company, Inc., of Bloomington, Minn., the owner of the present disclosure. The media 2m can be provided with one or more beads of adhesive extending along one or both of inner pleat tips and outer pleat tips, to facilitate pleat spacing, also in accord with typical widely used techniques.

Still referring to FIG. 1, the cartridge 1 includes, thereon, a housing seal arrangement 15. The housing seal arrangement 15 includes a (housing seal) resilient and typically compressible member 16, positioned for releasable engagement with a portion of a filter assembly upon operable installation of the cartridge 1 for use. By "resilient" and "releasable sealing engagement" together, and variants thereof in this context, it is meant that the housing seal member 16 comprises an appropriately resilient material that will form a seal in engagement with a housing component, when the cartridge 1 is installed, and will release from sealing engagement, when the cartridge 1 is removed from interaction with the engaged housing component. Typically, the resilient material chosen will be a compressible material, i.e., a material that can compress in dimension as it is pushed in place. The releasable sealing engagement typically will be of a type that can be engaged/disengaged under hand (installation or removal) forces provided by a service provider. Further, typically the releasable seal engagement will be "clampless" or "clamp-free", i.e. will be engaged and disengaged without the use of a clamp or other structure that needs to be tightened or adjusted in place.

The particular (seal) resilient member 16 depicted, is configured to form a radial seal (or radially directed seal) with a housing component in use. The term "radial seal" and variants thereof in this context is meant to refer to a seal that is established with sealing forces directed generally toward or away from a central axis X, surrounded by the seal member 16. In this instance, the central axis X also corresponds to the central axis X for the cartridge 1, around which the media 2 is positioned, and further corresponds to a central axis X for the aperture 10.

The particular housing seal member 16 depicted is configured for forming a "radially inwardly directed" seal, upon engagement with a housing component, i.e., a seal that engages with the seal member surrounding the housing component. While this will be typical for many of the applications according to the present disclosure, the techniques described can be applied when the seal arrangement 16 is configured to form an outwardly directed seal with a housing component in use, i.e., a seal that engages with a housing component by the seal member being surrounded by the housing component.

The particular housing seal member 16 depicted, generally defines a circular pattern around central axis X. While this will be typical for many applications, alternatives are possible. Alternatives can include, for example, an oval seal shape or still further alternate geometric configurations.

A variety of materials can be used for the seal member 16. Typically, the seal member will be formed from a relatively soft (by comparison to a remainder of the end cap 8), compressible, member such as a foamed polymer that compresses/deflects upon engagement with a housing structure. Typical housing seal members 16 will be formed from a tpe (thermoplastic elastomer) material providing an "as molded" density of no greater than 28 lbs./cu. ft. (0.32 g/cc) and often no greater than 15 lbs./cu.ft. (0.24 g/cc), for example 10 lbs./cu.ft.-15 lbs./cu. ft. (0.16 g/cc-0.24 g/cc) and/or which has a hardness, Shore A, after molding of, no greater than 20, typically no greater than 18 and often within the range of 10-18, inclusive. For example, useable materials include foamed polyurethanes such as those described in U.S. Pat. No. 8,226,786, incorporated herein by reference, although alternatives are possible.

A typical housing seal arrangement 16 comprises a molded member that is preformed before being incorporated into the cartridge 1, and which, upon incorporation, cannot be readily removed from the cartridge 1 without damage to either the seal member 16 or other portions of the cartridge 1. Alternately stated, the typical housing seal member 16 is a preformed member (or preform) secured to the remainder of the cartridge 1 in a non-removable manner. Thus, when the cartridge 1 is removed and replaced, so is the seal member 16.

Because the seal member 16 is typically formed from a compressible/resilient material, it is typically desired to provide the seal arrangement 15 with a (radial) seal support. Cartridge 1 includes such a seal support, as indicated at 20. The seal support 20 is a relatively rigid (by comparison to the seal member 16) construction that provides structural, radial, support to the radial seal member 16, to ensure integrity of the seal member 16 and to provide structure against which the seal member 16 is radially compressed when the seal member is radially engaged with a housing seal arrangement. Alternately stated, when the cartridge 1 is installed, the seal member 16 becomes radially compressed between the housing member against which it seals and the seal support. Since the seal arrangement 15 depicted is a radially inwardly directed seal, the seal support 20 is positioned surrounding the seal member 16. (If the seal member 16 were configured to form a radially outwardly directed seal, the seal support would comprise structure surrounded by the seal member.) As will be understood from further description below, the particular seal support 20 depicted, preferably comprises a structure that also cannot be removed from the cartridge 1, once positioned thereon, without damage to the seal support and/or a remainder of the cartridge. Further, for the example depicted, the seal support 20 comprises an integral portion or section of end cap or end piece, along with an end cap section 21, discussed below.

Typically, the only portion of end cap 8 which forms a seal with the housing member, is the seal member 16 configured to form a radially directed seal. That is, preferably, no portion or material on end cap 8 other than seal member 16 is positioned to form a seal of any type with the housing member, when cartridge 1 is installed. Although alternatives are possible, the construction with only one seal member 16 (as characterized) is preferred.

Although alternatives are possible, typically the seal support 20 is a continuous, solid, member in extension around the central axis X. By "continuous" in this context, it is meant that preferably the seal support 20 does not have any gaps therein, in portions that support the seal member 16, i.e. portions against which the seal member 16 presses, although gaps can be accommodated. By "solid" in this context, it is meant that preferably the seal member 20 does not have any apertures therethrough, in portions that support the seal member 16, i.e. portions against which the seal member is pressed upon installation, although apertures can be accommodated.

Still referring to FIG. 1, it is noted that the seal support 20, when positioned around the seal member 16 as depicted, provides protection to the seal member 16 against damage during handling and shipping. In general, having a relatively rigid structural member adjacent the seal member 16 facilitates this.

As will be understood from discussion below in connection with FIGS. 3-5, typically, when the cartridge 1 is installed in a filter assembly for use, a first end of the cartridge 1, in which the seal arrangement 15 is positioned, is pressed against an end wall of the housing. It is preferable that this engagement have resiliency, for stable support of the cartridge 1 during equipment operation, such as under circumstances inducing vibration, temperature fluctuation and/or shock. To provide for this, the cartridge 1 includes an axial cushion arrangement 25 (FIG. 1) positioned on end piece 8, at a location further axially remote from media end 4, and end piece 9 and/or media pack end 3 than any portion of end piece 8. The example cushion arrangement 25 depicted is integral with a resilient, compressible member that forms the seal member 16, and comprises the same material. The particular cushion arrangement 25 (FIG. 1) depicted, projects axially beyond an end 20x of seal support 20, and comprises a plurality of spaced projections 25p, separated by recess 25r, although alternative shapes are possible. The particular configuration for the cushion arrangement 25 depicted, is discussed further below.

Figure 2:
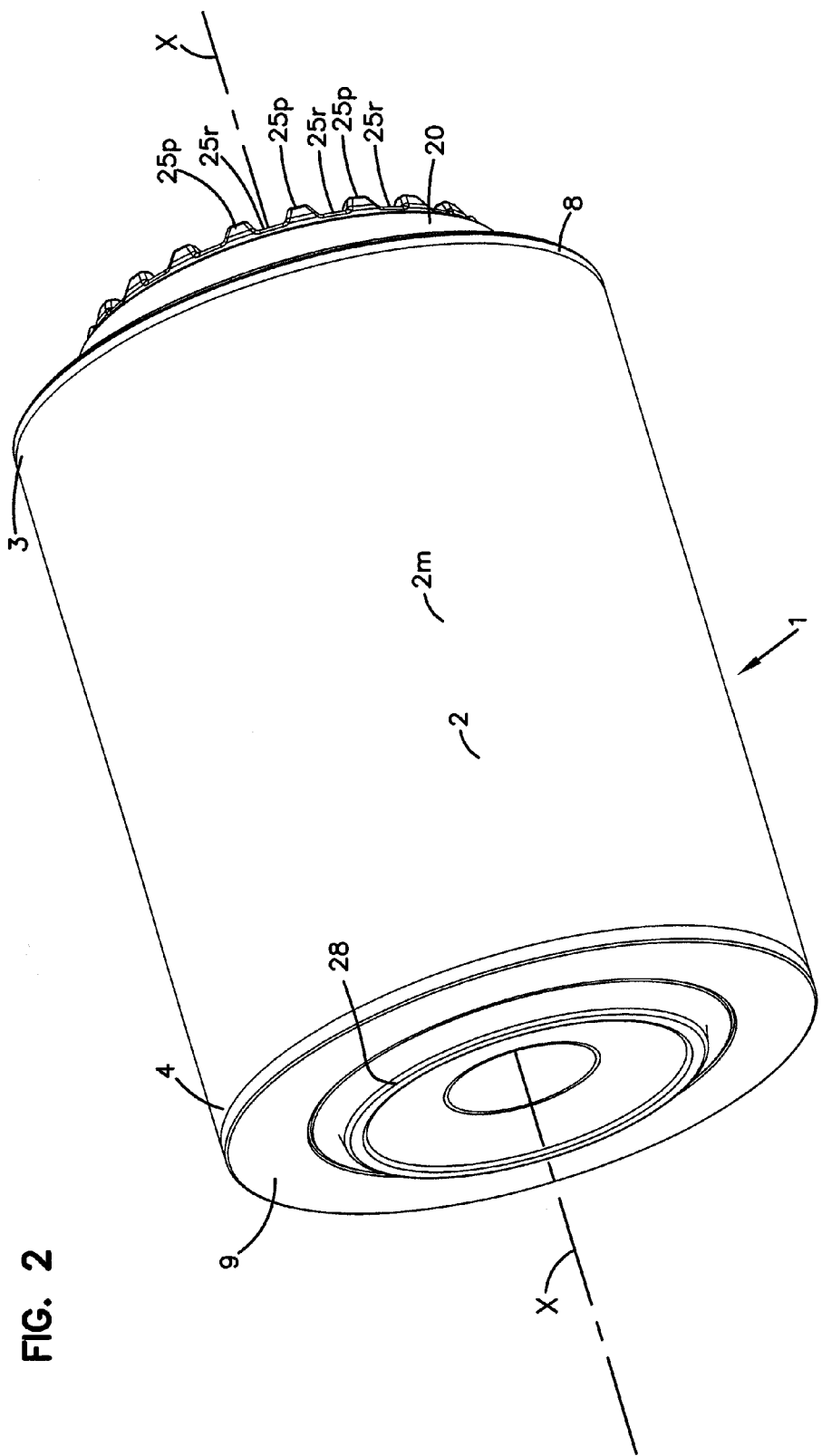

In FIG. 2, a perspective view of the cartridge 1 is provided, directed generally toward the end piece 9. Although alternatives are possible, the end piece 9 can be seen as comprising a closed end piece in the example depicted; i.e. there is no aperture through end piece 9. The end piece 9 can also be seen as having, projecting axially outwardly therefrom in a direction generally away from end piece 8, an axial projection arrangement 28 configured for engagement with a portion of a housing, during installation of cartridge 1, as discussed below. The projection arrangement 28 depicted, is configured as a continuous ring, although alternatives, such as segmented rings, are possible. The typical, preferred, operation of the projection arrangement 28 is discussed further below in connection with other Figures. In general, the projection engagement 28 can comprise either a relatively hard rigid material (by comparison to cushion member 25 and seal member 16) or a soft compressible material (by comparison to support 20). It is generally configured to engage an end of the housing opposite housing cushion arrangement 25, upon installation of the cartridge 1, for cartridge support.

Figure 3:
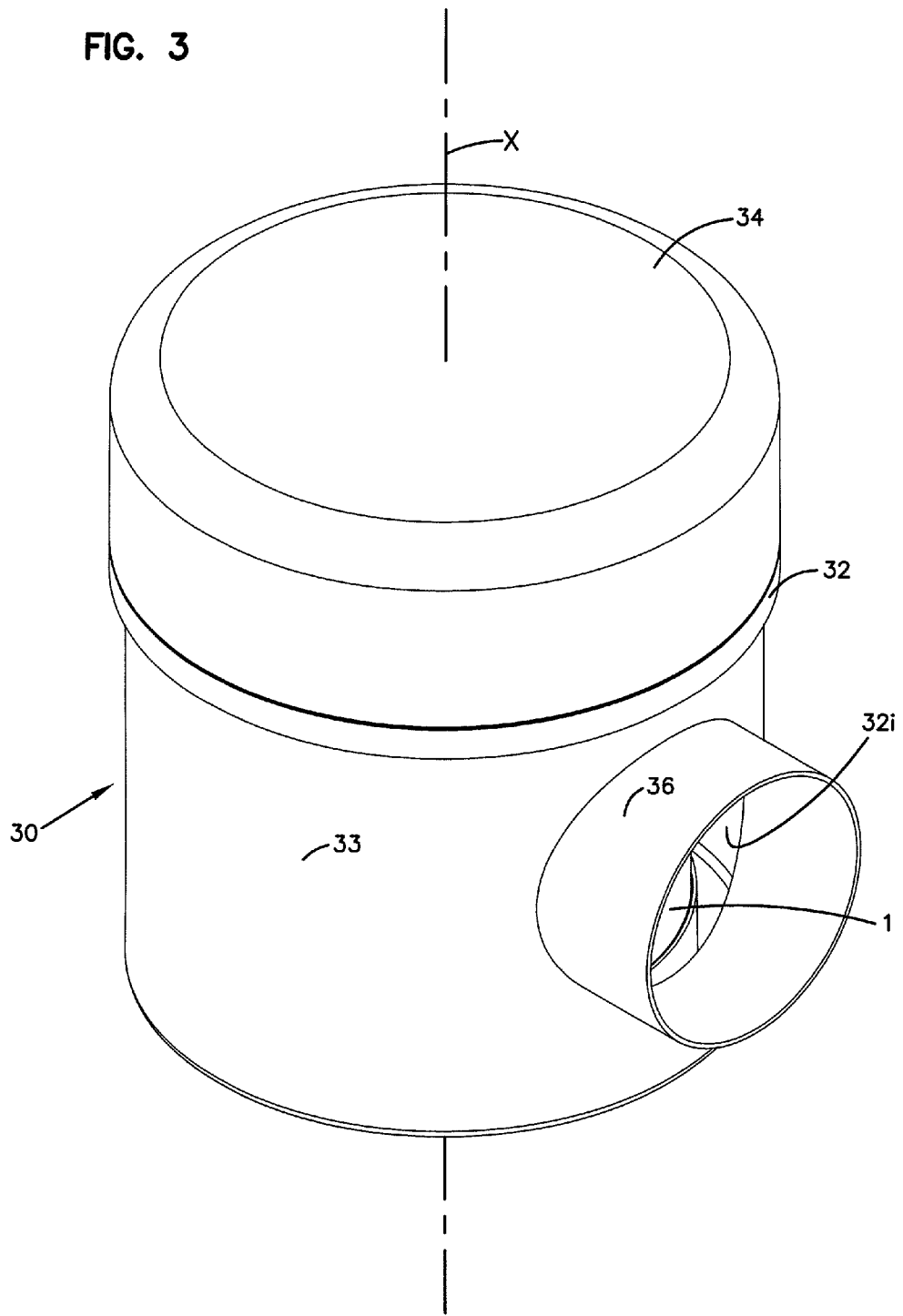

Attention is now directed to FIG. 3. In FIG. 3, a schematic perspective view of an air cleaner assembly 30 including a filter cartridge therein in accord with filter cartridge 1 is depicted. FIG. 3 should be understood to be schematic, and a variety of specific housing features can be used with principles according to the present disclosure. For example, housing features as described in U.S. Pat. No. 6,312,491; U.S. Pat. No. 7,455,707; U.S. Pat. No. 6,139,607; U.S. Pat. No. 7,981,187; WO 89/01818; WO 2012/116314; WO 2006/026241; WO 2006/119414; WO 2009/014982; WO 2009/014986; WO 2009/014988, incorporated herein by reference, can be used. The filter assembly 30 depicted would typically be configured as an air cleaner assembly, but, as referenced above, alternative applications are possible.

Referring to FIG. 3, the filter assembly 30 comprises a housing 32 having a housing body portion 33 and an access cover 34. The access cover 34 is removably positioned on the body portion 33, for service access to an interior 32i of the housing 32. In general terms, upon removal of the access cover 34, an interiorly received cartridge 1 can be removed, and/or a cartridge 1 can be installed.

Still referring to FIG. 3, at 36, a gas flow tube is provided, allowing for flow access to interior 32i. The particular flow tube 36 depicted is a gas (air) flow inlet since the filter assembly 30 is configured for "out-to-in" flow through to cartridge 1 during filtering. Of course, in selected alternate applications, the flow tube 36 could be an outlet flow tube for filtered air.

Figure 4:
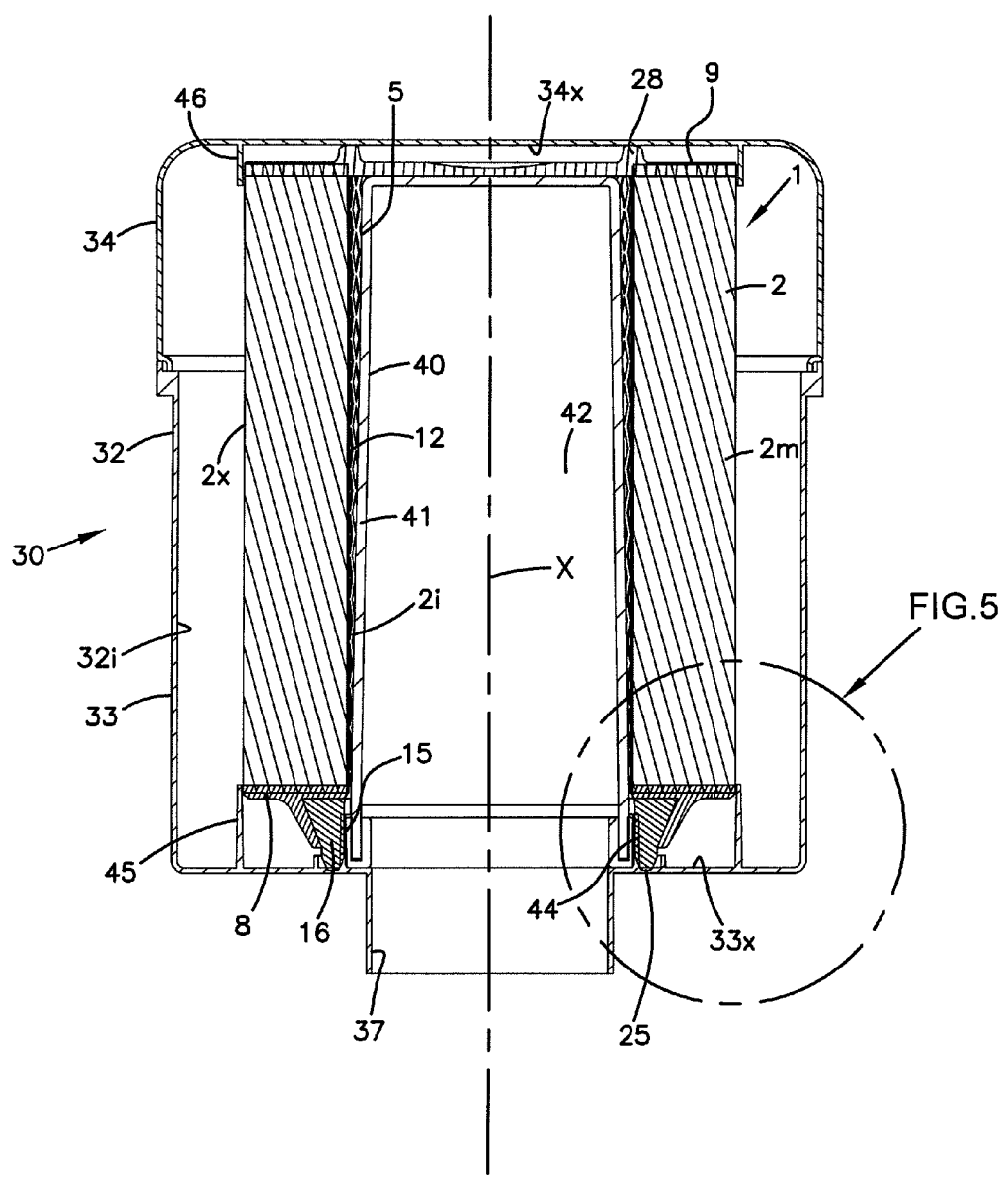

Attention is now directed to FIG. 4, a schematic cross-sectional view of the filter assembly 30. Here, cartridge 1 can be seen installed with interior 32i of housing 32. The housing 32 seen as including a second flow tube 37. For the particular assembly depicted, flow tube 37 is an outlet flow tube for filtered gas (air), but alternate constructions are possible, for example with the flow during filtering being through tube 37 into an interior 2i surrounded by the cartridge 1, through the media 2, and then outwardly through flow tube 36, FIG. 3.

Still referring to FIG. 4, the particular filter assembly 30 depicted, is shown including a serviceable safety or secondary filter cartridge 40 positioned therein. The safety or filter cartridge 40 is positioned with media 41 thereof positioned in an interior 5 of cartridge 1 at a location surrounded by the media pack 2. As gases flow through the media pack 2 from exterior 2x to interior 2i, they are filtered. The gases are then passed through the safety cartridge media 41 into open central interior 42 (and a portion of cartridge interior 5 of the main cartridge 1). These gases can then pass outwardly through tube 37. The optional safety cartridge 40 may be constructed in a variety of configurations, now known or later developed.

In FIG. 4, the cartridge 1 can be seen positioned in extension between an end 34x of the access cover 34, and an end 33x of the housing body portion 33. In the particular arrangement depicted, the cartridge 1 is configured with a central axis X thereof extending vertically, and with end piece 8 directed downwardly. However, alternative orientations are possible with principles according to the present disclosure, including, for example, horizontal ones and inverted ones.

In FIG. 4, one can see that the cartridge 1 is stabilized axially, i.e., against undesired movement in the direction of axis X, by engagement between projection arrangement 28 with end 34x, and cushion arrangement 25 with end 33x. The cushion arrangement 25 provides that there is some cushion in this engagement, to help stabilize the cartridge 1 under vibration, shock, etc. Also, providing a cushion to the engagement helps ensure that manufacturing variation is accommodated and variations from temperature fluctuations are managed.

Typically, a latch arrangement (not shown) or other connection arrangement is provided between access cover 34 and housing body 33. Typically, the connection arrangement is configured to help ensure that the cartridge 1 is secured in place under axial compression between ends 33x and 34x.

Still referring to FIG. 4, it is preferable that the cartridge 1 not form an axial seal with end 33x of the cartridge, i.e., a seal under compression in the direction of axis X. Reasons for this include that the housing 32 is often not constructed to preserve and secure such a seal. In addition, there may be housing structure, for example, strengthening ribs or other structures, at end 33x in the region where it is engaged by cushion arrangement 25. The particular cushion arrangement 25 depicted, FIG. 1, comprises a plurality of projections 25p separated by recesses 25r and thus does not provide an end edge readily capable of such an undesired axial sealing engagement.

Although alternatives are possible, preferably the projections 25p and recesses 25r are configured and sized, so that even in the recesses 25r, a cushion arrangement 25 that projects axially beyond an end or tip of support 20 is provided. Thus, even if the projections 25p fully compress, cushion material will still be present from regions 25r to help avoid a hard contact between support 20 and the housing body 33.

Referring to FIG. 4, the filter assembly 30 includes a seal flange 44, projecting axially into housing interior 32i, for sealing engagement by the seal member 16. The seal flange 44 depicted comprises a portion integral with the remainder of housing section 33. However, the seal flange 44 can, for example, comprise a portion of a flow tube or other housing construction that is attached by mounting to a remainder of the housing section 33 as opposed to being formed integral therewith.

Still referring to FIG. 4, the particular seal flange 44 depicted, is configured to be surrounded by seal member 16 during a releasable sealing engagement therewith, resulting in the releasable radially directed (in this inwardly radially directed) housing seal.

In FIG. 4, it can be seen that seal flange 44 is also positioned to be sealed against, along a radially inner surface thereof, by a seal arrangement positioned on an optional safety cartridge 40. Such an engagement of an optional safety is known.

Still referring to FIG. 4, at 45, in housing section 33 is optional structure providing a stabilizing/centering support to an end of cartridge 1 at end piece 8; and, at 46 the access cover 34 is provided with optional stabilizing/centering support surrounding an end of the cartridge 1 at end piece 9. Such stabilizing rings as rings 45, 46 are optional, but can help provide stability and security to positioning of the cartridge 1.

Figure 5:
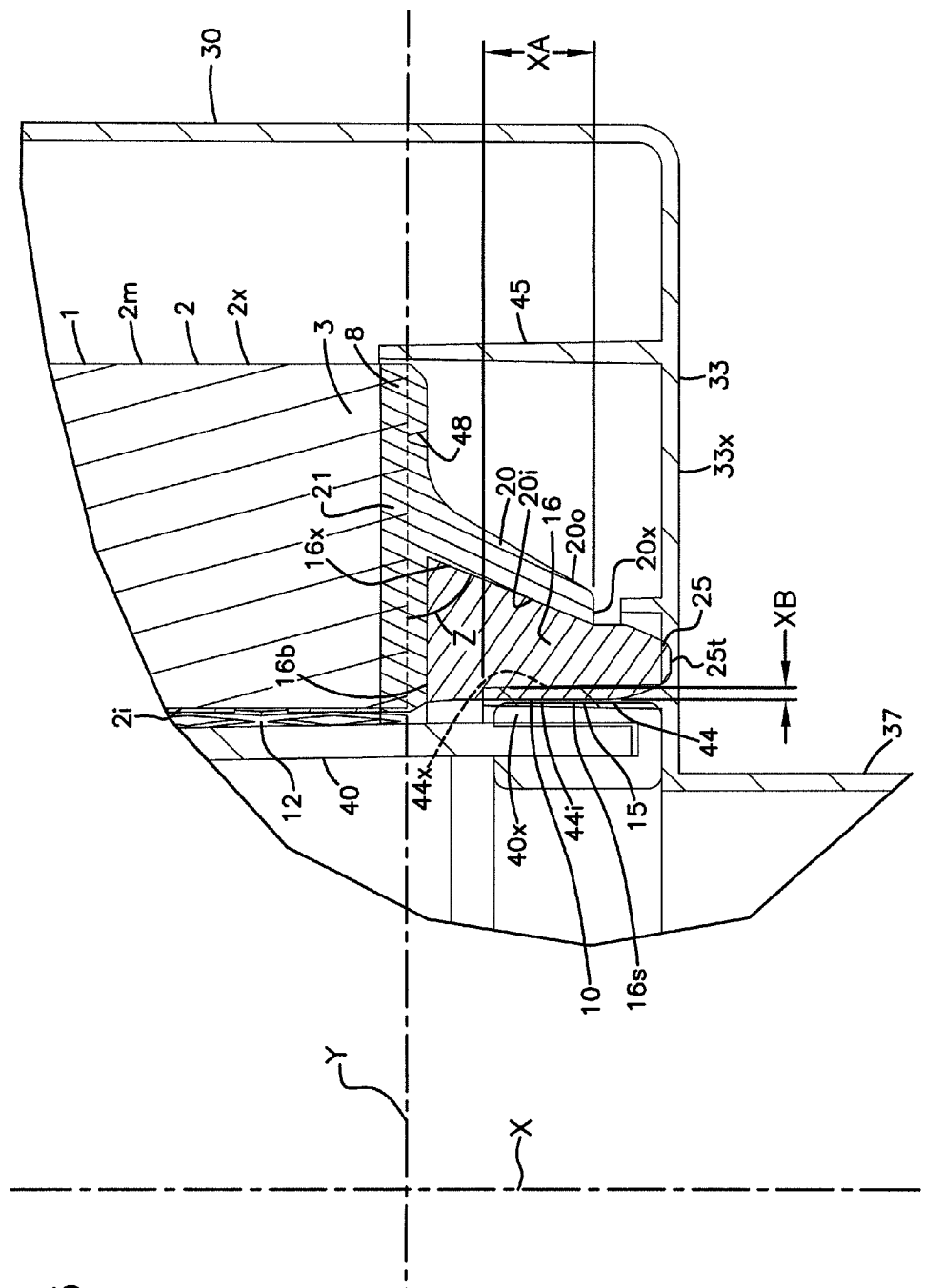

Attention is now directed to FIG. 5, an enlarged fragmentary cross-sectional view of a portion of FIG. 4, generally in the vicinity of seal flange 44. The features of the housing 30 viewable and previously discussed, include a portion of housing body 33, end wall 33x, flow tube 37 and support arrangement or ring 45.

Portions of the safety filter or cartridge 40 can also be seen. Seal member 40x can be seen positioned on the safety filter or cartridge 40, in releasable sealing engagement with an inner surface 44i of seal flange 44, as an outwardly radial seal.

Selected portions of the main cartridge 1, viewable in FIG. 5 and previously discussed, include: media pack 2 having end 3; media pack exterior 2x and interior 2i; inner liner 12; end piece 8; seal member 16; and seal support 20. Cushion arrangement 25 can be seen having a tip 25t projecting into an engagement with end wall 33x. Overlap indicated in the drawings between tip 25t and end wall 33x is meant to indicate an example amount of interference or cushion that would typically occur at this location. Similarly, overlap between seal arrangement 16 and flange 44, at an outer surface 44x of flange 44 is meant to show radial interference during normal sealing installation.

Example dimensions provided in FIG. 5 are as follows: XA=16.6 mm; and, XB=1.8 mm. Alternatives can be used.

Still referring to FIG. 5, some particular, preferred, advantageous features of end piece 8, especially related to seal support 20, can be understood. First, the particular end piece 8 depicted can be seen as having two sections: an end cap section 21 and seal support section 20. In the example depicted, the end cap section 21 extends completely across end 3 of the media pack 2 and media 2m between the media pack interior 2i and the media exterior 2x. Typically, when the media 2m is pleated, the end piece portion 21 has an end portion of the media 2 embedded therein, and thus is molded-in-place and comprises a material that can flow into spaces between pleats to ensure sealing, before complete cure occurs. Typically, end cap section 21 is solid in extension across an end 3 of the media pack 2, i.e. does not include any apertures in overlap with the media 2m, so as to avoid undesired levels of leakage. Of course, the end piece 21 does surround a central air flow aperture 10 discussed above.

Still referring to end piece or end section 21, attention is directed to groove 48. Groove 48 is an artifact from a media standoff in a mold in which end piece 8 would be formed. Such media standoff rings/grooves are typical in many molded-in-place end pieces.

Another feature observable in FIG. 5, is that for a typical preferred application, the support structure 20 is integral with end section 21, i.e., the two are formed integral one another (as integral portions of the same material). Typically, both comprise molded portions of a molded-in-place material, as discussed below.

Still referring to FIG. 5, another feature that can be understood from the Figure with respect to seal support 20 is that generally the seal support 20 defines a sealing engagement surface or wall 20i against which the seal 16 is pressed. Although alternatives are possible, for the example depicted, the sealing engagement surface or wall 20i is a surface that extends, in a direction away from end section 21, at an angle that is not parallel to a central axis X of the seal, and thus, is not perpendicular to a plane that is perpendicular to the central axis X. In FIG. 5, an example plane perpendicular to the central access X is generally indicated at Y. With respect to this definition, for instance, an angle of surface 20i in extension axially away from the media pack 2 or media 2m (or end section 21) is generally indicated at Z. When such a slanted support wall or surface 20i is used, it is typically slanted at an angle Z that is at least 30°, in many typical applications not greater than 85° and often not greater than 80°, more often not greater than 75°. It is also typically at least 40° and often at least 55°. In typical arrangements it will be within the range of 50°-80° inclusive, usually within the range of 55°-75°, inclusive, often 60°-75°. In general, the slanting wall 20i, in coordination with a portion of end section 21, forms a seal member recess 16x in which the seal member 16 is nested or positioned.

In a later example provided herein, the angle Z can be quite large, indeed in some instances, it can be 90°, but typically it is no greater than about 89.9°, and often no greater than 89.5°, so that it forms at least some recess in preferred instances.

It is noted that in the example depicted, the slanting wall 20i (i.e., wall 20) is shown slanting from a location approximately at an intersection with section 21, as it extends axially outwardly away from the media 3. This will be typical. However, in some applications of the techniques described herein, a section of wall 20i (i.e., a support 20) that slants as defined, can be a section that does not intersect end section 21. For example, the portion that slants can be on another portion that extends away from end section 21 generally perpendicularly to central axis X that then turns to form the slant. It is preferred, but not required in all instances, that the slanted section 20i (to support 20) be a section in radial overlap with a portion of member 16 that forms to the radial seal, in use, however. This is so that the seal portion 16 is preferably within a recess as defined, and with the radial support provided by support member 20 being provided by a slanted section, to advantage as discussed below.

It is noted that there is no specific requirement that in all applications the techniques described herein, surface 20i, i.e. the support surface for the seal support, not be perpendicular to a plane perpendicular to the central axis X. That is, again, in some instances, surface 20i can extend generally parallel to a central axis X, while still obtaining some benefit according to the present disclosure.

For the particular example arrangement depicted, the surface or wall 20i slants toward the central axis X as it extends further away from the media pack 2 at end 3. However, if the seal arrangement were configured for a radially outwardly directed seal, an opposite angle of extension, i.e., away from central axis X, would typically be involved, when a slant is used. Thus, a slant in the surface 20i is typical, as it extends way from the media pack end 3 and end cap section 21; with the slant being in the general direction of the seal 16 (radially inward or radially outward).

Still referring to FIG. 5, for the particular example depicted, the inner surface 20i of the support 20, which, in this instance, is the seal support surface, is generally smooth and regular. However, while this may be advantageous in many instances, it is not specifically required. That is, the support surface or wall 20i can be irregularly shaped and still provide desired support. When an irregular shape is involved, generally reference to the slant is meant to a general slant or angle, disregarding surface irregularities.

Still referring to FIG. 5, tip 20x of seal support 20 can be seen terminating with portion or cushion section 25 of seal member 16 projecting axially therefrom, in a direction away from the media 3. This is preferred, but is not required in all instances. Typically, the maximum amount of this extension beyond tip 20x by tip 25t is at least 2 mm usually at least 4 mm, typically at least 5 mm, and, usually not more than 20 mm and typically not more than 15 mm, although alternatives are possible.

It is noted that typically even portions 25r of the tip 25t between the various projections 25p, also extend beyond tip 20x of support 20, typically at least 0.5 mm usually at least 1 mm. This is advantageous, as it helps ensure that even if the projections 25p are fully compressed, it is still unlikely that any portion of end 20x will engage the housing, which is advantageous for ensuring that the cartridge 20 is supported without a hard contact engagement between support 20 and a portion of housing, during use.

In a typical assembly, seal member 16 is non-removable from end piece 8, i.e. from engagement with section 21 and support 20. That is, the seal member 16 cannot be separated from these two sections (20, 21) of the end piece 8, without damage to one or the other. This provides for good structural integrity during use. Preferably this non-separable engagement is established upon formation of the end piece 8 by: preforming the seal arrangement 16; and, then, molding the end piece 8 in place, in position engaging both the media pack 2 and seal member 16. Example techniques to accomplish this are described herein below.

Referring still to FIG. 5, and although alternatives are possible, it is noted that, for the example depicted, no portion of the seal member 16 extends along, over or against, a surface 20o, of the support 20, that is opposite surface or wall 20i. This would be typical for preferred applications according to the present disclosure, since support 20 would typically have been molded-in-place, in engagement with a preformed seal member 16.

Figure 6:
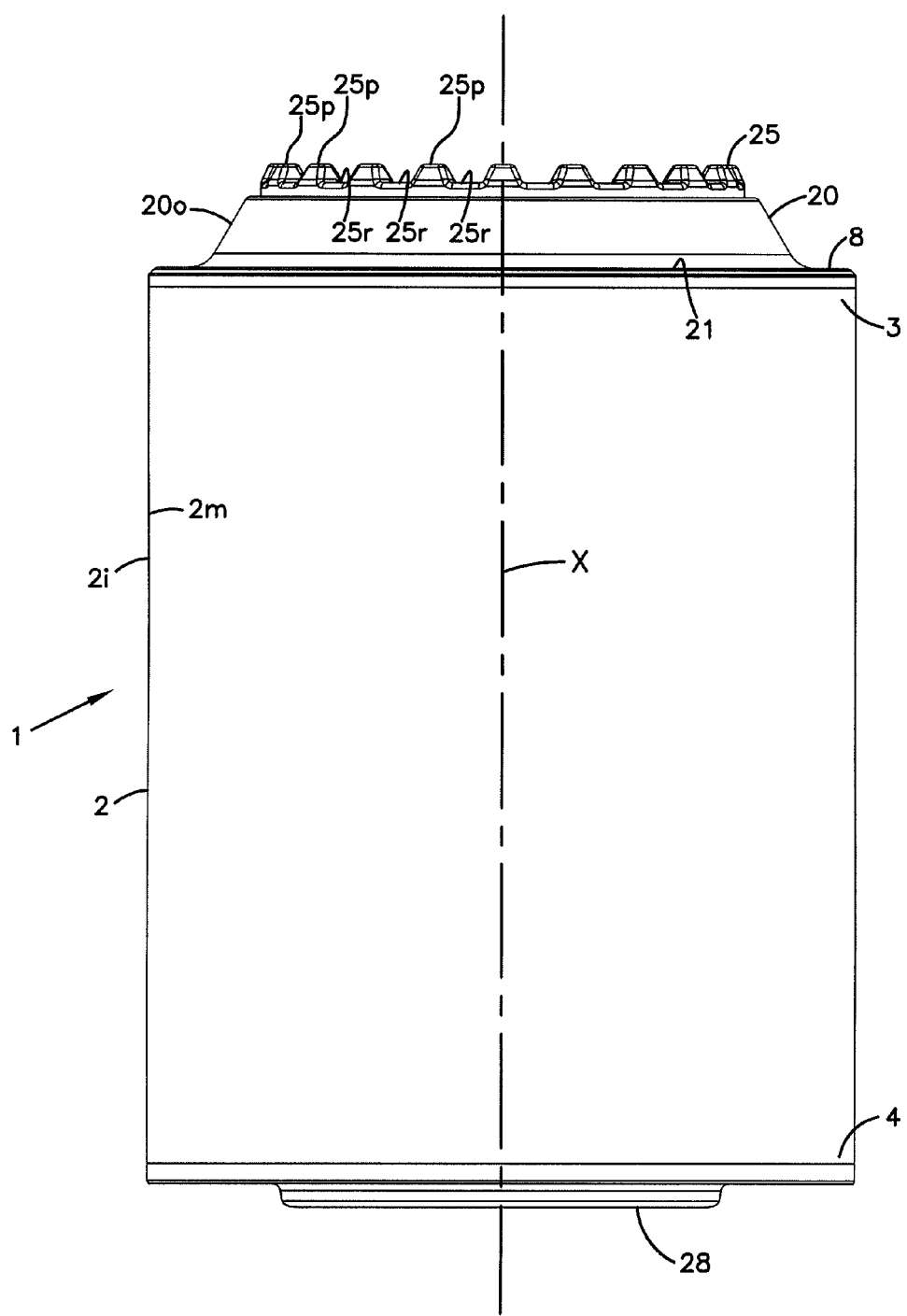

In FIG. 6, a side elevational view of the cartridge 1 is depicted. It is noted that, as described and depicted, the particular cartridge 1 shown and described is generally radially symmetric, i.e., when viewed from either the left or the right in FIG. 6, or in an opposite direction to that shown in FIG. 6, the cartridge 1 would generally appear the same. Of course, there could be minor differences relating to such features as: media detail; and, precise number and orientation of projections 25p. In general, the cartridge 1 will typically possess overall, general, radial symmetry but for surface detail, although alternatives are possible.

Figure 7:
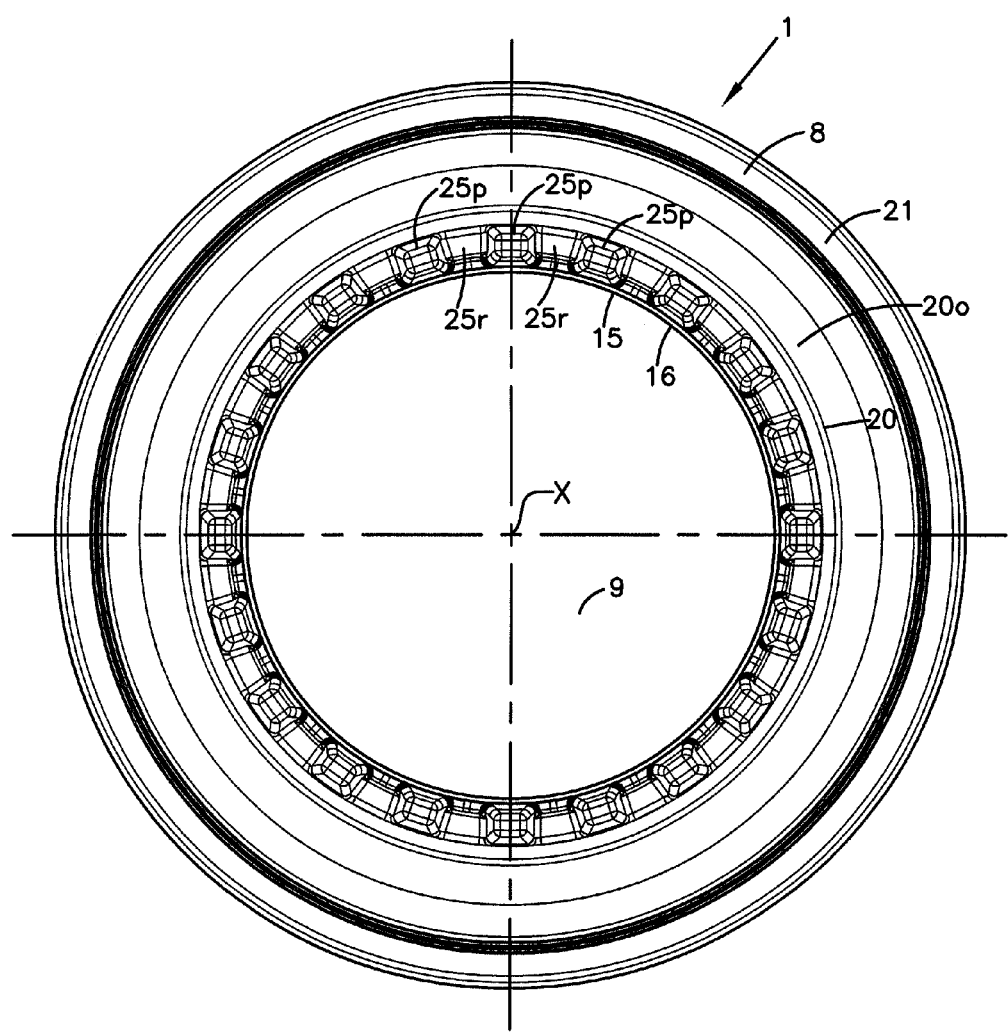

In FIG. 7, a schematic plan view taken generally toward end piece 8 is provided. It is noted that interior surface features at an opposite end piece 9 of the cartridge from end piece 8 are not depicted in detail in FIG. 7.

Figure 8:
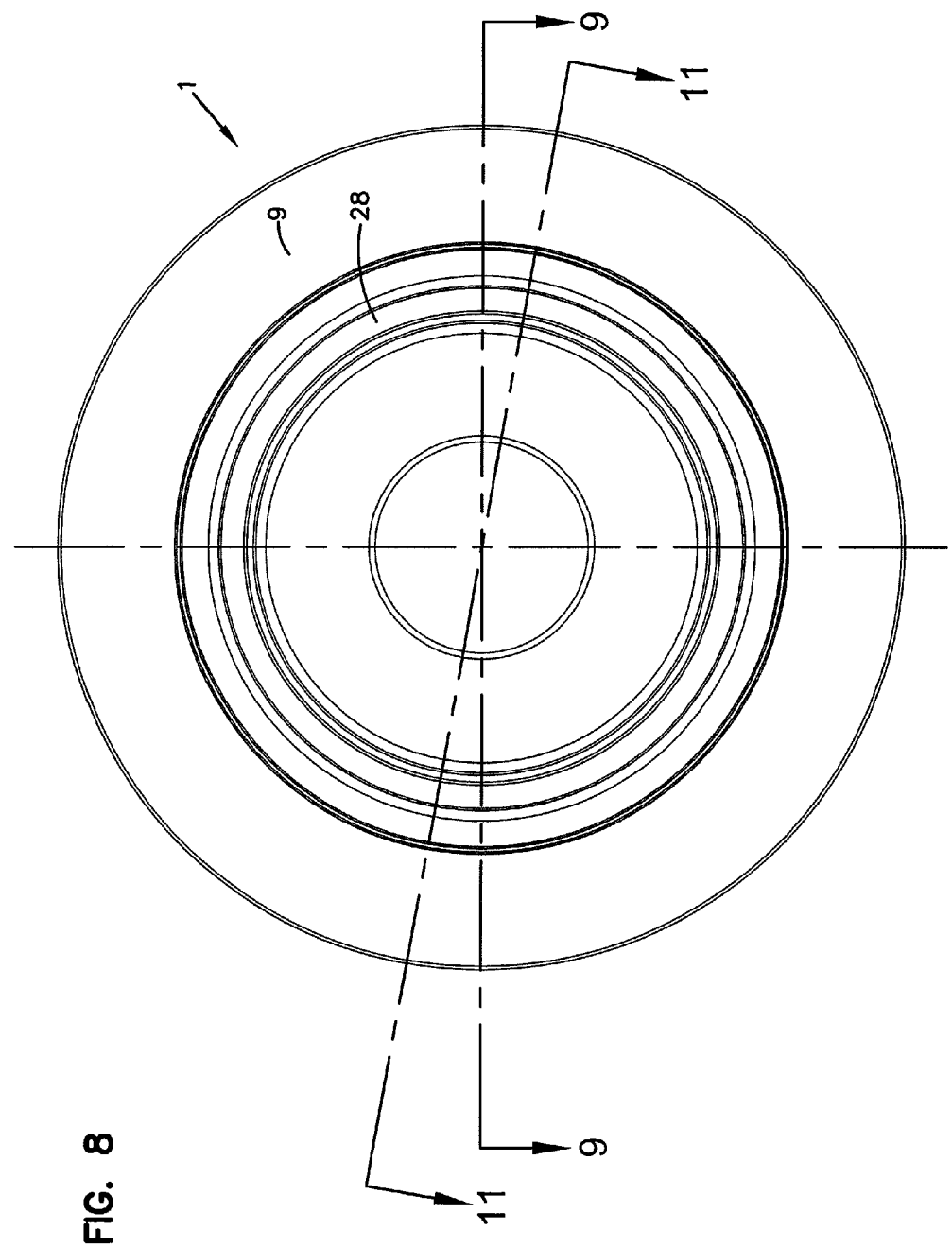

In FIG. 8, an end view taken toward closed end piece 9 is depicted. Features previously discussed include the projection 28.

Figure 9:
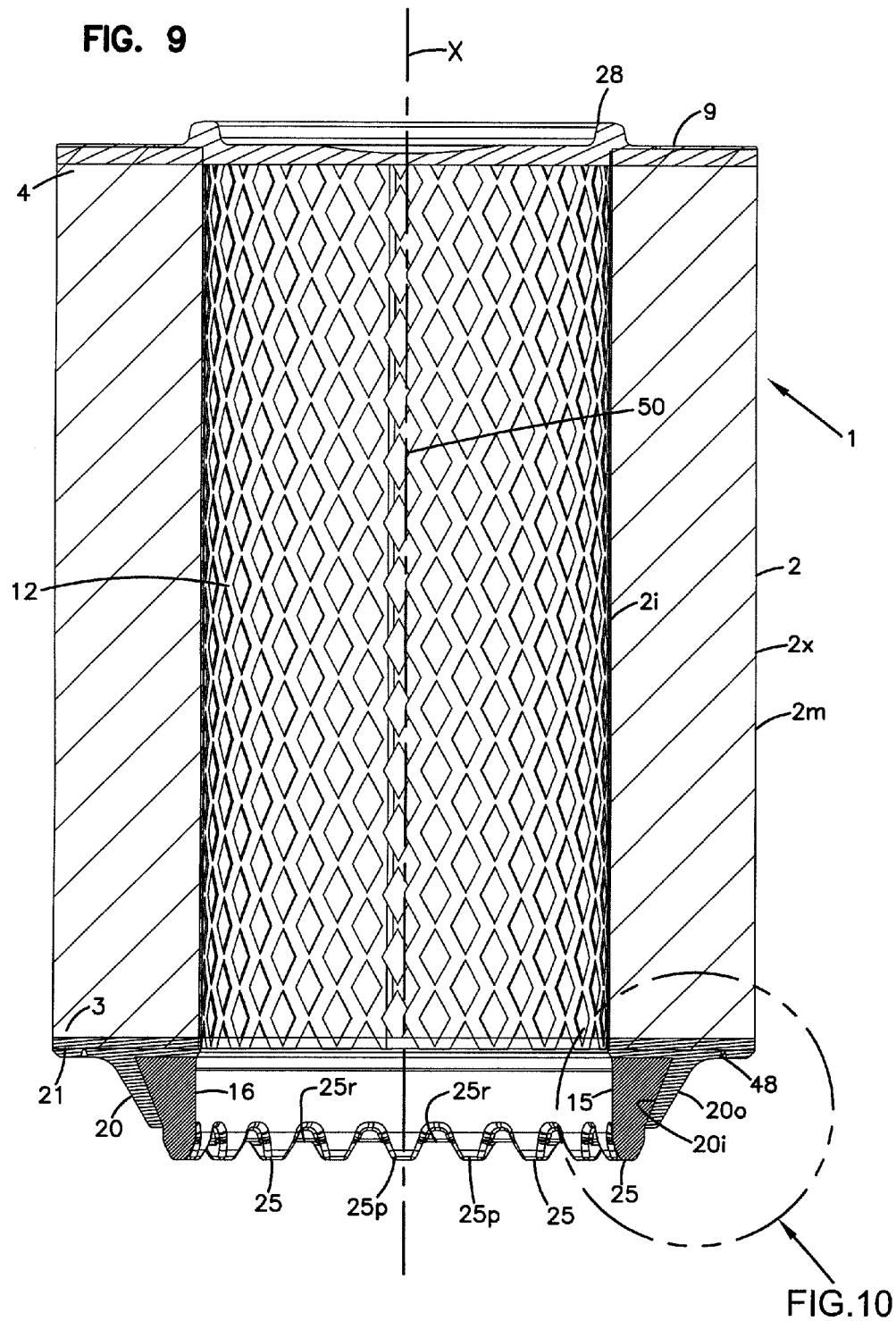

In FIG. 9, a cross-sectional view taken along lines 9-9, FIG. 8 is shown. Here, selected features previously described include: media pack 2, end piece 9, and end piece 8, support section 20, end cap section 21, seal member 16, cushion section or arrangement 25, and inner liner 12. At 50, a spot welded seam is schematically depicted in an expanded metal inner liner 12.

Figure 10:
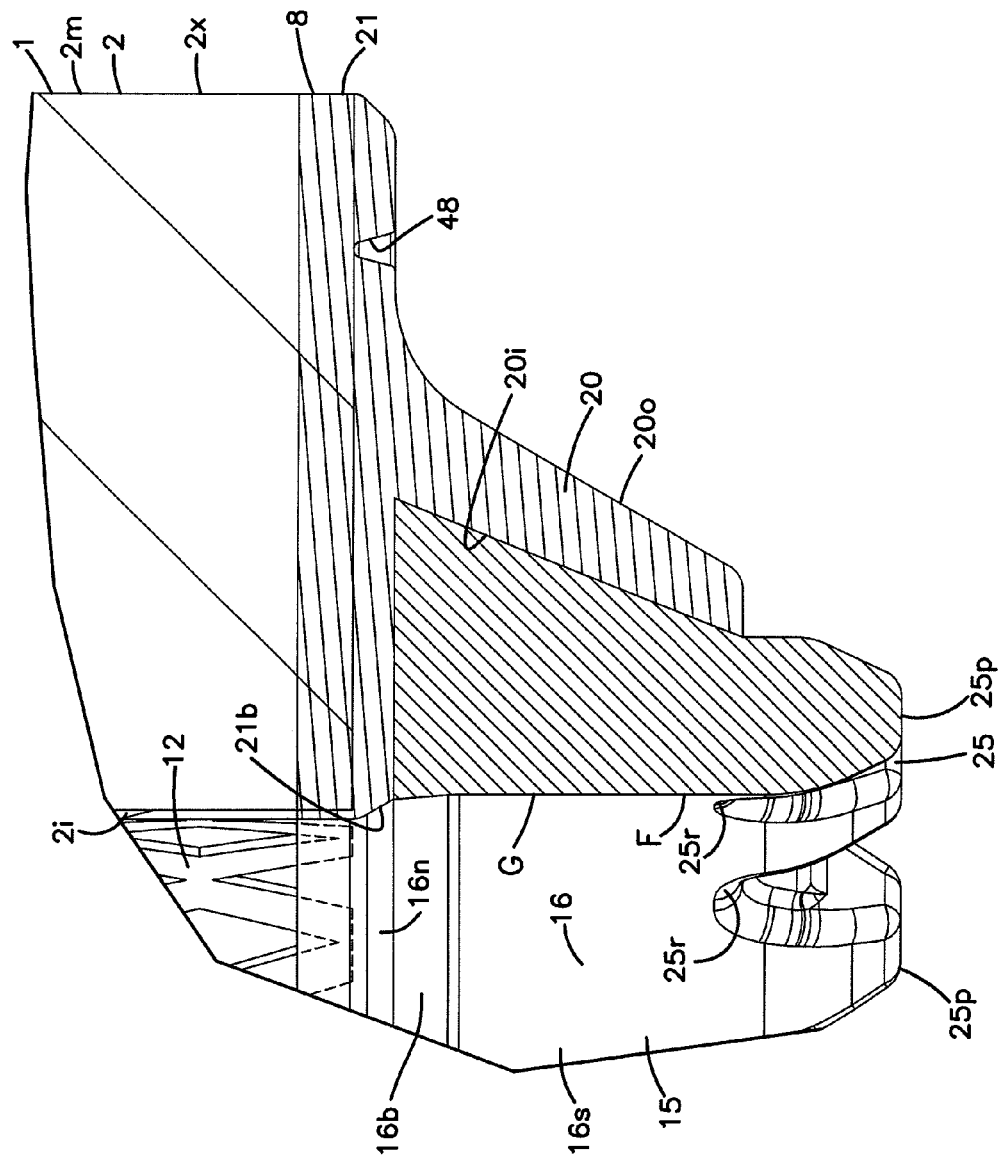

In FIG. 10, an enlarged fragmentary view of an identified portion of FIG. 9 is shown. It is noted that inner liner 12 can be seen embedded in a portion of end piece 8, in particular in a portion of end cap portion 21.

Figure 11:
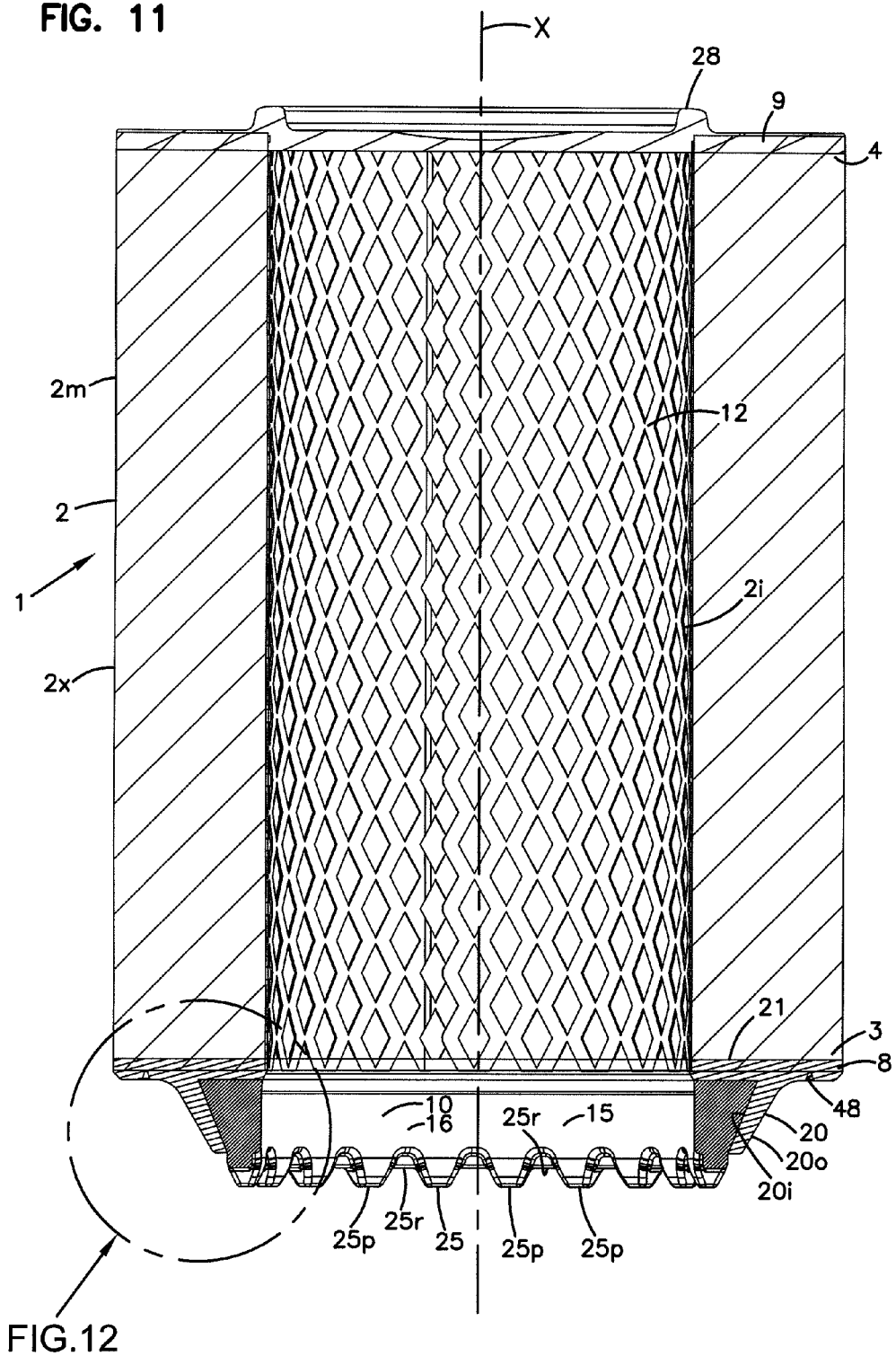

In FIG. 11, a second cross sectional view, taken generally along lines 11-11, FIG. 8, is depicted. It is noted that, by comparison to FIG. 9, in FIG. 11 the cross-section is through a recess at 25r, in cushion section 25, whereas in FIG. 9, the cross-section is through projections 25p in cushion section 25. Again, though not necessarily shown in FIG. 12, preferably within recesses 25r at least a portion of member 16 extends axially beyond tip 20t in a direction away from media 2 and section 21. It is not required, however, that all of recess 25r so extend.

Figure 12:
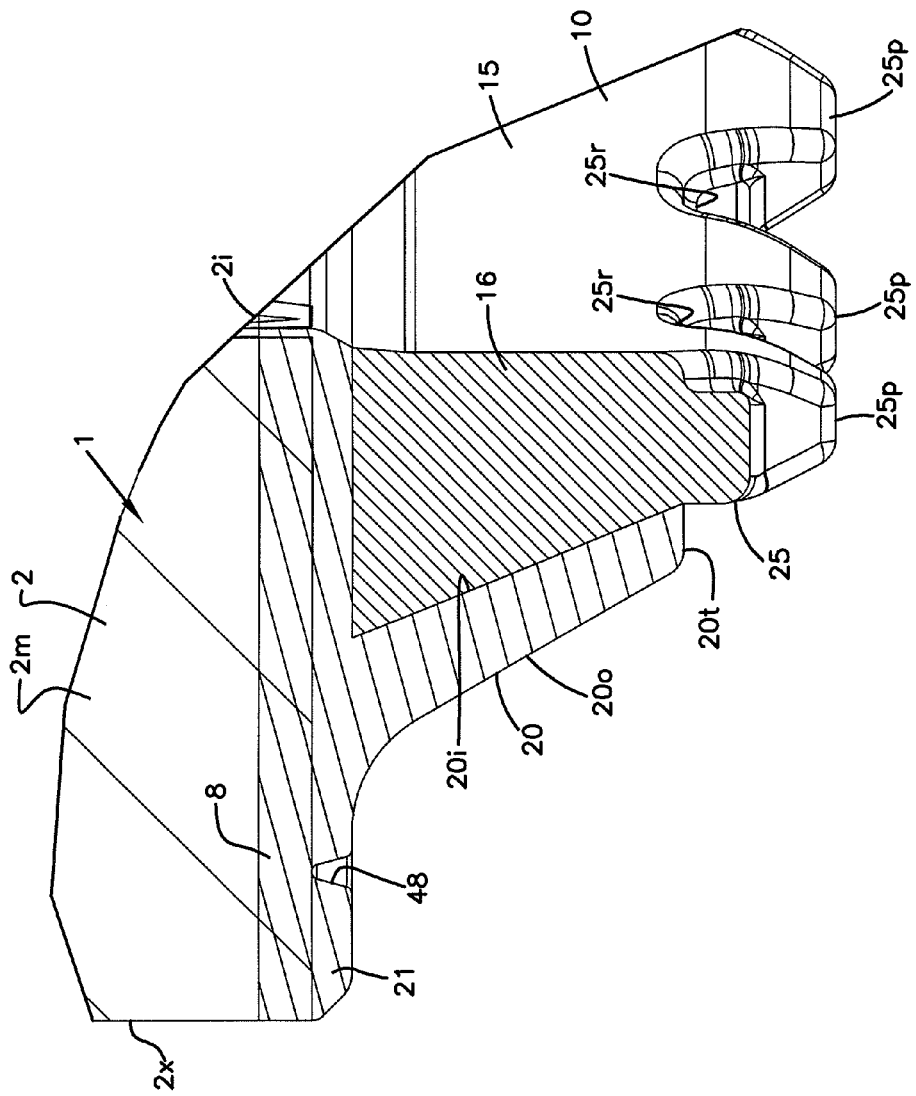

In FIG. 12, an enlarged fragmentary view of an identified portion of FIG. 11 is depicted.

II. An Example Method for Construction of an Arrangement in Accord with FIGS. 1-12; FIGS. 13-17

A variety of methods can be used to construct a filter cartridge 1 in accord with the features discussed and described above in connection with FIGS. 1-12. In FIGS. 13-17, a particularly advantageous and usable construction approach is depicted schematically.

Figure 13:
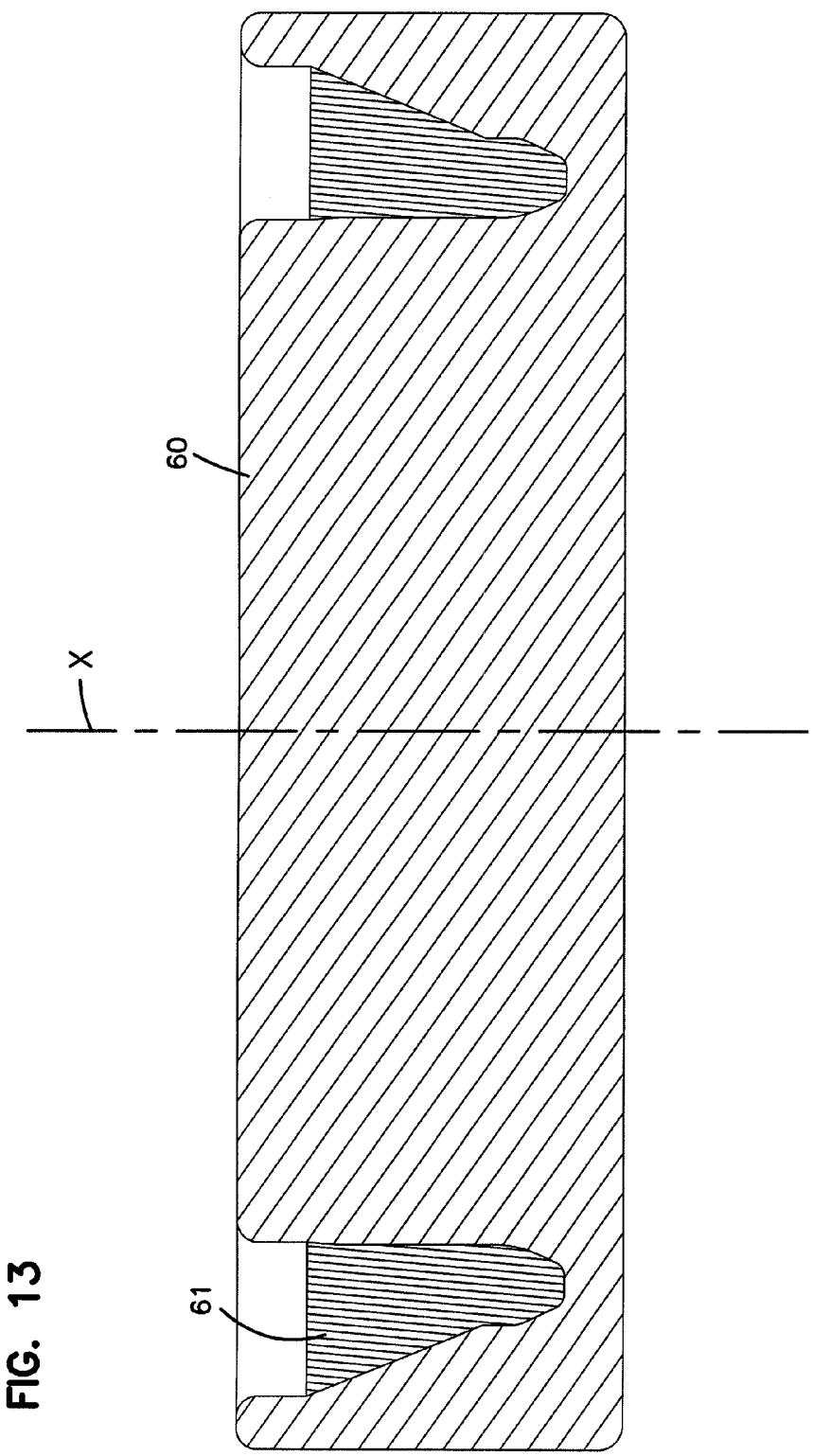
Figure 14:
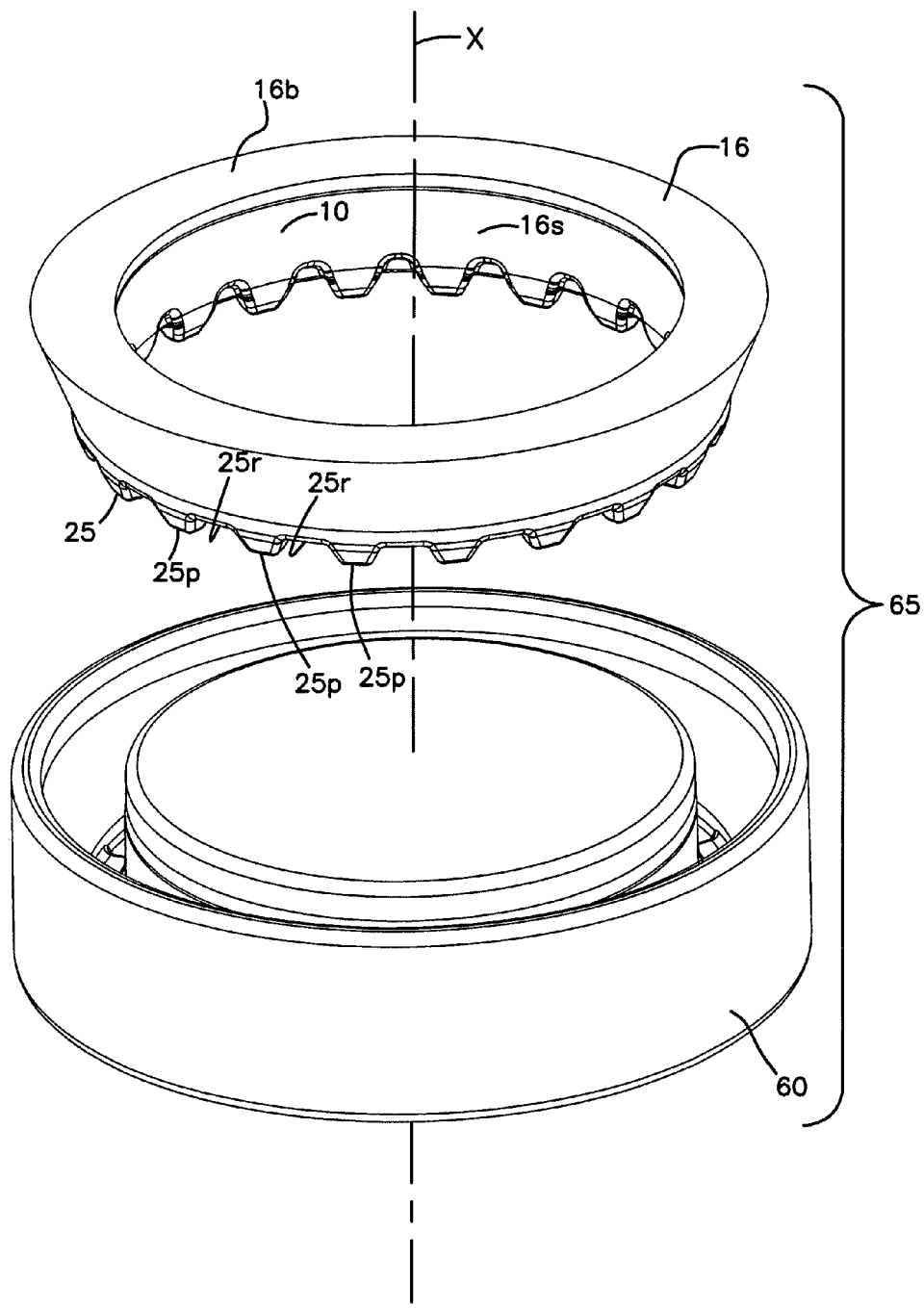

As discussed previously, in a typical application of preferred principles according to the present disclosure, the cartridge 1 will be made in a process that involves preforming the seal arrangement 16 before it is positioned on the cartridge 1 (and in engagement with the end piece 8). In FIGS. 13 and 14, a process for forming (i.e., preforming) such a seal arrangement (or preform) is depicted schematically.

Referring to FIG. 13, a schematic cross-sectional view is provided of a mold or mold arrangement 60 having a resin arrangement 61 positioned therein. The resin arrangement 61 comprises a resin from which the seal 16 would be formed. The process depicted in FIG. 13 is an "open mold" process, in which the seal member 16 is formed from a resin 61 poured into an open mold and then allowed to cure. It is to be understood, however, that the processes described can be applied in a closed mold process. Thus, the seal member 16 can be formed from a free rise process or it can be formed from an alternate process, such as, for example, an injection mold process or through other techniques.

Typically, the seal member 16 will be formed from a resin that increases substantially in volume, during cure, for example at least 50% usually at least 60%, often 70% or more, in many instances at least 80%. Typically, the seal member 16 will be molded from a foamed polymer, such as a foamed polyurethane. Example useable materials are those as described above.

An advantage to forming seal member 16 from a resin that increases in volume during cure, which typically forms a foamed component, is that the resulting seal member will be compressible, i.e., it can be compressed as a resilient member between structure when it forms a seal and to conform to a surface against which it seals. Such materials will sometimes be characterized as "soft" since relative to structural supports against to which they are compressed, they are soft materials. Thus, typically and preferably, the seal member 16 previously discussed comprises a portion of a soft, compressible, member that is formed from a foamed resin during cure.

In FIG. 14, a step 65 of removing a molded seal ring 16 (or preform) from mold 60, after the resin 61 has sufficiently cured (FIG. 13) is shown. Referring to FIG. 14, seal 16 can be seen as having an end 25 comprising projections 25p separated by recesses 25r. Further, the seal 16 can be seen as having a seal surface section 16s configured for engagement with a housing feature, in a releaseably sealing manner. The surface section 16s for the seal 16 depicted, surrounds a central aperture 10 and axis X, because the particular cartridge, for which the depicted seal member 16 is configured, has a radially inwardly directed seal.

Still referring to FIG. 14, seal 16 (or preform) includes a base end 16b which is an end opposite end 25 that comprises a portion directed toward the media pack end 3, FIG. 5, in the resulting cartridge 1.

Figure 15:
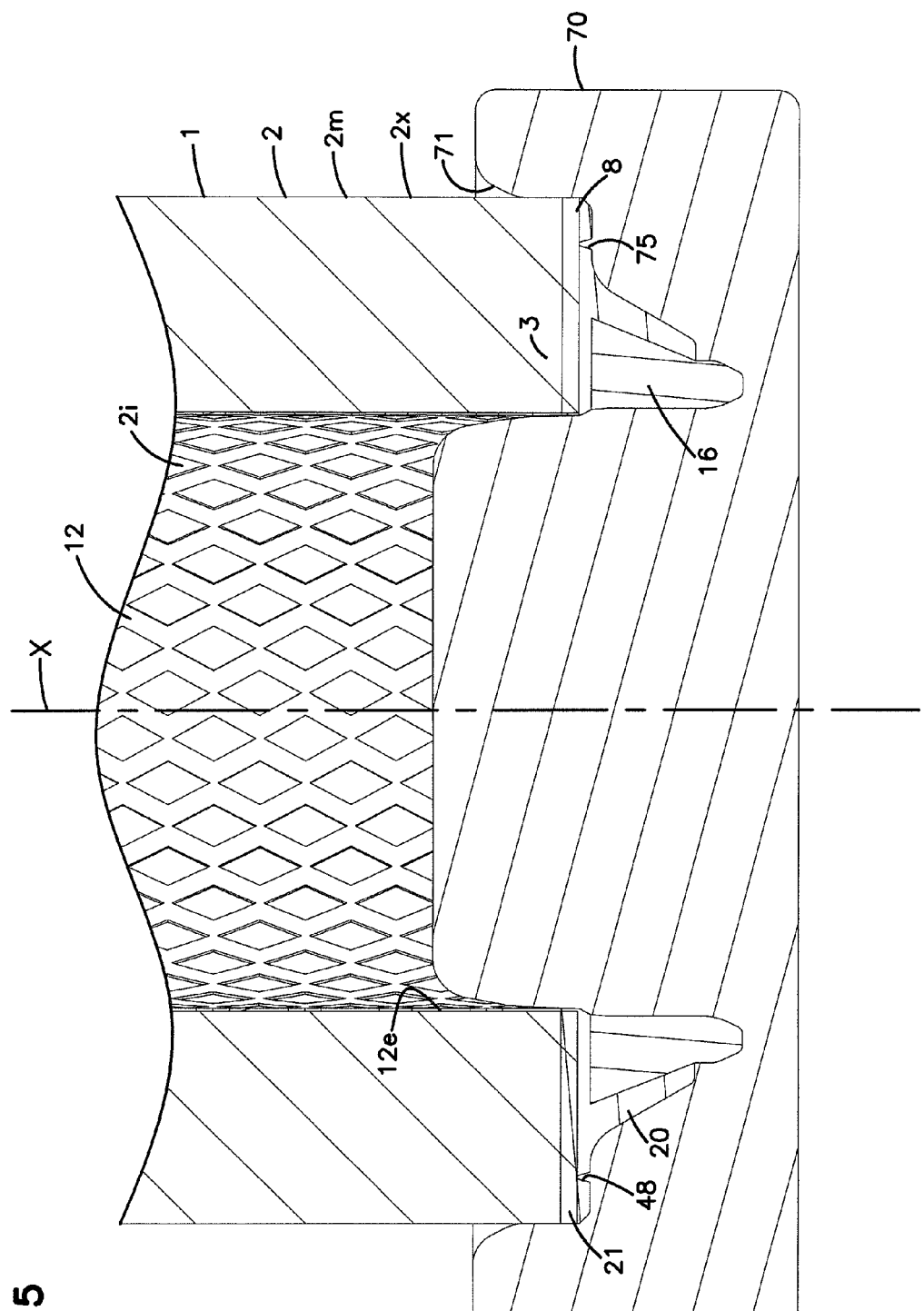

In FIG. 15, a step of forming end piece 8 using preformed seal member 16 is shown schematically, and in cross-section. Referring to FIG. 15, a mold 70 is depicted, having a mold cavity 71. Within the mold cavity 71, a preformed seal member 16 is positioned as a preform. Typically, after positioning of the preformed seal member 16, a resin will have been poured into the cavity 71, which resin is appropriate for forming end piece 8, i.e. sections 20 and 21. Typically, next, end 3 of the media pack 2, including an end 12e of optional liner 12, will be put into the mold cavity 71, to be engaged by the resin forming end piece 8 during cure. The resin can flow into and engage the media 2m and liner 12, securing the construction together, as sections 20 and 21 are formed. Further, if the resin 8 is chosen from a material that will fully engage and adhere to the seal ring 16 along an interface between the two, the seal ring 16 will be well secured in place, non-removably. Typically, it is desirable to form the seal ring 16 and the molded-in-place portions of the end piece 8 from chemically similar materials, for example both could be formed from urethanes which differ from one another with respect to density, hardness or amount of foam. Typically, end piece 21 will have an as molded density at least 0.08 g/cc greater than the seal 16, usually at least 0.2 g/cc more. When urethane as described above is used for the seal ring 16, it will be particularly convenient to choose a urethane for forming support 20 and end piece 21 which has a density of typically at least 35 lbs./cu.ft (0.4 g/cc) and often at least 40 lbs./cu.ft. (0.46 g/cc), for example 45-55 lbs./ cu.ft. (0.51 g/cc-0.63 g/cc) inclusive; and/or, a hardness Shore A of at least 30, typically at least 35 an often at least 40 and usually not more than 75; for example 40-70, inclusive. Typically, such a resin, if it increases in volume during cure at all, increases relatively minimally, i.e., not greater than 30% typically not greater than 20% and often not greater than 15%.

Typically, the order of inserting components and materials into the mold is not critical, except to manage the desire of forming the end piece and support to the media and seal member, securing the two together.

In FIG. 15, a media support 75 is shown, against which the media 2m or media pack 2 rests, during molding of end piece 8. The media support 75 will leave to artifact 48 as discussed above, in the end piece 8. Typically, the media support 75 is sized and configured so at least a thin region of end piece 8 will form thereover, to avoid a formation of a weak point or region.

Still referring to FIG. 15, the process depicted and shown is of an "open mold" curing process. An open mold process will be typical since the media pack 2 (including liner 12) can project outwardly from mold cavity; and, the resin needs to flow into the media end, for example around pleats (if pleated media is used) to ensure good sealing of the end piece in extension across the media 12.

Figure 16:
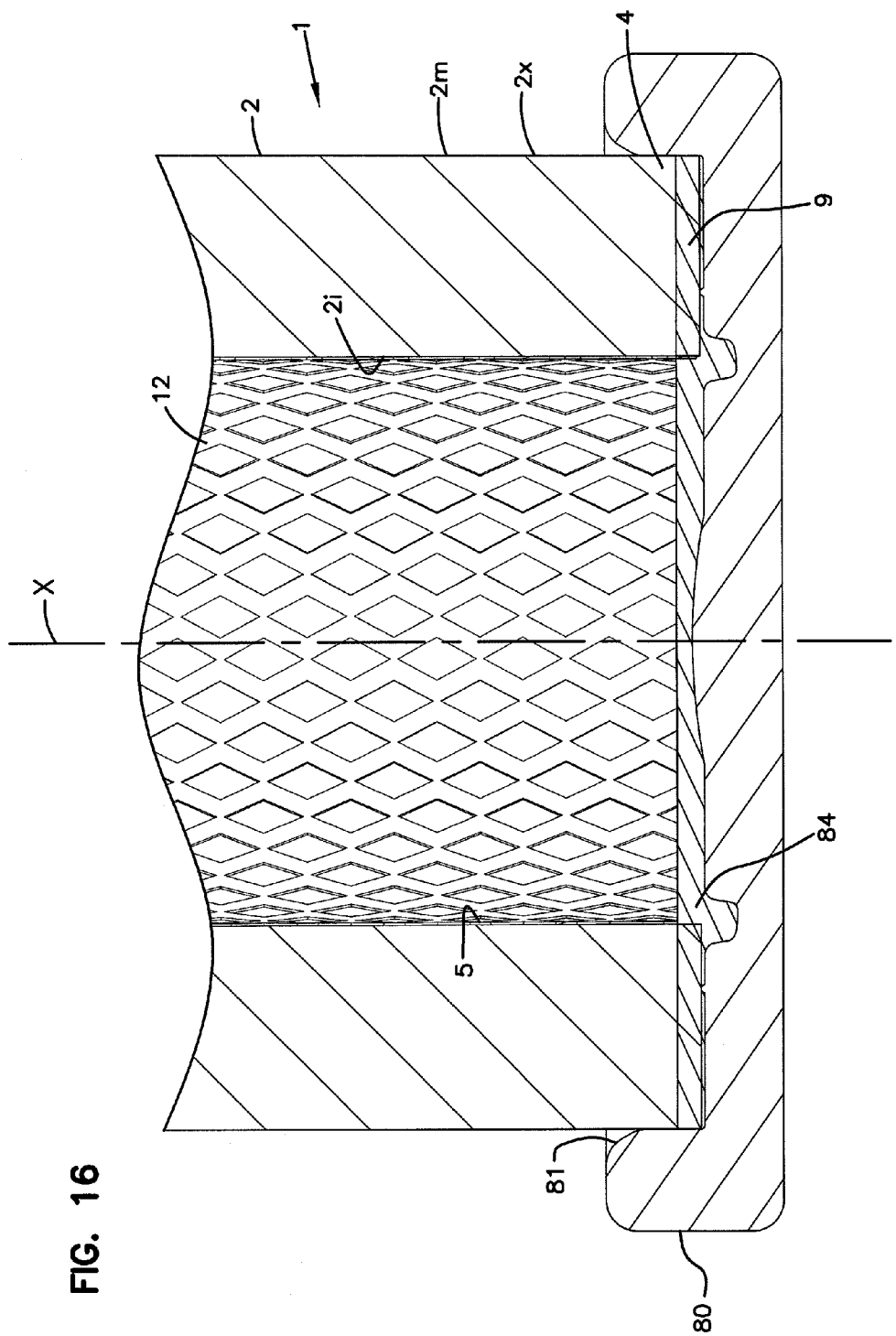

In FIG. 16, a schematic depiction, in cross-section, is provided of a step of forming end piece 9. Here, a mold 80 is depicted having a mold cavity 81. Within the cavity 81 is positioned a resin 84 that will cure to form end piece 9. Also positioned within the cavity 81 is an end 4 of the media pack 2 (including an end 12y of the liner 12). When cured, resin 84 will form an end piece 9 secured in place and securing liner 12 and media 2m together in an appropriate manner. It is noted that since the end piece 9 is closed, the resin 84 is distributed within the mold cavity 81 across open interior 5.

The end piece 9 can be constructed of a variety of materials, and can be formed with either a hard (by comparison to the seal member 16) construction or a soft (by comparison to the seal support 20) construction as desired. For the particular process depicted in FIG. 16, a material that will form a relatively hard construction, such as a material similar to that used for forming end piece 8, is used. However, a softer material (like seal construction 16) may be preferred for a cushion effect.

It is noted that in FIG. 16, the mold process depicted is an "open mold" process. An open mold process will be typical and preferred, as it allows portions of the media 2m and optional liner 12 to project outwardly from the mold.

Figure 17:
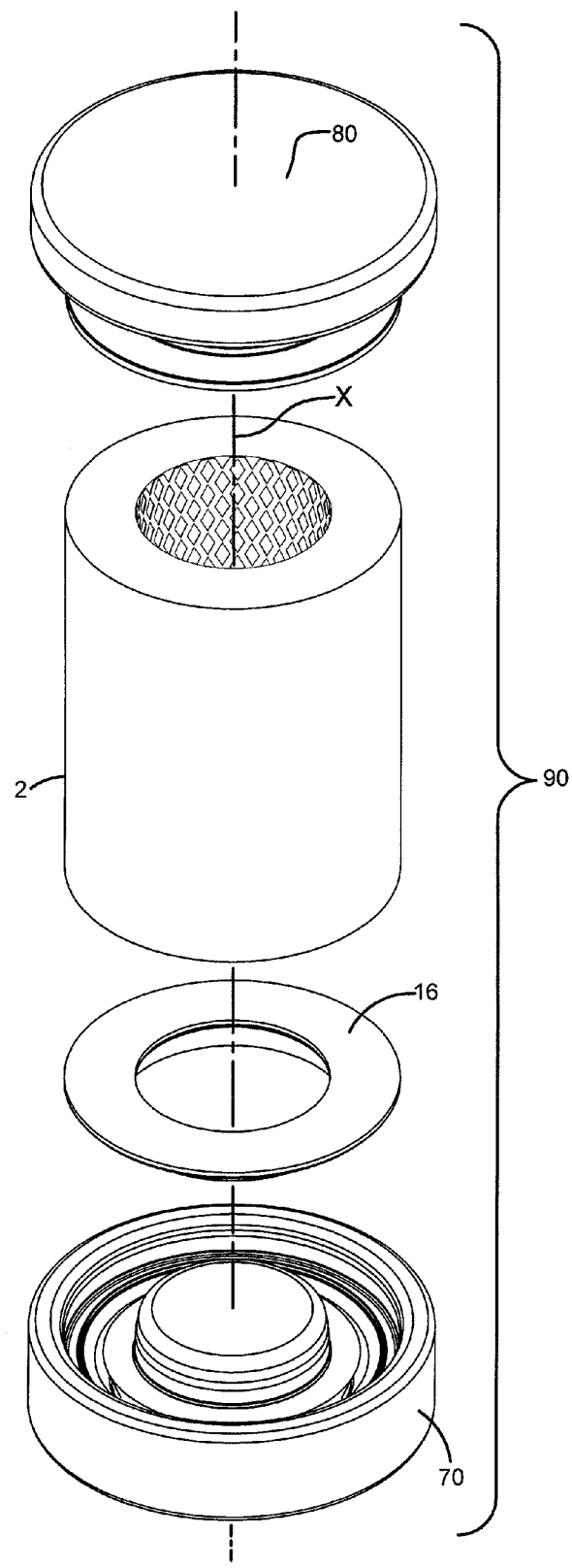

In FIG. 17, at 90, an exploded view is shown of materials related to construction of a cartridge 1 according to the present disclosure. It is not to be suggested by FIG. 17, that the components would be constructed and used in the orientation shown, merely that these materials are used to construct the cartridge 1.

It is not critical to obtaining a desirable cartridge 1 whether the end piece 8 or the end piece 9 is the first end piece formed. Various orders can be used in a process according to the present disclosure.

III. Selected Alternative Constructions; Features

Figure 18:
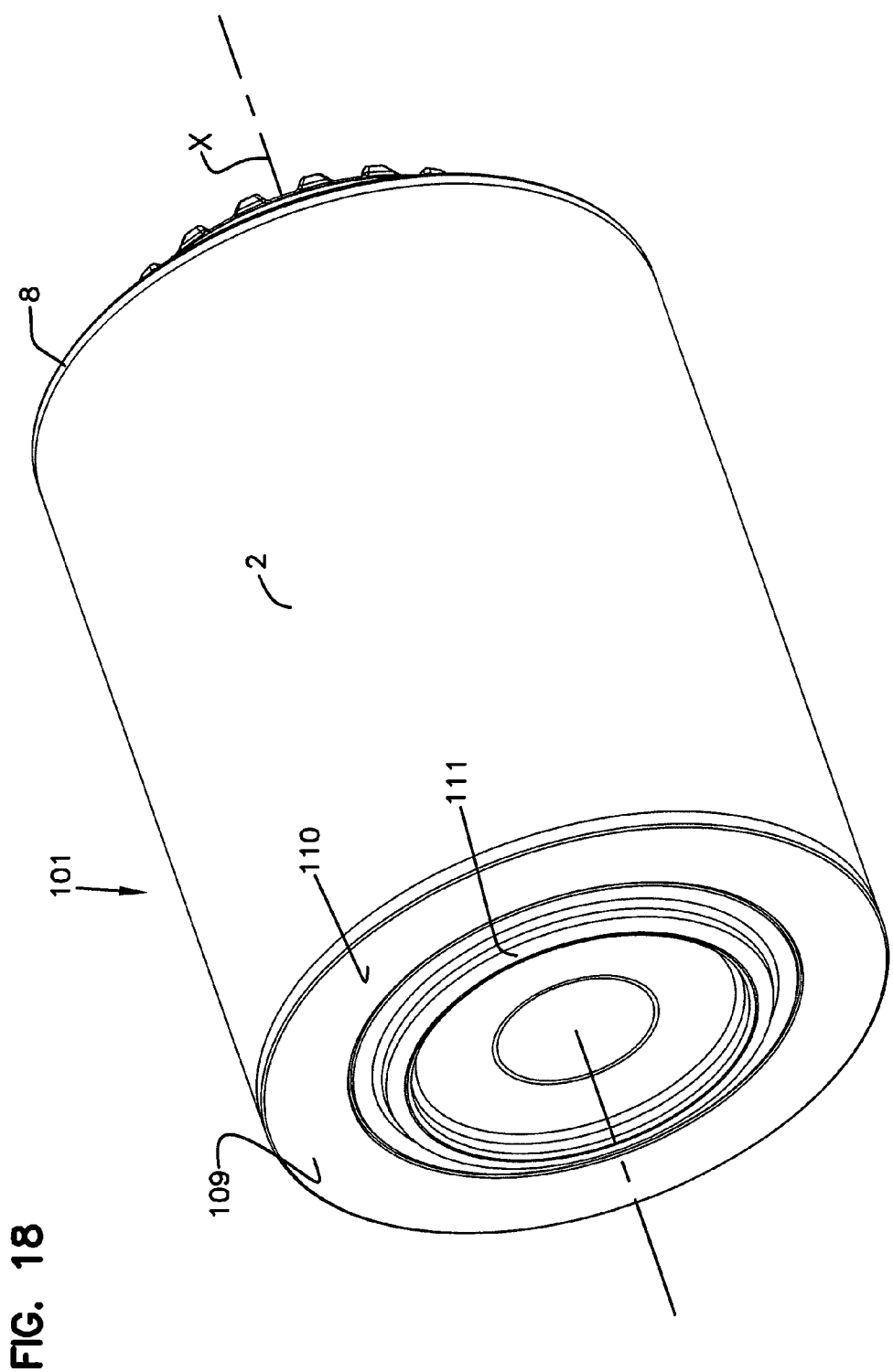
Figure 19:
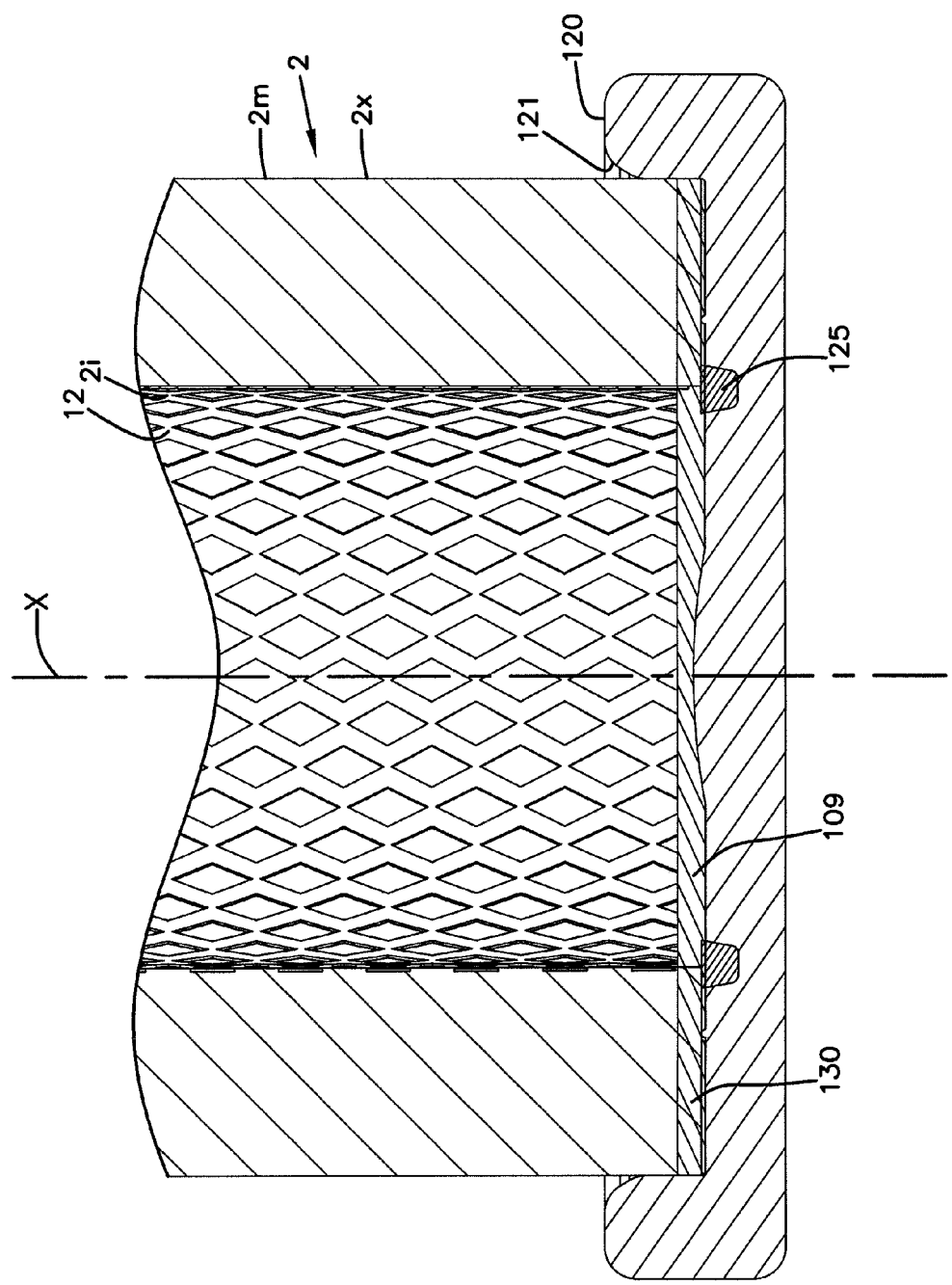

In FIGS. 18 and 19, an alternative closed end piece to end piece 9 is depicted. Referring to FIG. 18, a cartridge 101 is depicted. The cartridge 101 may be generally analogous to cartridge 1, except for selected construction of a closed end piece. Thus, cartridge 101 comprises media pack 2, first end piece 8 and second piece 109; the example second end piece 109 being a closed end piece. The second piece 109 comprises a molded-in-place section 110, having secured thereto a preformed compression ring 111. This construction allows the end piece 109 to have a composite construction, in which, for example, region 110 can have a first density or hardness; and, compression ring 111 can have a second or different density or hardness. Typically, when this approach is used the ring 111 will be softer and less dense, than section 110. A method for constructing such an arrangement can be understood by reference to FIG. 19.

Referring to FIG. 19, a step of molding end piece 109 is shown. Here, the media pack 2 (including optional liner 12) is inserted into a cavity 121 of a mold 120. Also, within the mold 20, is provided a preformed cushion or ring structure 125. A typical process would involve putting a preformed ring 125 in the mold 121, pouring a resin 130 appropriate for forming an end cover 110, and then inserting, into the mold, ends of a liner 12 in media 2m. As the resin 130 cures, it will secure the compression ring 125 to the remainder of the cartridge. A typical approach would be to use a related chemical (such as urethane) for both the resin 130 and the preform ring 125, formulated to cure at different densities and/or hardnesses. For example, the ring 125 could be formed from a resin similar to that used for the seal ring 16, and the resin 130 can be a resin similar to that used for the hard regions 20/21 of end piece 8 discussed above.

IV. Selected Example Features and Advantages

A. Configuration of Selected Portions of Seal Member 16 that Engage a Housing Seal Member and are Compressed Radially, During Installation Attention is now directed to FIG. 10. From a comparison of FIGS. 5 and 10, it can be understood that seal member 16 includes a seal surface portion 16s that engages a selected housing portion during use, to form a seal. For the particular example arrangement depicted, surface 16s is a radially inner surface of seal member 16. However, again, in an alternate embodiment in which the seal is radially outwardly directed, the surface portion 16s will be a radially outer portion.

The seal surface 16s preferably includes an extended section that engages the housing member to form a seal, which is devoid of any projection bump or step therein along a length of axial extension of at least 6 mm, typically at least 10 mm and often at least 12 mm, for example 12-20 mm, inclusive. This length of extension is at least a portion of the region shown in FIG. 5, where indicated by dimension XA. Thus, preferably, surface 16s in this region is smooth and without substantial surface disruption.

Preferably surface 16s along the same region of extension, i.e. the portion that forms a seal with a housing seal member, extends nearly parallel to central axis X, typically with only a minor angle therein, for example as a draft angle provided in the molded configuration during formation to facilitate de-molding, from a process such as shown in FIG. 13 and discussed above. Such an angle will typically be not greater than 2°, typically not greater than 1°, for example about 0.2°-0.7° Stated with respect to a plane perpendicular to the axis X, typically the angle is not less than 88° usually not less than 89°, often 89.3-89.8°. For the view shown in FIG. 10, the draft angle would be the slant (typically inwardly) in extension between about region F and region G.

If the seal member 16 were configured as an outwardly directed seal, it would be a slant (typically outwardly) between analogous regions.

The particular end piece 8 depicted is shown with a radial inward chamfer or boot section 21*b* adjacent base 16*b*, FIG. 10. The boot section 21*b* provides stability for end 16*b* and for engagement with liner 12.

Still referring to FIG. 10, it is noted that in extension axial toward media pack 2, along the seal section 16*s*, as a result of the thickness of the seal region 16 and the slant of the support wall 20*i*, the amount of material in the region 16 becomes progressively thicker in extension in a direction between locations F and G. Typically, the seal 16 is configured to be at least 5 mm, often at least 9 mm thick, typically at least 7 mm thick, usually 7-18 mm thick and usually not more than 20 mm thick, at an axial location of engagement during sealing most remote from the media pack 2, for example at about F; and, the seal material 16 is configured to be at least 9 mm thick, typically at least 15 mm thick; and, usually at least 4 mm thicker (typically at least 5 mm thicker) at a location adjacent region G, i.e. adjacent a portion of surface 16*s* that forms a seal most closely positioned adjacent media 2, axially, relative to region F. The dimensions indicated in this section are meant to be when the material of region 16 is in a relaxed state, i.e., when the cartridge 1 is not installed.

Typically, the compressibility of material of the seal member 16 is relatively constant throughout. Thus, if the structure around which seal surface 16*s* is of relatively little taper, relative to central axis X, as the cartridge 1 is positioned, the highest amount (99.9% of thickness) of compression will occur initially in region F, and as further insertion occurs, the force that is needed to move the cartridge 1 increases relatively slowly, since the material of the seal member 16 has a greater radial distance over which to compress, with the total amount of compression in the region indicated at XB, FIG. 5, as measured by mm of displacement of seal member 16 radially, remaining relatively constant.

Also, since in the region G, the seal material 16 overall is not compressed as much (99.9% of thickness) as in region F, the cartridge at end piece 9 can be rocked relatively easily, to facilitate disengagement of the cartridge 1 with the housing, during servicing. That is, as the cartridge 1, when installed in a housing is grasped for dislodging, material in region G, which is not as compressed as in region F, allows the cartridge to easily be rocked, with the material in region G being alternately, compressed and released, during the rocking. This is desirable, to facilitate removal of the cartridge.

Further, during installation, the greatest amount of compression in the seal (99.9% of thickness), during installation, will be in region F. As further insertion occurs, when the material of member 16 is deflected by the structure against which it is compressed, through its thickness, the shape of support 20 allows the member 16 to absorb the compression over a wider radial range, resisting further compression during installation to a lesser degree than the initial compression. This facilitates installation, to advantage.

B. Advantages Relating to Molding the End Piece from a Relatively Hard Material that does not Rise Substantially During Cure In preferred applications of the techniques described herein, the end cap piece material that forms the end cap section 21 and the support section 20 is a relatively hard material that does not increase in volume substantially during cure. As indicated, preferably it is a material that, if it increases in volume at all, does not increase in volume more than 30% preferably not more than 20%, most preferably no more than 15%. Advantages are obtained from this. These can be understood in part by reference to the FIG. 10.

In particular, adjacent the media pack outer perimeter 2*x*, the end piece 8 needs to fully encompass the media 2, to ensure end cap sealing. However, it does need to project radially outwardly from the media pack 2*x* substantially. Typically, when a free rise, highly foamed, urethane or similar material is used to mold the end piece 8 in place, there will need to be an allowance for a substantial expansion of the material radially outwardly from the outer perimeter 2*x*. However, when a relatively low free-rise, low volume increase, material is used, there will not need to be substantial expansion of the material radially outwardly from the outer perimeter 2*x* of the media. Typically, in a preferred material as characterized herein, is used, the amount of radial reach or extension of the end piece 8 radially outwardly from adjacent portions 2*x* of the media pack is no greater than 2 mm, typically no greater than 1.5 mm, and often no greater than 1 mm. Advantages from this relate in part, to advantageous use of media volume. That is, within the same cartridge perimeter volume, the media pack can have a large radially outer reach, which means more media is present. When more media is present, the net result is the ability for a longer cartridge life within the same volume; or, the use of a smaller volume to obtain the same cartridge life.

A similar observation can be made with respect to the end piece 8 adjacent the inner perimeter 2*i* of the media pack. Here, generally, the radial extension inwardly adjacent the media pack 2*i* is no more than 2 mm, typically no more than 1.5 mm and often no more than 1 mm. Again, this results in efficient use of media pack volume and related advantages identified above.

It is noted that with respect to the radial outward dimension and radial inward dimension of the end piece 8, reference was made to adjacent portions of a media pack 2. This would relate to any adjacent portion of the media pack, i.e. for example the combination of the media and any liner present. In the example depicted, at the outer perimeter 2*x* no liner is present, so the dimension is also with respect to the media 2*m*. At the inner perimeter 2*i* a liner 12 is present, so the reference is meant to a dimension radially inwardly from the liner 12.

V. Example Variations and Features; FIGS. 20-46

Herein above, in connection with FIGS. 1-19, example embodiments are described, in accord with features and principles discussed and described in general herein, and as characterized in U.S. Ser. No. 13/833,002, filed Mar. 15, 2013 and/or U.S. Ser. No. 61/728,091, filed Nov. 19, 2012, each of which is incorporated herein by reference. In this section, some additional examples are presented and described in connection with FIGS. 20-46. The specific depictions of FIGS. 20-46 were not included in U.S. Ser. No. 13/833,002 and U.S. Ser. No. 61/728,091. However, the features and descriptions, as will be apparent from the following characterizations, are consistent with those described in U.S. Ser. No. 13/833,002 and U.S. Ser. No. 61/728,091. Indeed, the same features, variations, preferences and alternatives characterized for FIGS. 1-19, and the disclosure of U.S. Ser. No. 13/833,002 and/or 61/728,091 are applicable, with appropriate adjustments in detail, for application with respect to the variations of FIGS. 20-46, whether or not specifically characterized as such herein in connection with those figures.

A. Example Outwardly Directed Radial Seal, FIGS. 20-21

Figure 20:
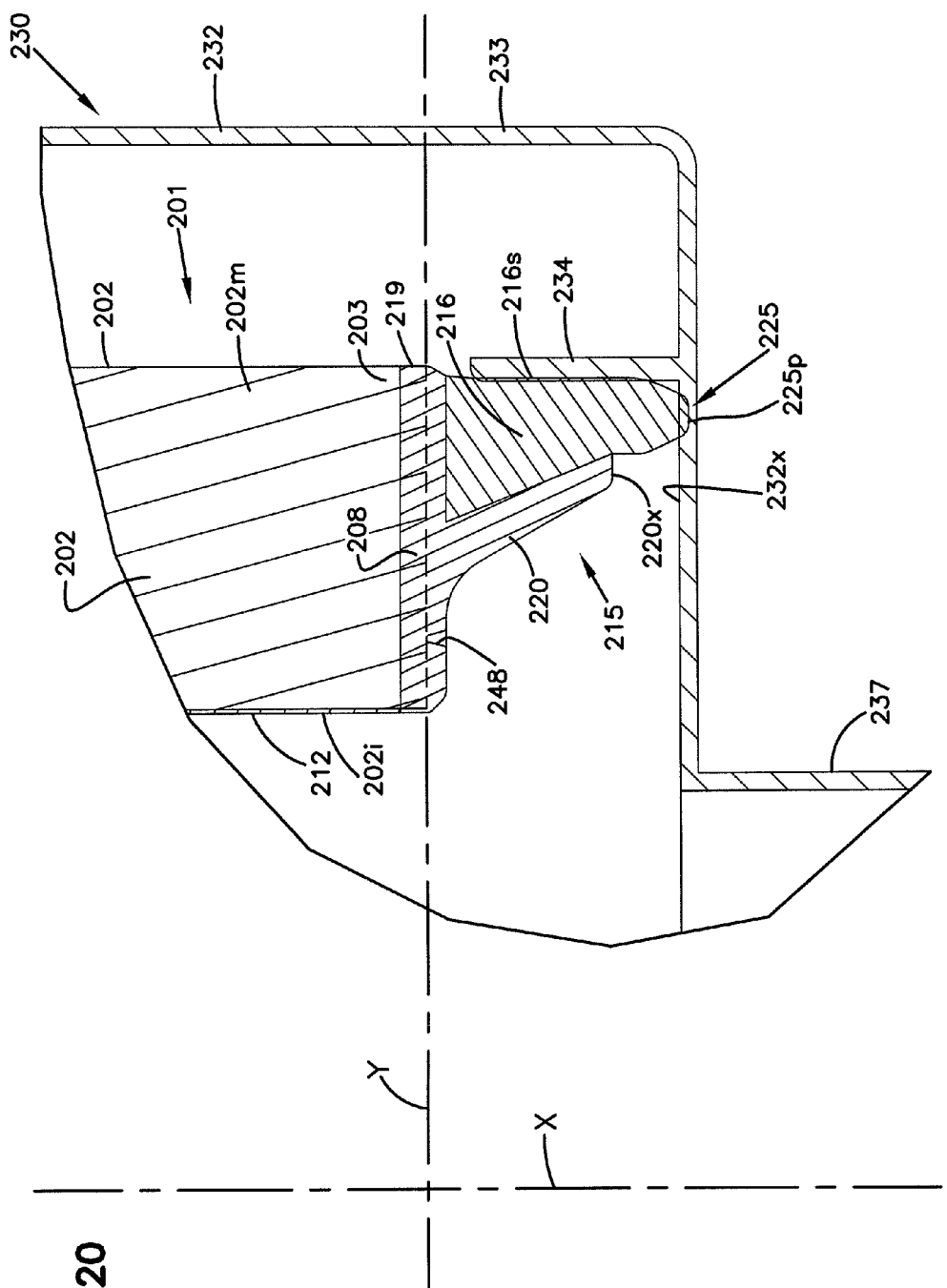
FIGS. 20-46 are not found in the priority documentation of U.S. Ser. No. 13/833,002, filed Mar. 14, 2013 and/or earlier U.S. provisional Ser. No. 61/728,091, filed Nov. 19, 2012.
Figure 21:
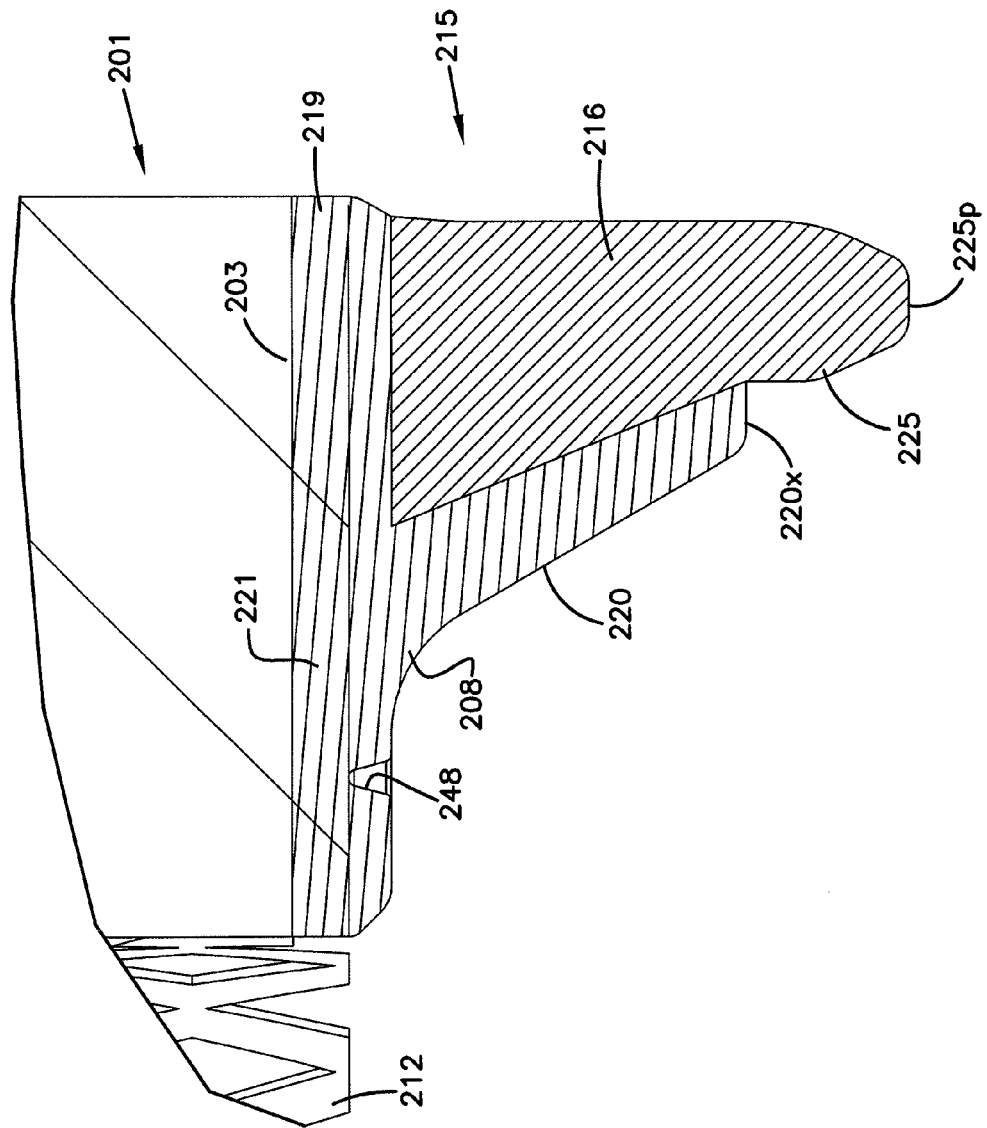

Herein above and in U.S. Ser. No. 13/833,002, it was specifically and repeatedly stated that the principles of the present disclosure can be applied in connection with a radially outwardly directed seal. In FIGS. 20 and 21, examples of such arrangements are depicted.

Attention is first directed to FIG. 20. Here, a schematic fragmentary cross-sectional view is depicted of a filter cartridge 201 depicted in sealing engagement with an air cleaner housing 232 of an air cleaner assembly 230.

The housing 232, then, includes a housing body portion 233. Of course, it would include an access cover analogous to access cover 34, not depicted. At 237, a flow tube is provided, for flow access with interior 232i of housing 232. For the example depicted, flow tube 237 would be an outlet flow tube for filtered gas (air) but alternate constructions are possible. When flow tube 237 is an outlet tube, the filter cartridge 201 would be configured for out-to-in flow during filtering, as characterized herein above for the embodiment of FIGS. 1-19.

The cartridge 201 depicted includes a media pack 202 that includes an optional intermediate support or liner 212 around which media 202m, of the media pack 202 is positioned. The optional intermediate support 212 can be as otherwise characterized herein.

In general, the cartridge 201 can be analogous to cartridge 1, except configured for an outwardly directed radial seal as characterized. Specifically, the example cartridge 201 includes, thereon, a housing seal arrangement 215 shown sealed against a surrounding seal ring 234 in the housing 232 with a radially outwardly directed engagement. That is, the housing seal ring 234 surrounds the seal arrangement 215, a distinction from the arrangement specifically depicted for cartridge 1. It can be provided as a preform, consistent with previous descriptions.

Referring to FIG. 20, the housing seal arrangement 215 includes a housing seal (resilient typically compressible material or ring) 216. The resilient material can be as characterized as previously for the arrangement of cartridge 1.

In FIG. 20, a central axis X for the cartridge 201 is shown. At Y a plane perpendicular to the central axis X is shown. The media pack 202 extends around the axis X, defining an interior 202i. The media pack 202 can extend cylindrically, with a circular cross-section, but alternatives are possible. For example, an oval configuration is possible. Also, whether circular or oval or some other shape, a tapering construction for the media is possible. For example, the media pack 202 can be configured to taper downwardly in outer dimension, in extension away from end 203.

Analogously to the arrangements of FIGS. 1-19, because the seal member 216 is typically formed from a compressible/resilient material, it is desired to provide the seal arrangement 215 with a seal support. Cartridge 201 includes such a seal support, as indicated at 220. The seal support 220 is relatively rigid (by comparison to seal member 216) and provides structural radial support for the radial seal member 216 to ensure integrity of the seal member 216 and to provide structure against which the seal member 216 is radially compressed, in the example radially inwardly toward axis X) when the seal member 216 is radially engaged with a housing seal member 234. As with the previously described embodiment, the particular seal support 220 depicted as preferably a structure that cannot be removed from the cartridge 201 once thereon. This is also preferably the case with respect to the seal member 216. For the example depicted, the seal support 220 comprises an integral portion or section of an end cap 208 (or end piece 219) along with end cap section 221. Analogous dimensions and seal surface features to those described above for seal 16 can be applied for member 216.

Typically, the only portion of end cap 208 which forms a seal with housing member 234, is seal member 216, at seal surface 216s, again shown configured to form a radially directed seal. That is, preferably no portion or material on end cap 208 (other than seal member 216) is positioned to form a seal of any type with the housing 232 when cartridge 201 is installed.

Except for direction of extension, typically the seal support 220 can be analogous to seal support 20. Thus, it is preferably a continuous and solid wall member in extension around central axis X.

Still referring to FIG. 20, it is noted that the seal support 220 is not positioned around the member 216 to provide the exact same type of protection during handling to shipping, as the seal support 20, FIG. 1. However, support 220 is a relatively rigid member against which compressible member 216 is positioned, and thus provides some protection during handling and shipping as well as advantage in sealing.

When the cartridge 201 is installed in the filter assembly 230 for use, a first end of the cartridge 201, at which a seal arrangement 215 is positioned, is against an end wall 232x of the housing 232. It is preferable that this engagement have a resiliency, for stable support of the cartridge 201 during equipment operation. This is analogous to the description with respect to cartridge 1 above, and analogous dimensions and features can be used. To provide for this, cartridge 201, analogously to cartridge 1, includes an axial cushion arrangement 225 positioned on end piece 208 at an location further axially remote from media end 203 than any other portion of end piece 208. Although alternatives are possible, the example cushion arrangement 225 depicted is integral with the resilient compressible member that forms seal member 216, and comprises the same material. The particular cushion arrangement 225 depicted projects axially beyond end 220x of seal support 220, analogously to cushion arrangement 25 described above. Further it preferably comprises a plurality of spaced projections 225p (which can be analogous to projections 25p) separated by recesses 25r) although alternative shapes are possible. It is noted that in FIG. 20, projection 25p is shown drawn in overlap with end wall 232x of the housing 232, and indicates the amount of cushioning or compression that would likely occur upon full installation.

Of course, opposite end cap 208, cartridge 201 would include another end cap, analogous to end cap 9 discussed above. It would typically be a closed end cap, although alternatives are possible. It can be formed analogously to previously described closed end caps herein.

In FIG. 21, a fragmentary schematic view of cartridge 201 is depicted, separate from the housing 232. Attention is directed to liner 212. The liner 212 is shown not embedded in portion 221 (FIG. 20) of end piece 208. However, a molded end cap section or boot analogous to boot 21b, FIG. 10 could be used, for embedding an end of the liner 212. For the example liner 212 depicted, the option of an expanded metal liner is depicted. As with earlier described embodiments, alternatives are possible.

In FIG. 21, groove 248 is viewable, which would be analogous to groove 48 previously described.

FIGS. 20 and 21 are intended to indicate an example of features that would typically result, if end cap arrangement is described in connection with FIGS. 1-19 were implemented with features allowing for an outwardly directed radial seal as opposed to an inwardly directed radial seal. Of course, alternate specific detail could be implemented. It is also noted that these drawings are meant to indicate alternatives in general principle, that could be applied with a variety of arrangements including the alternate cartridge arrangements described below in connection with FIGS. 22-46.

B. An Additional Example Embodiment, FIGS. 22-33

In FIGS. 22-33, drawings depicting features generally analogously to those of FIGS. 1-19 are provided, but in an alternate embodiment in detail. It is noted that the general features and principles, as well as features and example dimensions, may be analogous to those applied and/or described in connection with FIGS. 1-19. Further, the variations described above in connection with those figures can be applied. Also, analogous features to those discussed above in connection with FIGS. 20 and 21 could be applied in the embodiment of FIGS. 22-33, when an outwardly directed radial seal is intended.

Figure 22:
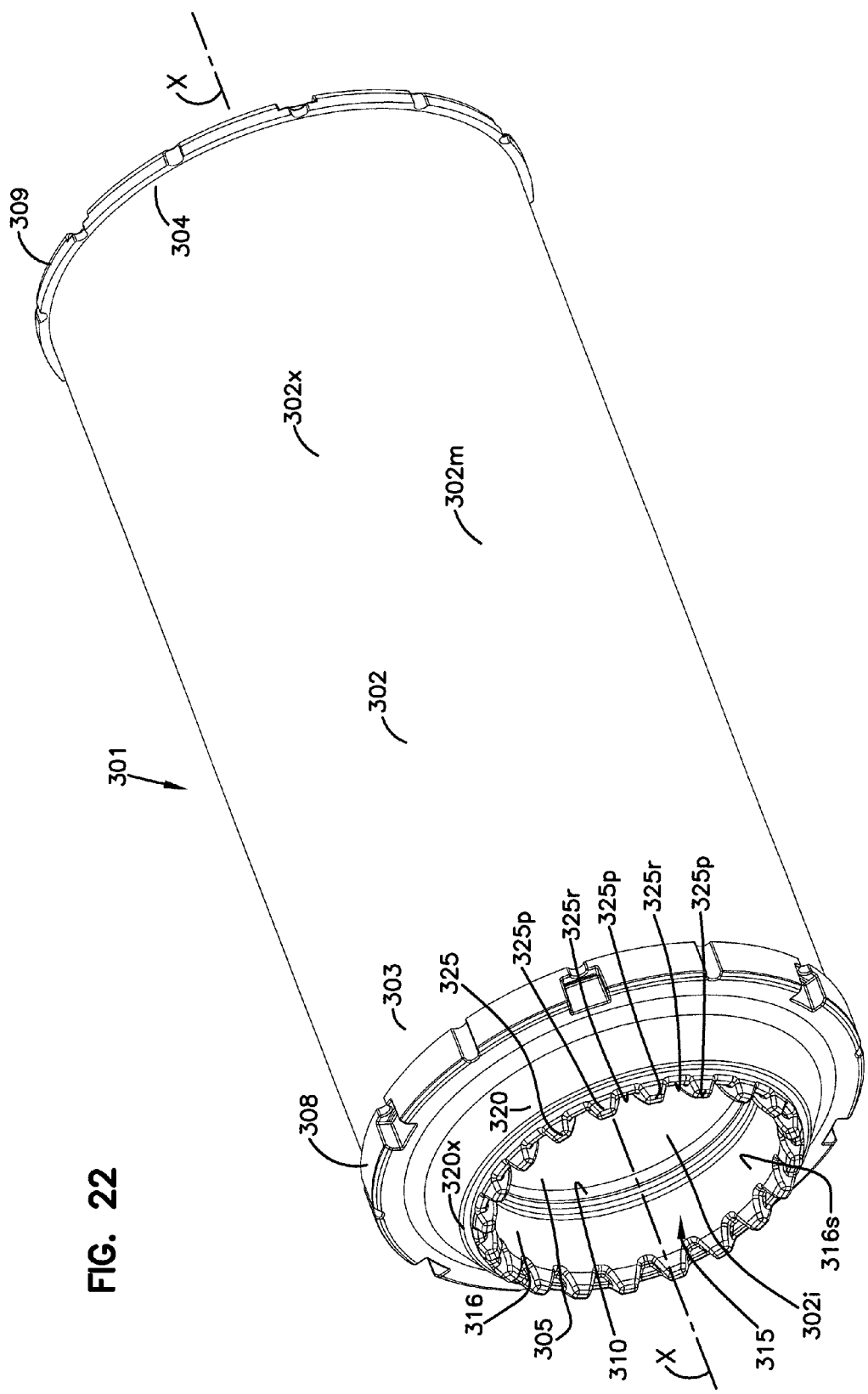

The reference numeral 301, FIG. 22, then, represents an alternative filter cartridge incorporating features according to the disclosure. The filter cartridge 301 comprises a media pack 302 including media 302m, extending between first and second media ends 303, 304. In the example, the media pack 302 is configured to extend around an open filter interior 305 and central axis X.

The particular filter cartridge 301 depicted, can be used with out-to-in flow during filtering, although alternatives are possible. Thus, it is configured for filtering as carrier fluid passage from exterior perimeter 302x to interior perimeter 302i during filtering.

The cartridge 301 depicted is configured with the media 302 extending between first and second end pieces 308, 309. The first end piece 308 is positioned on the first end 303 of the media pack 302 and generally comprises a "open end piece" i.e. the end piece 308 has a central opening 310 therein. When the cartridge 301 is configured for "out-to-in flow" during filtering, the central aperture 310 is an outlet aperture for filter fluid to leave the cartridge interior 305.

As is typical for many applications, the second end piece 309, positioned on the second end 304 of the media pack 302, is closed to passage of fluid therethrough, i.e. it is a closed end piece. Again, the principles described herein can be applied in different applications, however, for example those in which the end piece 309 is open or closed by additional structure.

The cartridge 301 depicted is not shown with an inner liner analogous to liner 12. However, such a liner could be applied with cartridges in accord with the present description. It is also the case as previously described, that if inner support to the media pack 302 is needed, it can be provided by a support within a housing, for example by a safety cartridge or other structure.

Referring still to FIG. 22, the media pack 302 depicted, is generally cylindrical. The principles described herein can be applied in alternate media packs including, for example, ones that taper in extension from end 303 to end 304; and/or, media packs that do not define a generally circular cross-section, for example, ones that define an oval cross-section).

Still referring to FIG. 22, the cartridge 301 includes thereon a housing seal arrangement 315. The housing seal arrangement 315 includes a housing seal 316 (typically a resilient compressible member 316) analogous to member 16, having a seal surface 316s and being positioned for releasable engagement with a portion of a filter assembly upon operation when installation of cartridge 301 for use. Materials similar to those described for member 16 can be applied, in an analogous described above applied.

Analogously to housing seal member 16, member 316 is configured for forming a "radially inwardly" directed seal. However the features depicted can alternately be applied with a "outwardly directed" seal, using variations of the principles analogous to those described above in connection with FIGS. 20 and 21.

The housing seal arrangement 316 can be formed analogously to seal arrangement 16 from similar materials, with similar shapes and dimensions, and can be positioned within an assembly or cartridge 301 in an analogous manner.

Analogously to seal member 16, the seal arrangement 315 is provided with radial support, by the seal support 320 analogously to seal support 20. Seal support 320 can be generally analogous to support 20 with respect to selected detail and variations described previously.

As described for previous embodiments, typically the only portion of end cap 308 which forms a seal with a housing member is the seal member 316 configured to form a radially directed seal. That is, again, preferably no portion of the material on end cap 308, other than seal member 316, is positioned to form a seal of any type with a housing member, when cartridge 301 is installed. Again, although alternatives are possible, as described for the seal support 20, seal support 320 is typically a continuous and solid member in extension around central axis X. Also, as previously discussed for cartridge 1, preferably when cartridge 301 is installed in the filter housing or assembly for use, a first end of the cartridge 301, in which the seal arrangement 315 is positioned, is pressed against an end wall of the housing. It is preferable that when this occurs, the engagement has resiliency. To provide for this, the cartridge 301, analogously to cartridge 1, includes an axial seal cushion arrangement 325 analogous to cushion arrangement 25. Cushion arrangement 325 is positioned on end piece 308 at a location further axially remote from the media end 304, end piece 309 and/or media pack end 303, than any other portion of end piece 308. This is typical, for advantage, but is not required in all instances. The example cushion arrangement 325 depicted is integral with a resilient compressible member that forms member 316, and typically comprises the same material. The particular cushion arrangement 325 depicted, projects axially beyond end 320x of seal support 320 and comprises a plurality of spaced projections 325p separated by recesses 325r.

Figure 33:
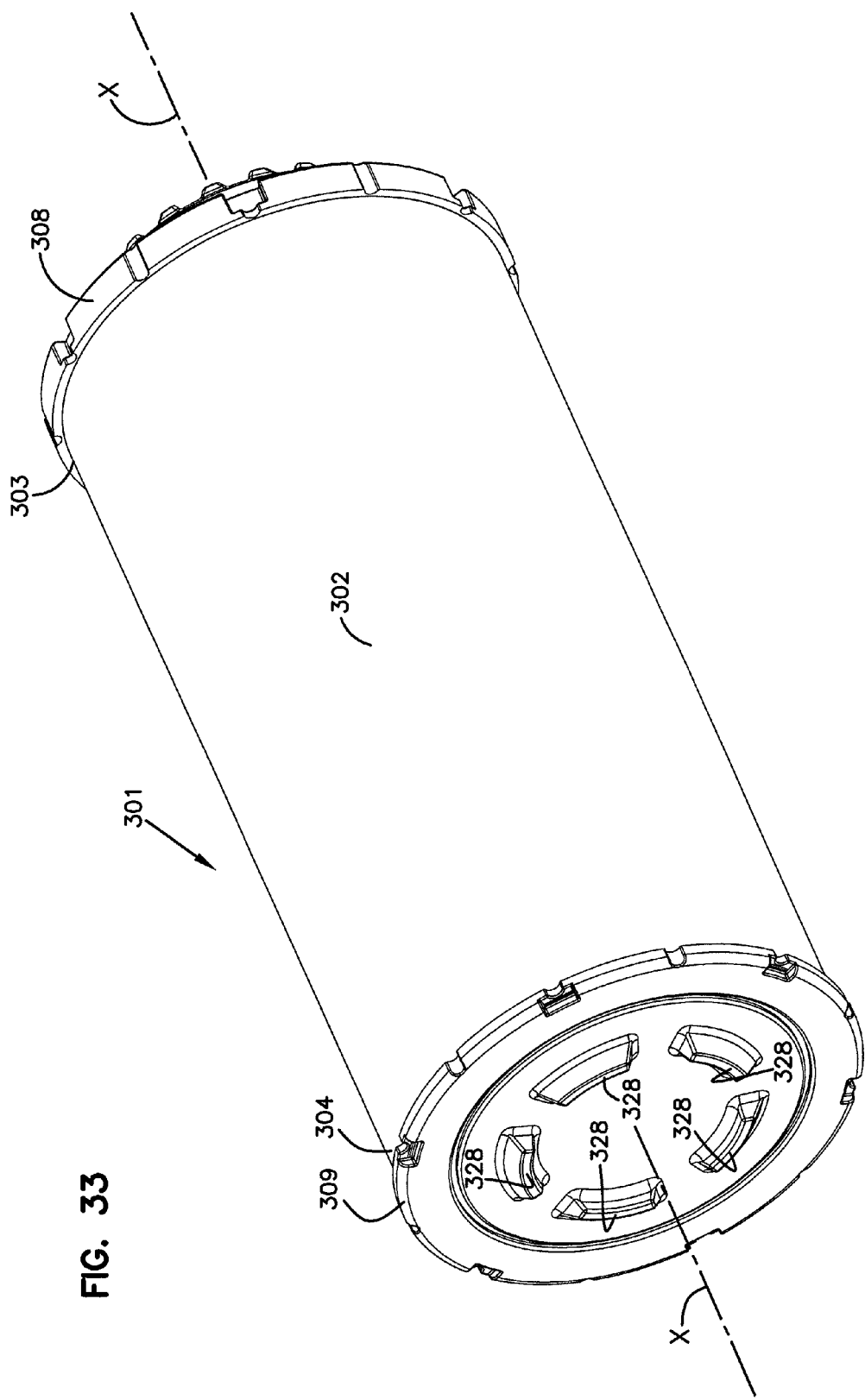

In FIG. 33, a perspective view of cartridge 301 is provided, directed generally toward end piece 309. Although alternatives are possible, the end piece 309 can be seen as comprising a closed end piece molded-in-place on end 304 of the media pack 302. An axial projection arrangement 328, analogous to axial projection arrangement 28, but different in detail, is shown configured for engagement with a portion of a housing during installation of cartridge 301. For the particular example, arrangement 328 comprises a plurality of spaced projections, although it could be continuous to arrangement 28.

Figure 32:
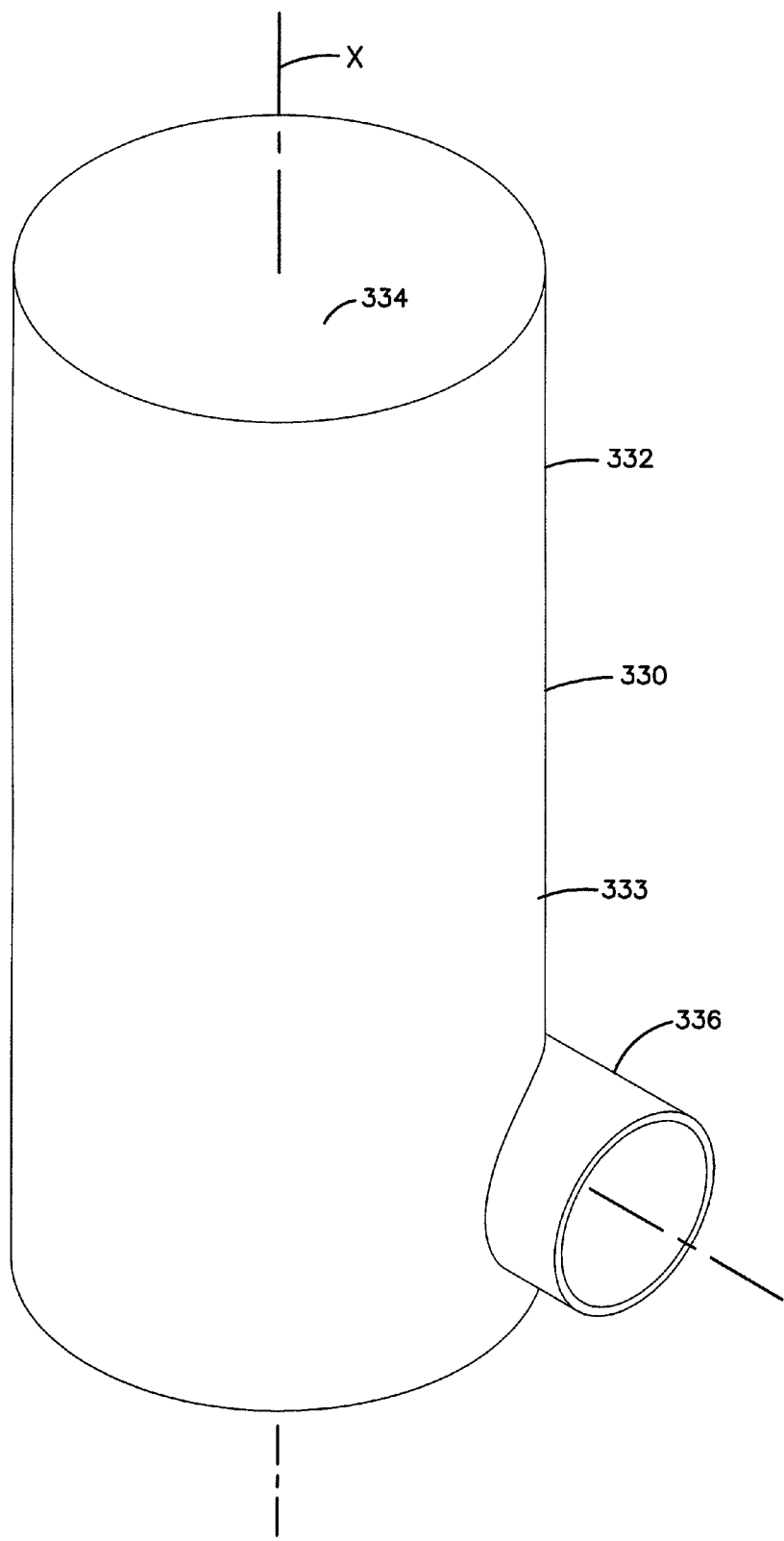

In FIG. 32, a schematic perspective view of an air cleaner assembly 330 for use with a filter cartridge in accord with cartridge 301 is provided. FIG. 32 should be understood to be schematic and a variety of specific housing features can be used. The filter assembly 330 depicted would typically be configured as an air cleaner assembly, but alternative applications are possible.

Referring to FIG. 32, the filter assembly 330 comprises a housing 332 comprising a housing body 333 and would typically include a removable access cover 334. The access cover 334 is not shown in detail, but typically would be removable from a remainder of the body 333. In general terms, upon removal of the access cover 334, an interiorly received cartridge 301 can be removed, or a cartridge 301 can be installed.

At 336, a (gas) flow tube is provided, allowing for flow access to an interior of housing body. The flow tube 336 depicted is an inlet tube, when the assembly 330 is configured for out-to-in flow through the cartridge during filtering. Of course, it could be an outlet flow tube, when an opposite flow direction is used.

Figure 31:
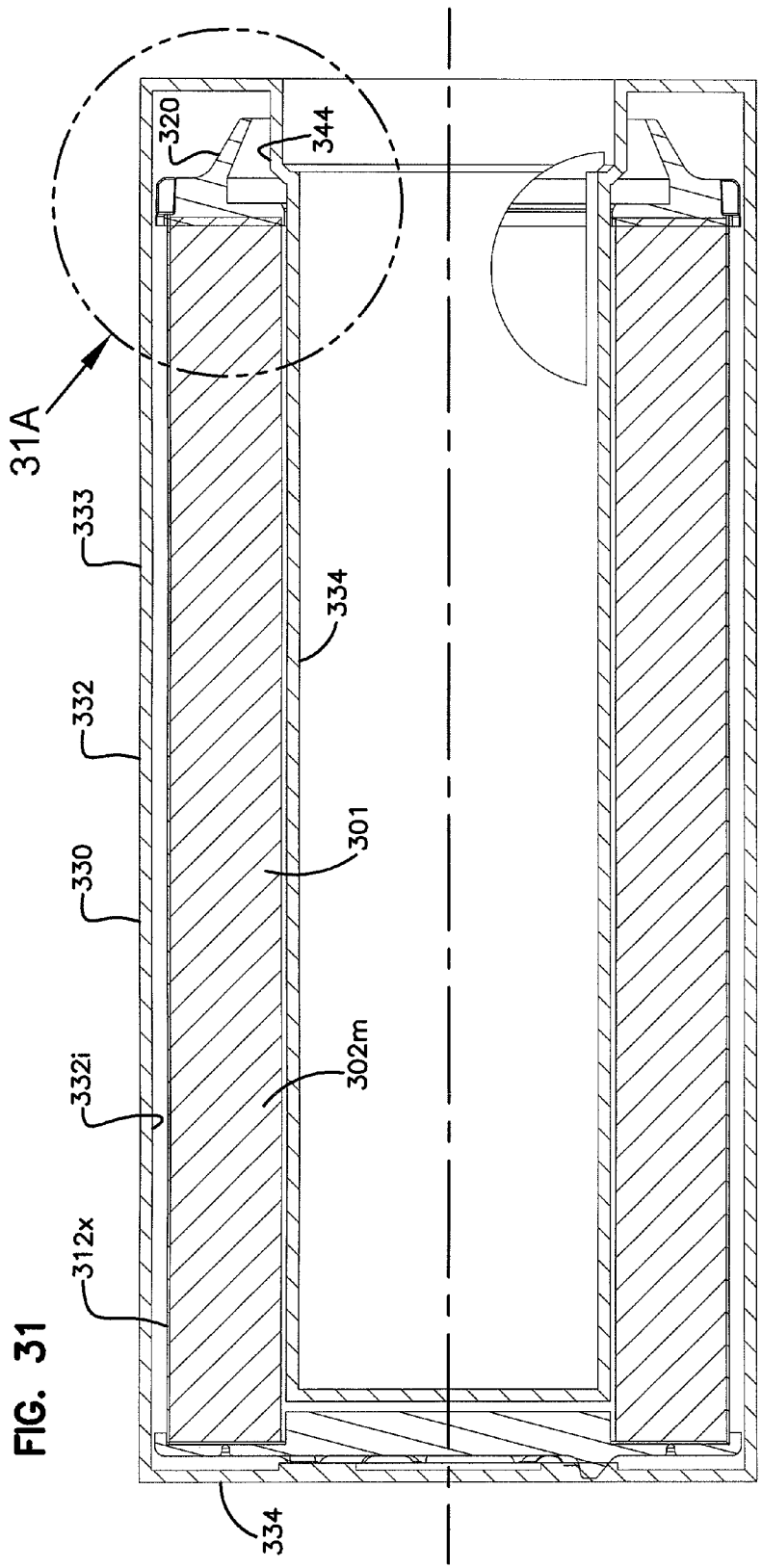

Attention is now directed to FIG. 31, a schematic cross-sectional view of filter assembly 330. Here cartridge 301 can be seen installed with an interior 332$i$ of housing 330. It is noted that cartridge 301 is depicted schematically, and without resilient member 316, FIG. 22 thereon. This is to allow internal detail to be seen. It is noted that the cartridge 301 would not normally be constructed without resilient member 316.

Referring to FIG. 31, it is noted that the assembly 330 includes a central cartridge support 334. This support 334 would typically be a porous support. Although alternatives are possible, for the example depicted the support 334 is positioned sufficiently closely to media 302$m$ so that an inner liner is not needed. The support 334 can be a permanent portion of the housing, or a removable portion. The support 334 can be a portion of a safety cartridge or safety filter if desired.

Still referring to FIG. 31, it is noted that cartridge 301 includes an optional outer liner 312$x$ that surrounds the media 302$m$. This provides for media protection during handling, and for media pack strength and cartridge integrity.

Still referring to FIG. 31, at 344 is depicted a seal flange, against which a portion of cushion member 316, not depicted in FIG. 31, forms a radially inwardly directed seal, during installation.

Figure 30:
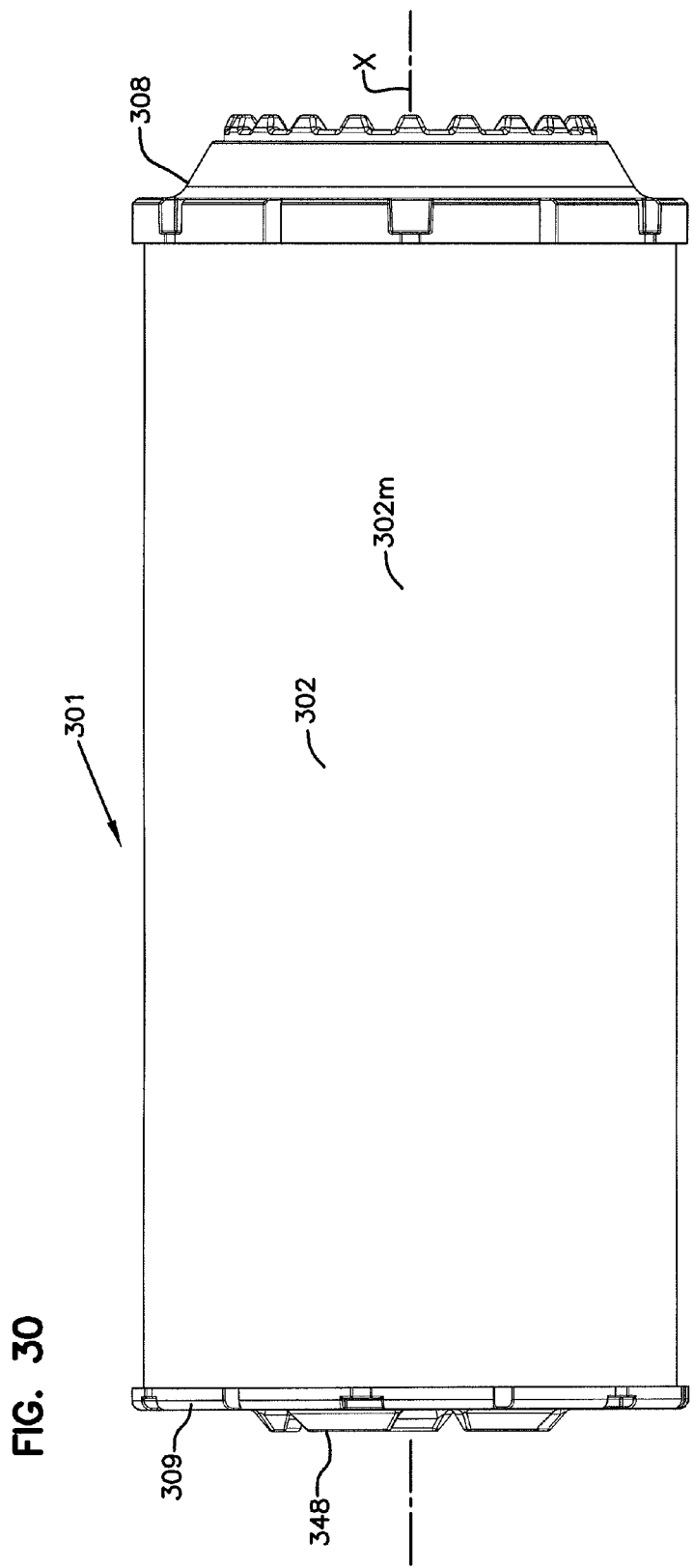
Figure 31A:
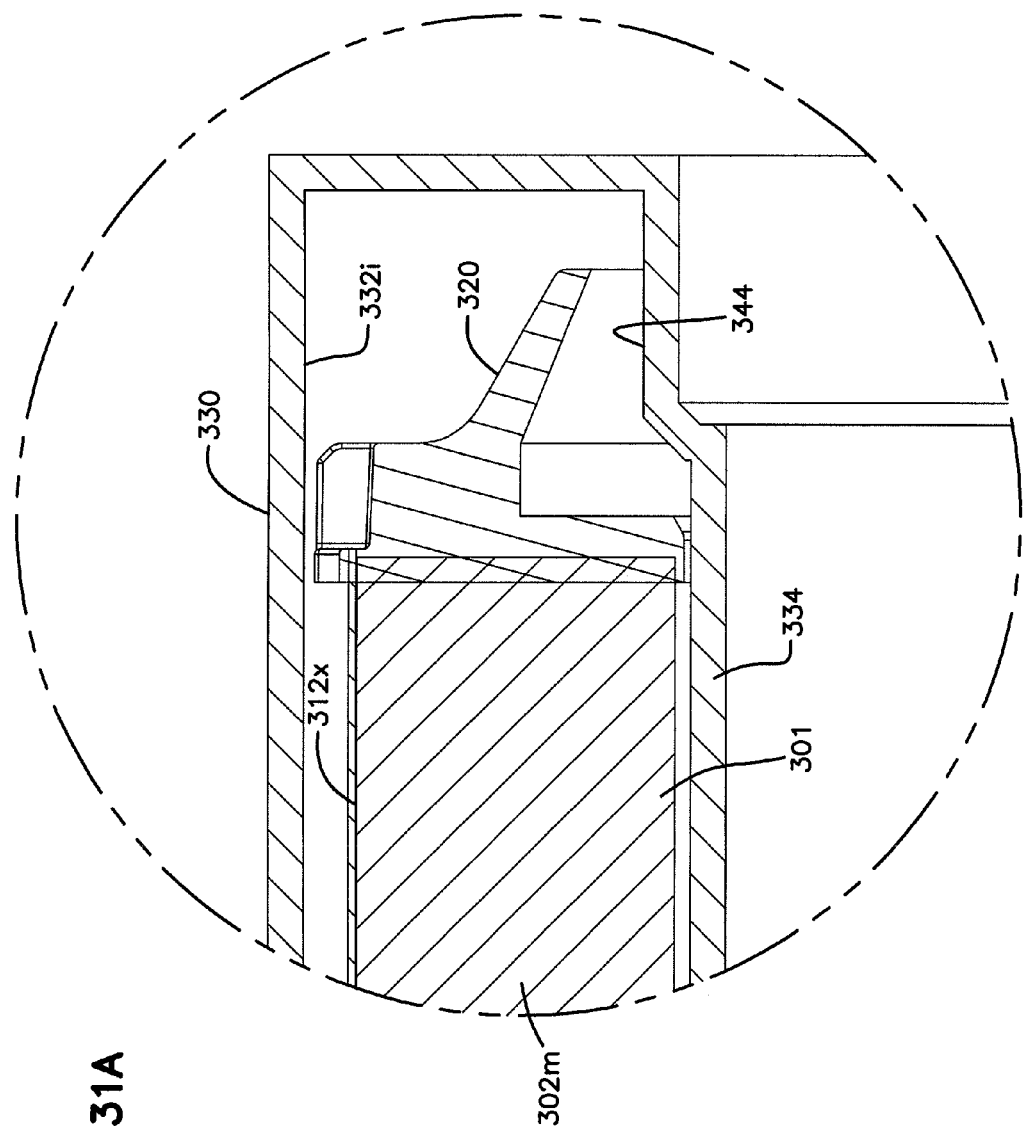
FIG. 31A is an enlarged fragmentary schematic view of a selected portion of FIG. 31.

In FIG. 31A, an enlarged fragmentary view of a portion of FIG. 30 is depicted, with analogous features numbered with analogous reference numerals.

Figure 27:
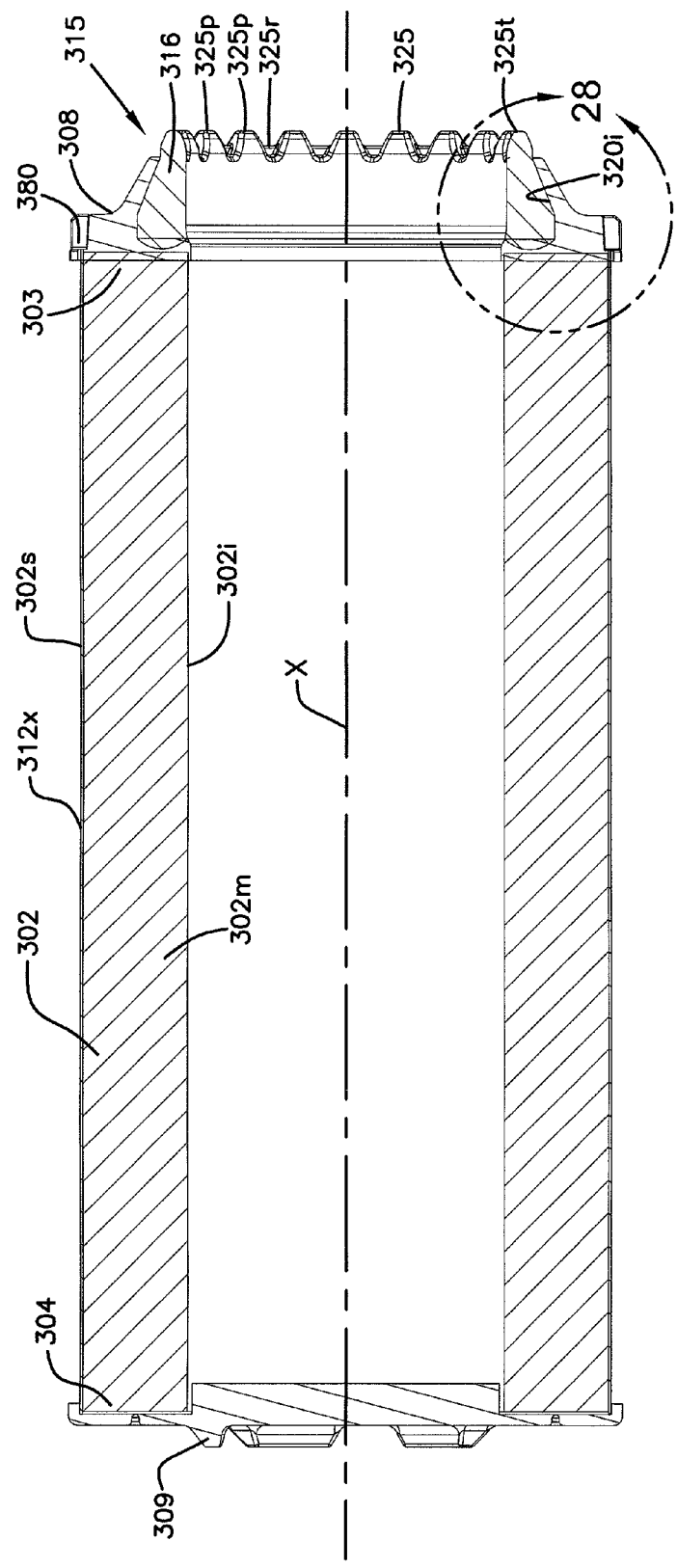
Figure 28:
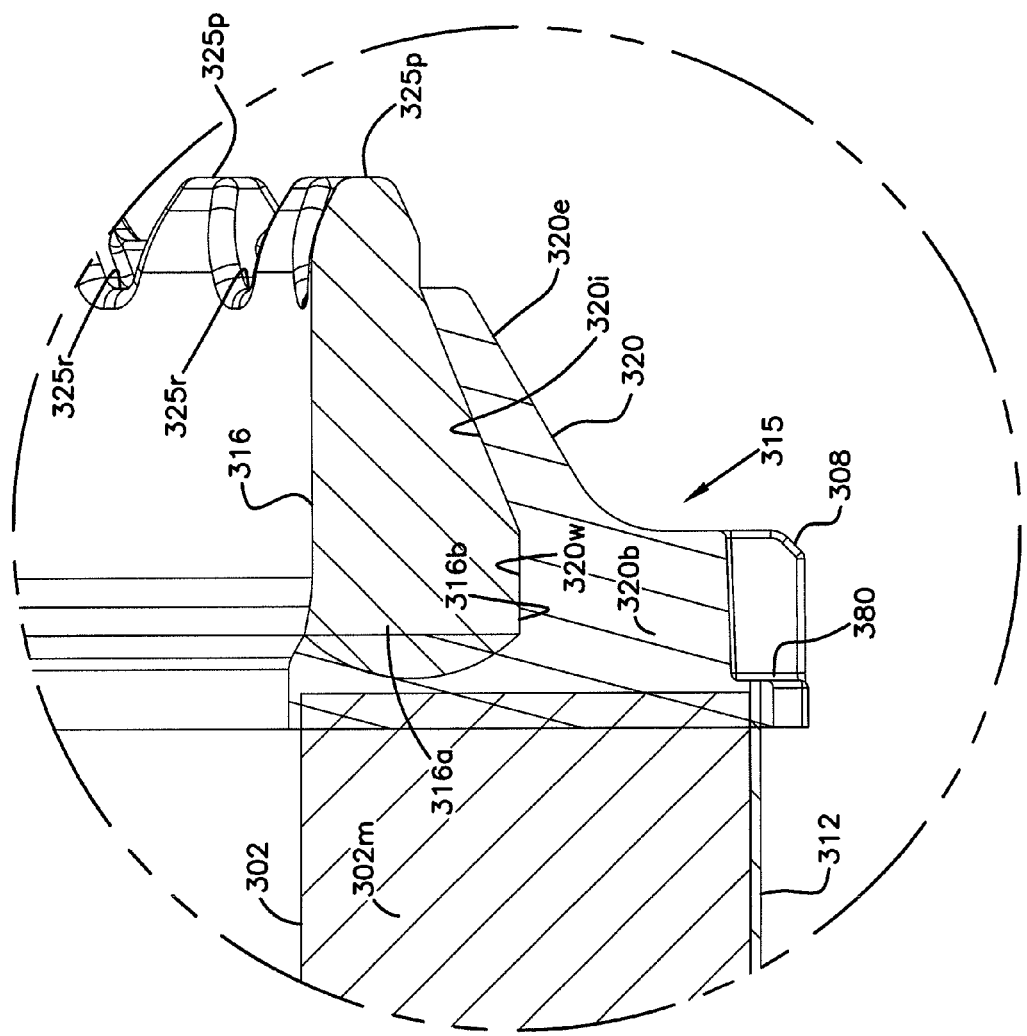

Portions of cartridge 301 are viewable in the cross-sectional view of FIG. 27 and the enlarged fragmentary view of FIG. 28. Selected portions previously discussed include: media pack 302 having end 303 and end 304; media pack exterior 302$x$ and interior 302$i$; outer liner 312$x$; end piece 308 and end piece 309; and, seal arrangement 315 with seal member 316 and seal support 320. Cushion arrangement 325 can be seen as having tip 325$t$. The tip 325$t$ can be seen as extending beyond end 320$x$ of support 320. It can be seen as comprising projections 325$p$ that are spaced by recesses 325$r$. It is noted that end piece 308 does not include a groove analogous to groove 48, FIG. 5. This is because media pack support would have been alternately molded, during molding, in regions indicated by stand-off artifacts 380, FIGS. 27, 28 and 29.

Referring to FIGS. 27 and 28, it is noted that surface or surface section 320$i$ of support 320 against which the seal 316 is pressed, is slanted analogously to surface 20$i$, except that surface 320$i$ begins the slant at a location spaced from inner end 316$a$ of seal member 316.

In particular and referring to FIG. 28, support 320 includes a base section 320$b$ and extension section 320$e$. The extension section 320$e$ defines an inner wall section at 320$i$, which extends at a slant relative to a plane perpendicular to central axis X (the central axis X being shown in FIG. 27).

The angle of extension of wall section 320$i$ in region 320$e$ can generally be analogous to that described above for section 20$i$. A issue shown in FIG. 28 is that base portion 320$b$ is present and relatively thick, with standoff artifacts 380 therein. This means that the seal member 316 is also differently shaped, so that it can properly fit into position. In particular, at region 316$b$, a base portion of cushion 316 is shown engaging wall section 320$w$ of base 320$b$.

Still referring to FIG. 28, in another manner support 320 and cushion 316 can be analogous to those previously described for cartridge 1. In particular, projections 325$p$ are shown, separated by recesses 325$r$.

Figure 29:
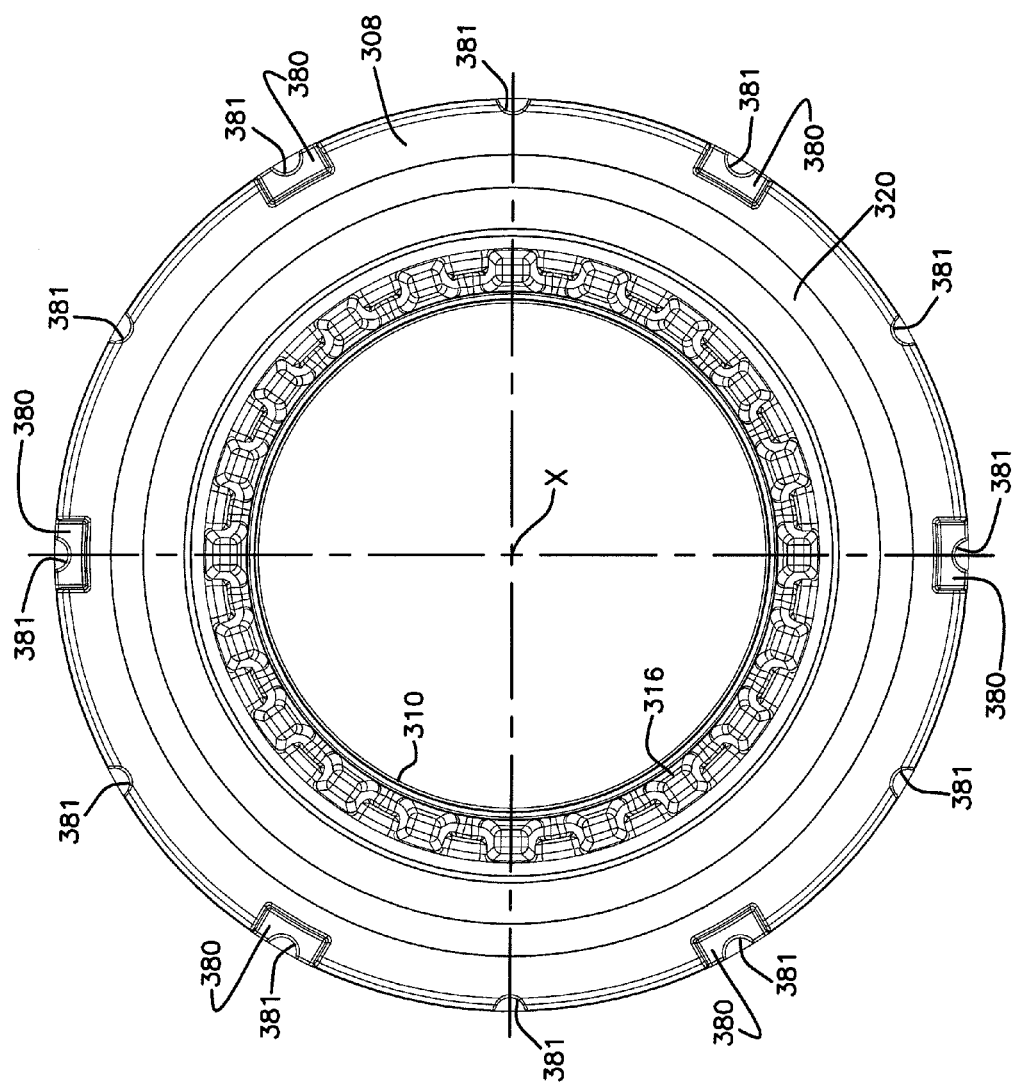

In FIG. 29, an end plan view of end piece 308 is depicted. Standoff recesses or artifacts 380 positioned around an outer perimeter of end piece 308 are shown. These would be locations where the molding would have included standoffs, to support the media pack when the support 320 was molded-in-place. Also, at 381 perimeter artifacts are depicted, for mold sections that were used to keep the media pack at a desired and appropriate shape, in this instance round, during molding of end piece 308. It is noted that FIG. 29 is schematic, and depictions of an opposite end piece from end piece 308 are not shown.

In FIG. 30, a side elevational view of cartridge 301 is depicted, schematically. Opposite end pieces 308, 309 can be seen, on media pack 302$m$.

Figure 23:
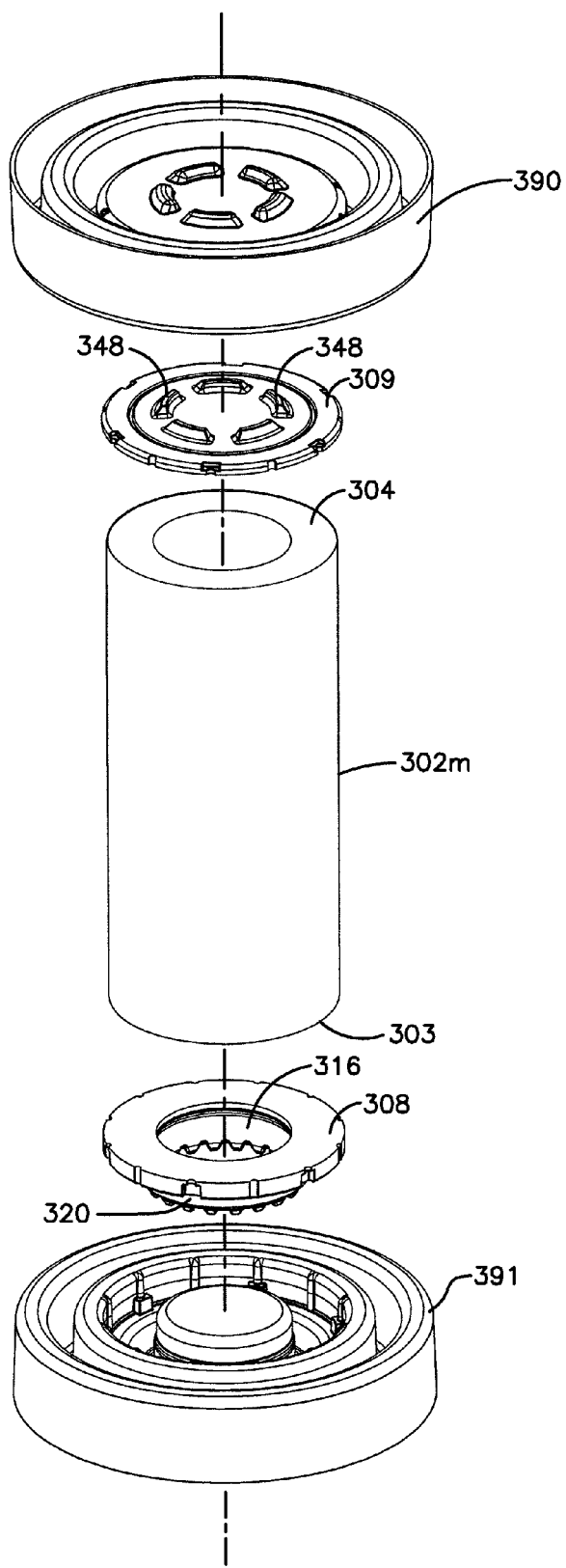

Attention is now directed to FIGS. 23-26 in connection with an approach to assembling cartridge 301. FIG. 23 is generally analogous to FIG. 17 and indicates various molds, mold features and components that are used (or formed) in the production of cartridge 301.

Figure 24:
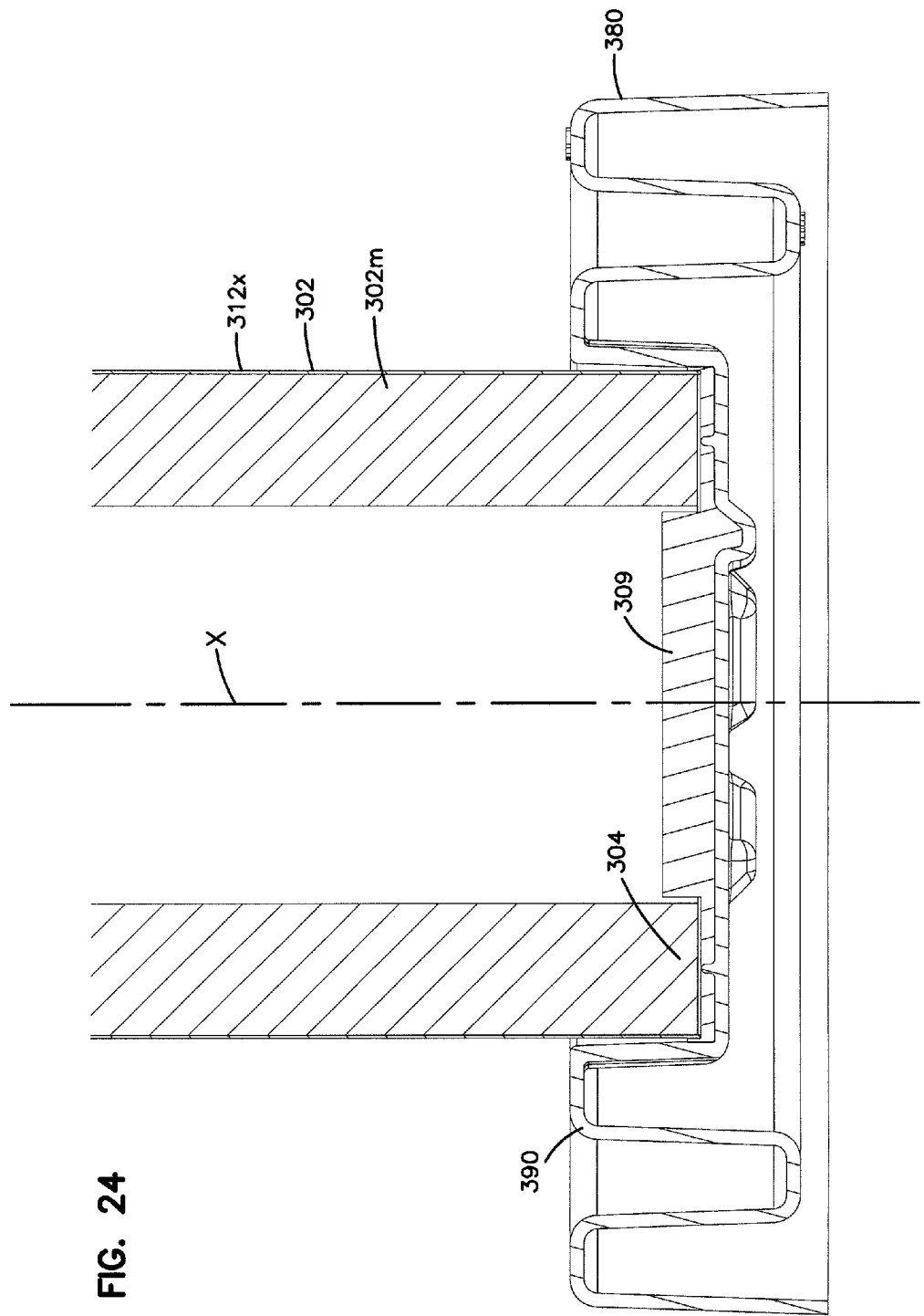

In FIG. 24, a schematic cross-sectional view is shown of the process of molding closed end piece 309. Here mold section 390 is shown, which would have had appropriate resin positioned therein, to generate end piece 309. The media pack 302 is shown projecting into the mold 390, so that the molding of end piece 309 will occur directly on media end 304. Note the positioning of appropriate features in the mold 380 to form projections 348, FIG. 23.

Figure 25:
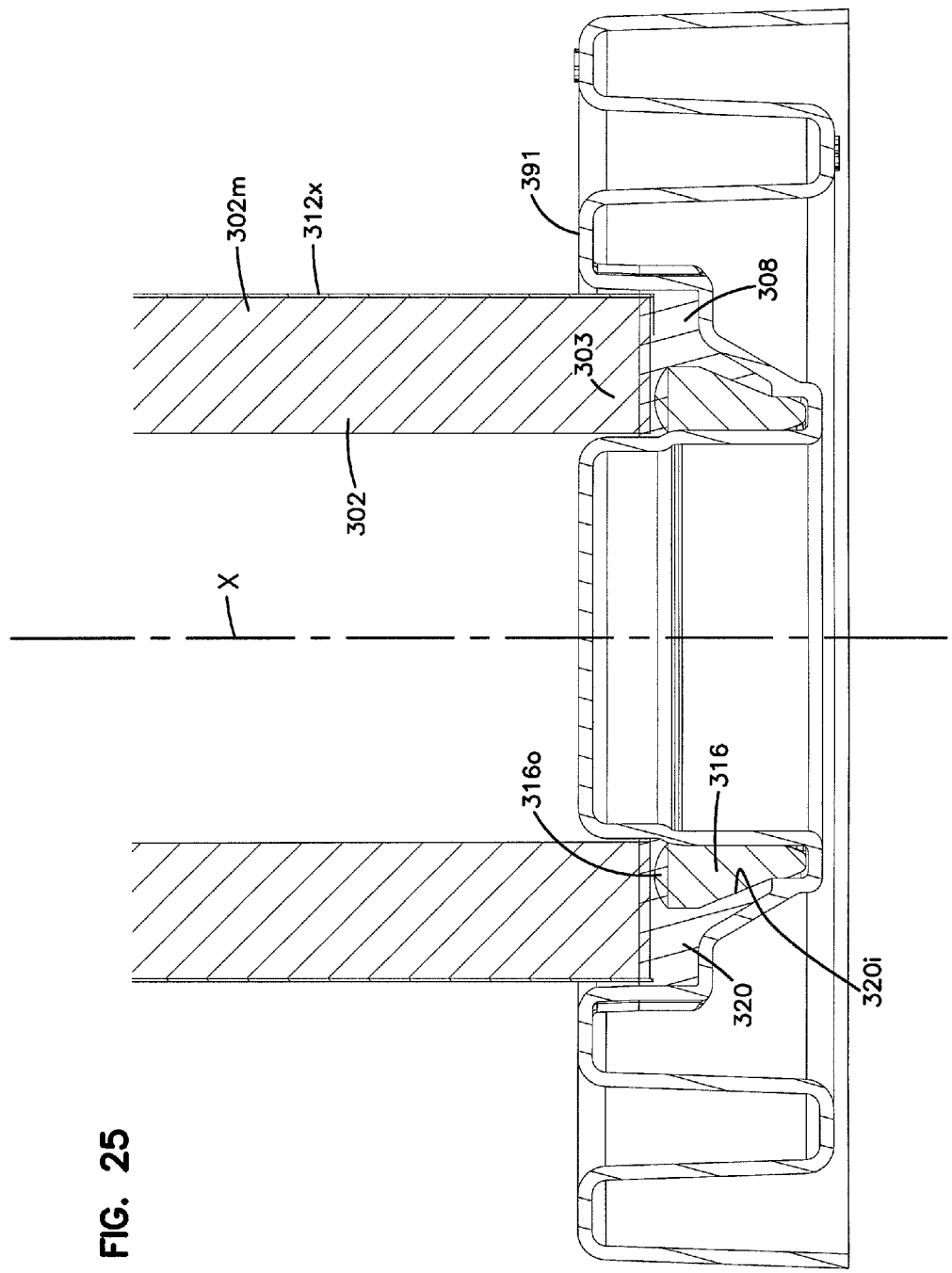

In FIG. 25 a schematic fragmentary view of a step of molding end piece 308 is depicted, the view being generally analogous to that of FIG. 15, discussed above. Seal member 316 will have been preformed and put into mold 391, along with a portion of the media pack end 303, prior to molding section 320, with support 320$i$. At 316$o$ overlap shows how the two urethane sections would engage, in certain regions.

Figure 26:
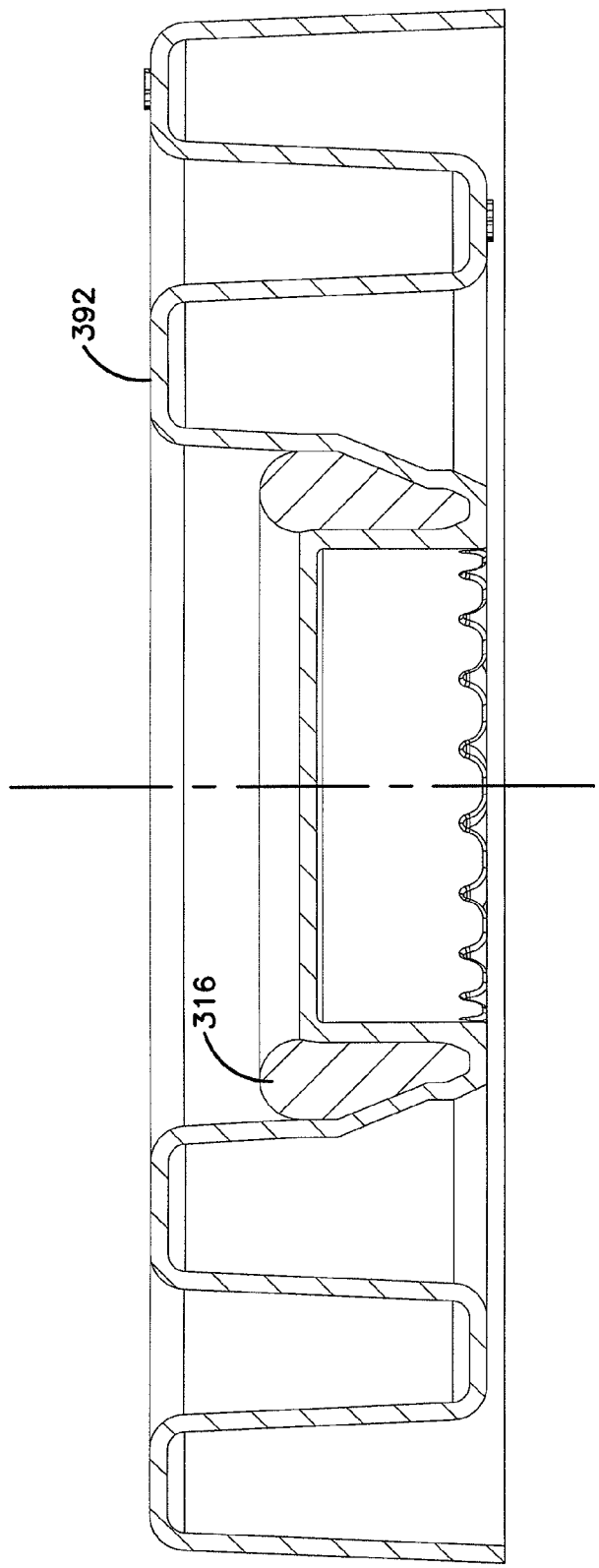

In FIG. 26, a view analogous to FIG. 13 discussed above is shown, depicting preformation of seal member 316 in mold 392 (as a preform for use in forming end piece 308). Member 316 would be removed from mold 390 and then be inserted into mold 391, FIG. 25 during construction of the cartridge.

C. A Further Embodiment, FIGS. 34-46

In FIGS. 34-46, drawings generally analogous to those of FIGS. 1-19 are provided, but in an alternate embodiment with respect to detail. It is noted that the general features and principles may be analogous to those applied and/or described in connection with FIGS. 1-19 and/or FIGS. 22-33. This includes analogous example dimensions, materials and surface features. Further, the variations described above in connection with those figures can be applied. Also, analogous features to those discussed above in connection with FIGS. 20 and 21 could be applied in the embodiment of FIGS. 34-46, when an outwardly directed radial seal is intended.

Figure 34:
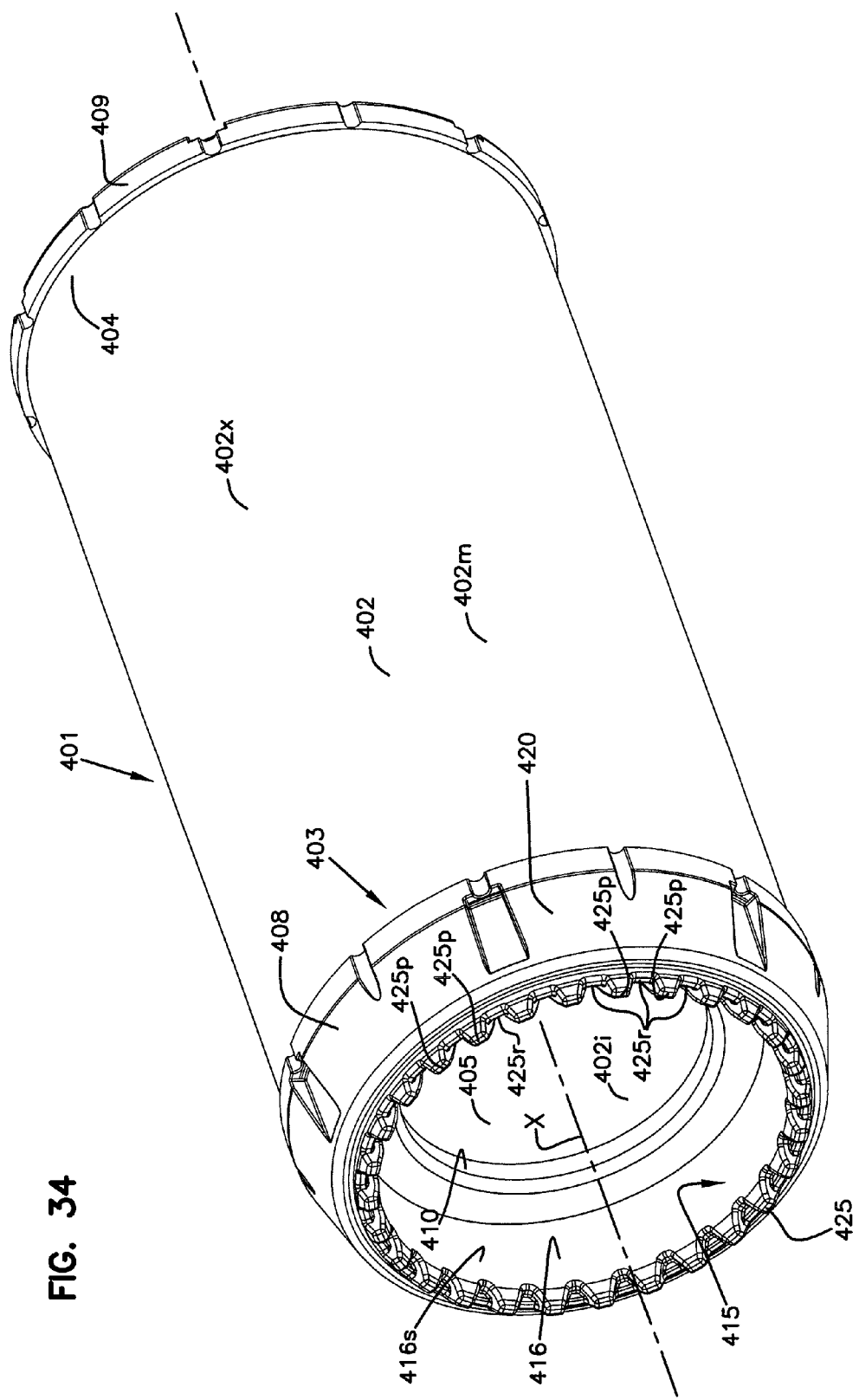
Figure 35:
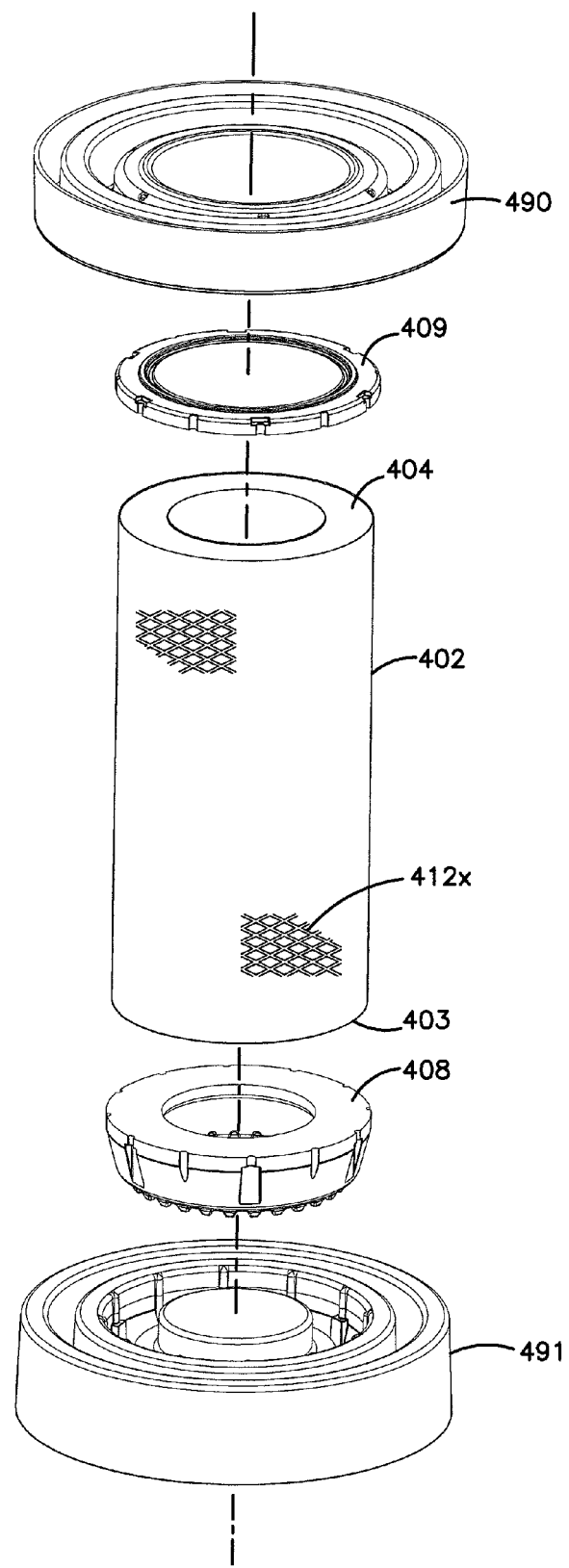

The reference numeral 401, FIG. 34, then, represents an alternative filter cartridge incorporating features according to the disclosure. The filter cartridge 401 comprises a media pack 402 including media 402m, extending between first and second media ends 403, 404. In the example, the media pack 402 is configured to extend around an open filter interior 405 and central axis X.

Referring to FIG. 34, the media pack 402m (and cartridge 401) depicted, is shown as being generally cylindrical. Alternatives are possible, as discussed above for other embodiments. For example, the media pack 402 can taper in extension between ends 403, 404 (or ends 404, 403). Further, it can be configured with a non-circular cross-sectional perimeter, for example an oval perimeter.

The particular filter cartridge 401 depicted, can be used with out-to-in flow during filtering, although alternatives are possible. Thus, it is configured for filtering as carrier fluid passages from exterior perimeter 402x to interior perimeter 402i during filtering.

The cartridge 401 depicted is configured with the media 402 extending between first and second end pieces 408, 409. The first end piece 408 is positioned on the first end 403 of the media pack 402 and generally comprises a "open end piece" i.e. the end piece 408 has a central opening 410 therein. When the cartridge 401 is configured for "out-to-in flow" during filtering, the central aperture 410 is an outlet aperture for filtered fluid to leave the cartridge interior 405.

As is typical for many applications, the second end piece 409, positioned on the second end 404 of the media pack 402, is closed to passage of fluid therethrough, i.e. it is a closed end piece. Again, the principles described herein can be applied in different applications, however; for example those in which the end piece 409 is open or closed by additional structure.

Figure 39:
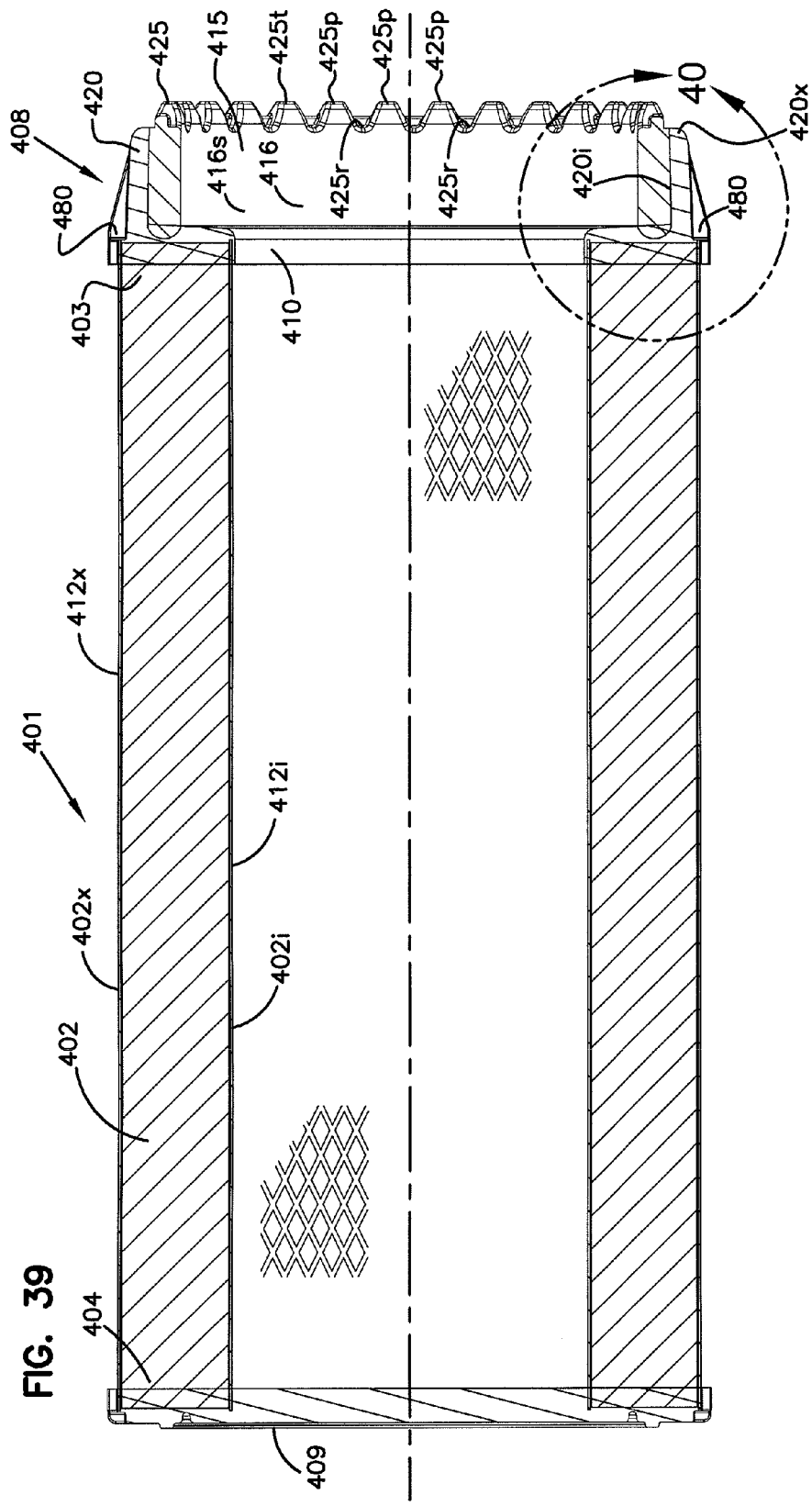

Referring to the cross-sectional view of FIG. 39, the cartridge 401 depicted includes both an inner liner 412i and an outer liner 412x. Variations are possible, depending on the overall system and system requirements. These variations would include the possibility of only one of the two liners, or neither as may be desired. The particular liners 402i, 402x depicted comprise porous expanded metal liners, but alternatives, for example, plastic liners, are possible.

Referring again to FIG. 34, the cartridge 401 includes thereon a housing seal arrangement 415. The housing seal arrangement 415 includes a housing seal 416 (typically a resilient typically compressible member 416) analogous to members 16, 216 and 316 positioned for releasable sealing engagement of seal surface 416s with a portion of a filter assembly upon operation when installation of cartridge 401 for use. Materials similar to those described for members 16, 216 and 316 can be applied, in an analogous manner.

Analogously to housing seal members 16 and 316, member 416 is configured for forming a "radially inwardly" directed seal. However the features depicted can alternately be applied with a "outwardly directed" seal, using variations of the principles analogous to those described above in connection with FIGS. 20 and 21.

The housing seal arrangement 416 can be formed as a preform analogously to seal arrangements 16, 216 and 316 from similar materials and can be positioned within an assembly or cartridge 401 in an analogous manner.

Analogously to seal members 16 and 316, the seal arrangement 415 is provided with our radial support, by a seal support 420 analogously to seal supports 20, 320. Seal support 420 can be generally analogous to supports 20, 320 with respect to selected detail and variations described previously.

As described for previous embodiments, typically the only portion of end cap 408 which forms a seal with a housing member is the seal member 416 configured to form a radially directed seal. That is, again, preferably no portion of the material on end cap 408, other than seal member 416 is positioned to form a seal of any type with a housing member, when cartridge 401 is installed. Again, although alternatives are possible, as described for the seal supports 20, 320 seal support 420 is typically a continuous solid member in extension around central axis X. Also, as previously discussed for cartridges 1, 301, preferably when cartridge 401 is installed in the filter housing or assembly for use, a first end of the cartridge 401, in which the seal arrangement 415 is positioned, is pressed against an end wall of the housing. It is preferable that when this occurs, the engagement has resiliency. To provide for this, the cartridge 401, analogously to cartridges 1, 301, includes an axial seal cushion arrangement 425 analogous to cushion arrangements 25, 325. Cushion arrangement 425 is positioned on end piece 408 at a location further axially remote from the media end 404, end piece 409 and/or media pack end 403, than any other portion of end piece 408. This is typical, for advantage, but is not required in all instances. The example cushion arrangement 425 depicted is integral with a resilient compressible member that forms member 416, and typically comprises the same material. The particular cushion arrangement 425 depicted, projects axially beyond end 420x of seal support 420 and comprises a plurality of spaced projections 425p separated by recesses 425r.

Figure 46:
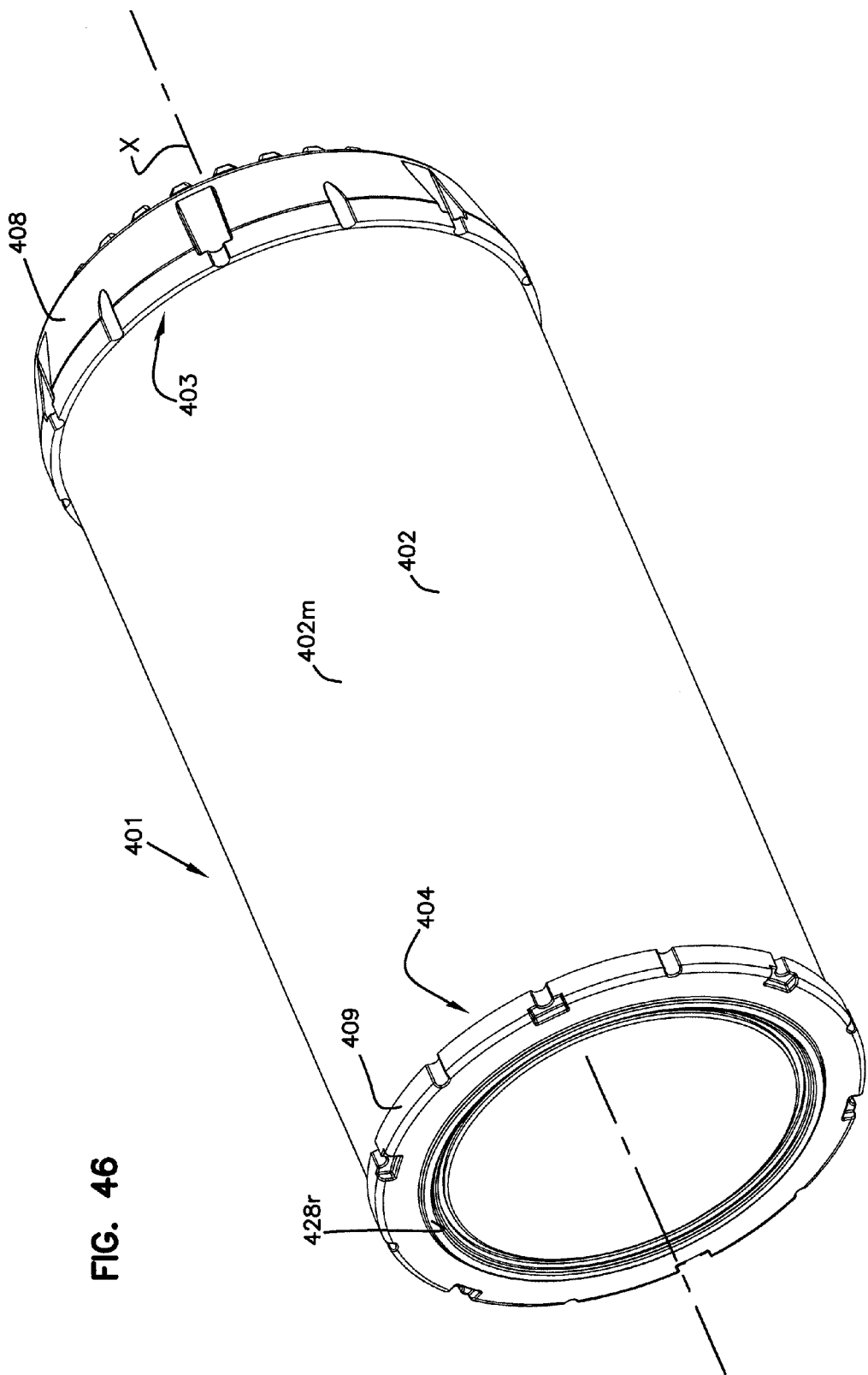

In FIG. 46, a perspective view of cartridge 401 is provided, directed generally toward end piece 409. Although alternatives are possible, the end piece 409 can be seen as comprising a closed end piece molded-in-place on end 404 of the media pack 402. An axial projection arrangement 328, analogous to axial projection arrangements 28, 328, is not shown, but could be used. A cushion arrangement comprising a ring 428r is shown.

Figure 42:
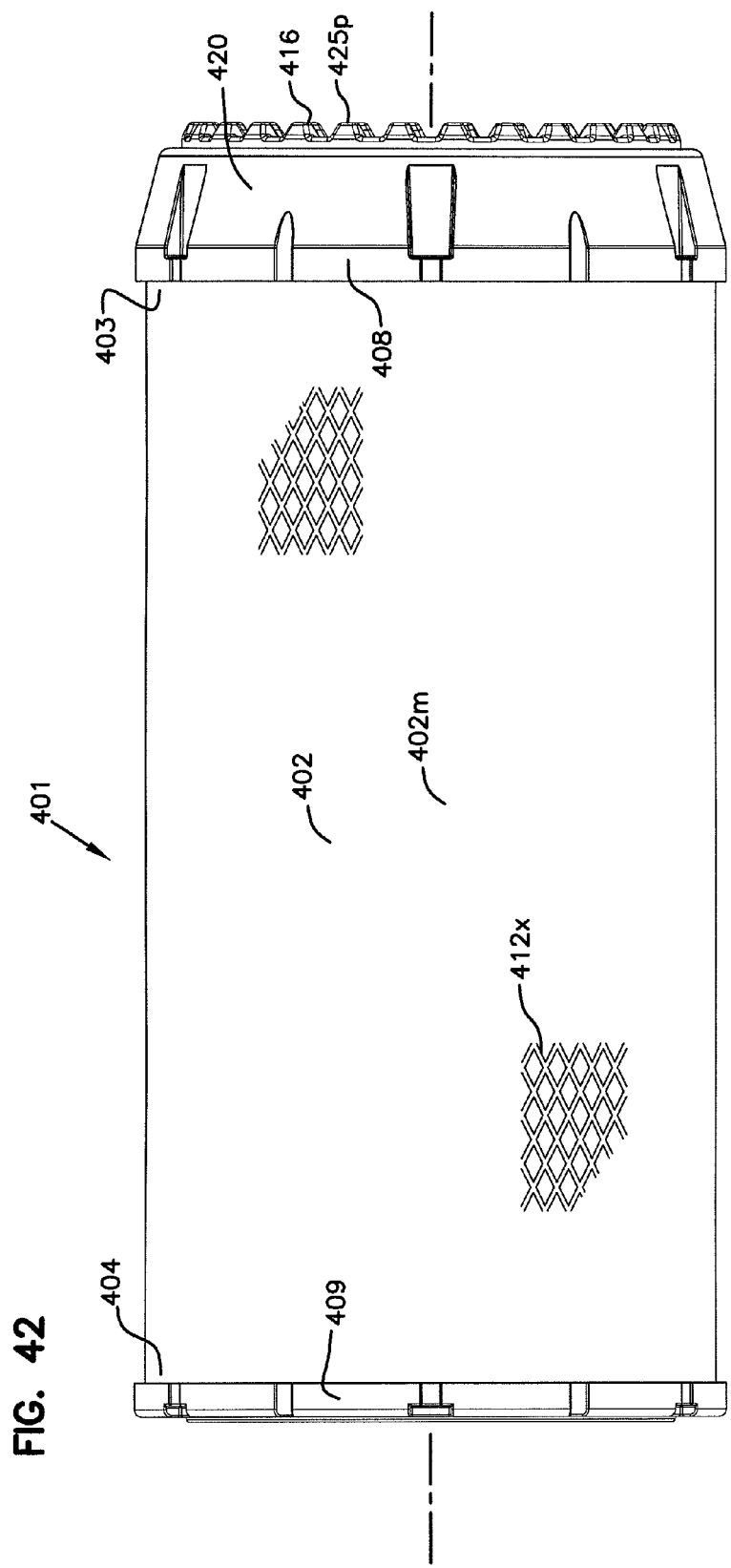
Figure 45:
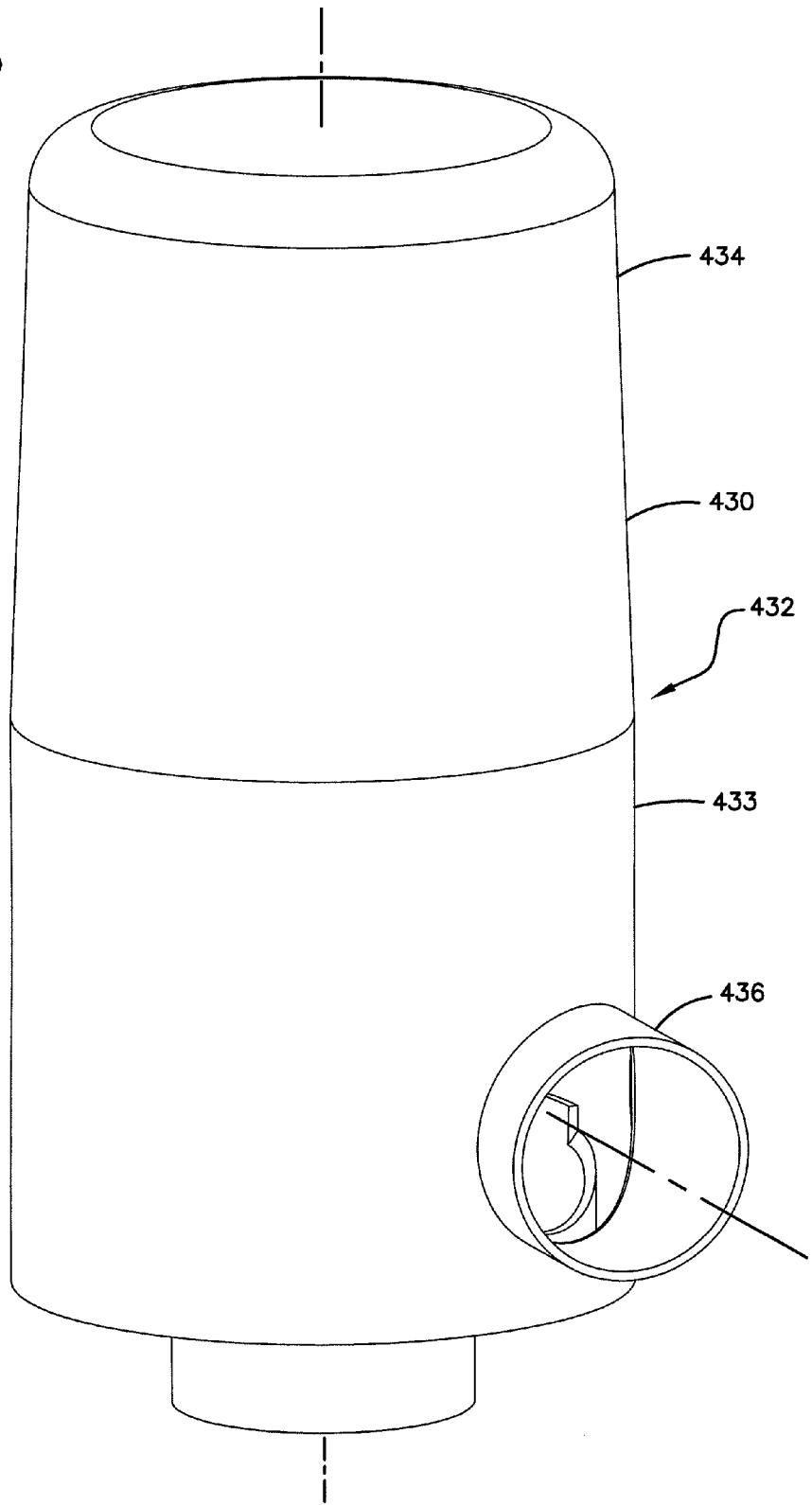

In FIG. 45, a schematic perspective view of an air cleaner assembly 430 for use with a filter cartridge in accord with cartridge 401 is provided. FIG. 42 should be understood to be schematic and a variety of specific housing features can be used. The filter assembly 430 depicted would typically be configured as an air cleaner assembly, but alternative applications are possible.

Referring to FIG. 42, the filter assembly 430 comprises a housing 432 comprising a housing body 433 and a removable access cover 434. In general terms, upon removal of the access cover 434, an interiorly received cartridge 401 can be removed, or a cartridge 401 can be installed.

At 436, a (gas) flow tube is provided, along for full access to an interior of housing body. The flow tube 436 depicted is an inlet tube, when the assembly 430 is configured for out-to-in flow through the cartridge during filtering. Of course, it could be an outlet flow tube, with an opposite flow direction is used.

Figure 43:
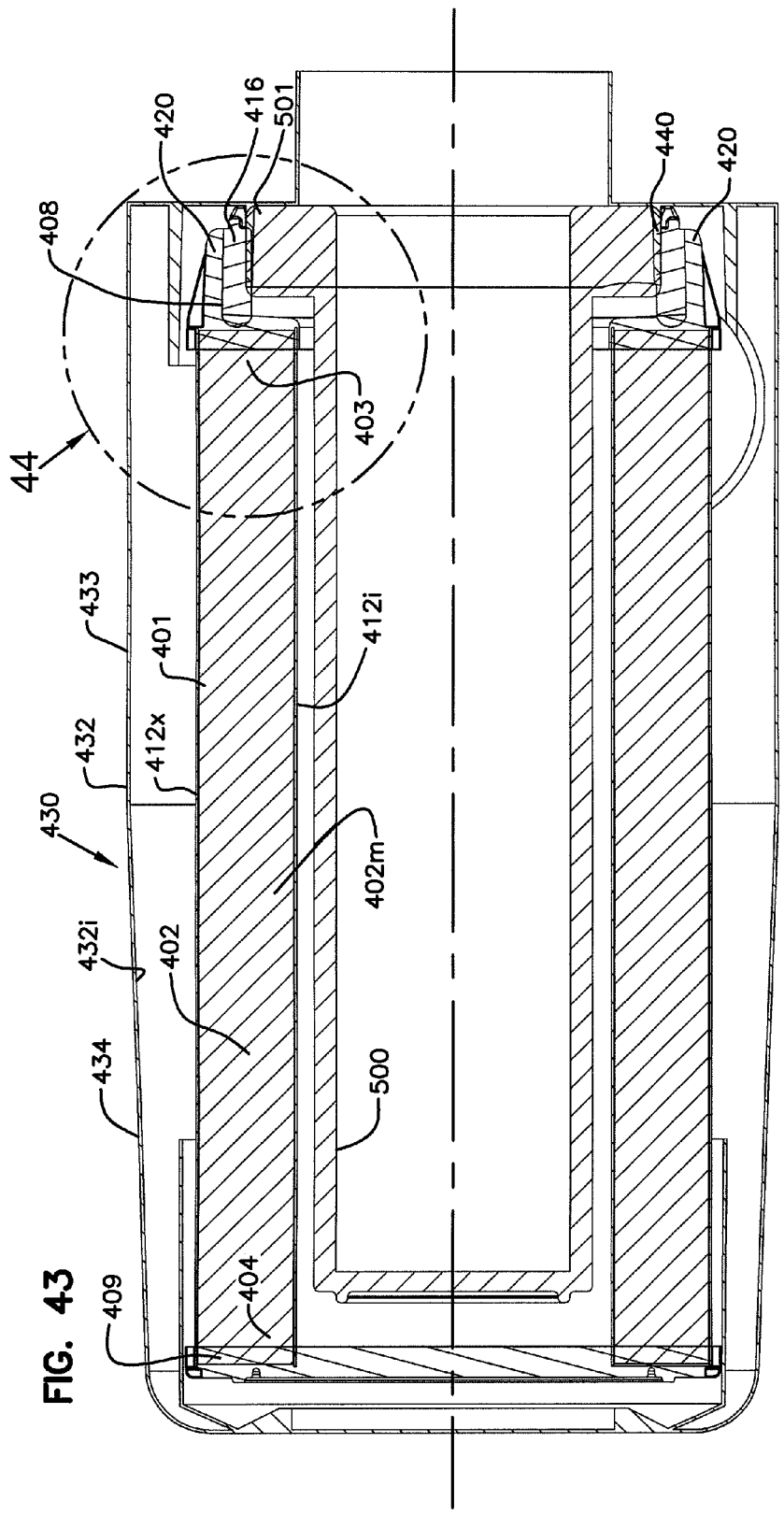

Attention is now directed to FIG. 43, a schematic cross-sectional view of filter assembly 430. Here cartridge 401 can be seen installed with an interior 432*i* of housing 430. The cartridge 401 is installed with seal member 416 surrounding, and in sealing engagement with, seal ring 440, in a releasable sealing manner. Since the seal ring 440 is surrounded by the seal member 416, the seal is a radial inwardly directed seal. Of course, principles described herein for formation of an outwardly directed radial seal could alternatively be used.

Still referring to FIG. 43, the assembly 430 depicted is also shown having a removable safety element 500 therein, sealed with an outwardly directed radial seal 501.

For the particular assembly depicted, the seal 406 and seal 501 are sealed on opposite sides of the same support 440. This will be typical, but alternatives are possible. It is also noted that in FIGS. 43 and 44 the seals are shown overlapping the support 440. This is meant to indicate an amount of compression that occurred during installation.

Figure 44:
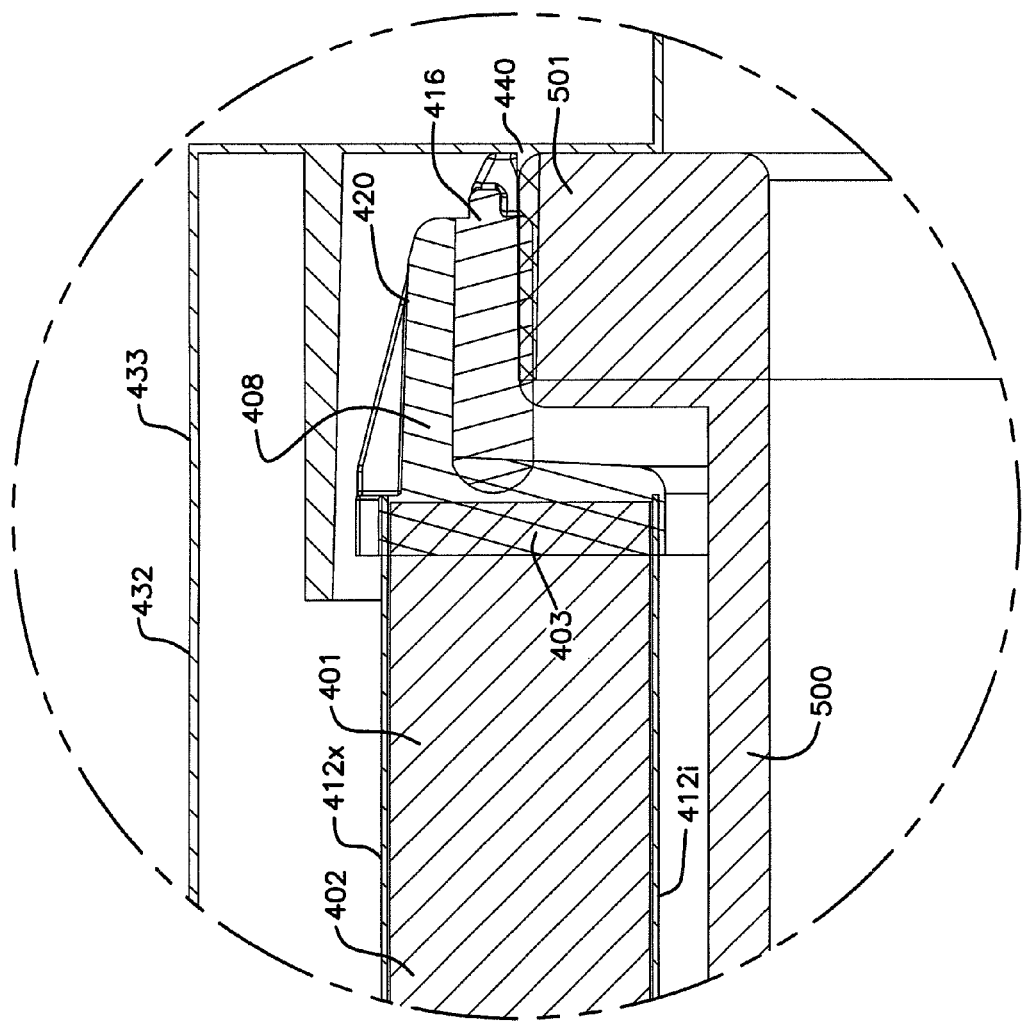

In FIG. 44, an enlarged fragmentary view of a portion of FIG. 43 is depicted, with analogous features numbered with analogous reference numerals.

Figure 40:
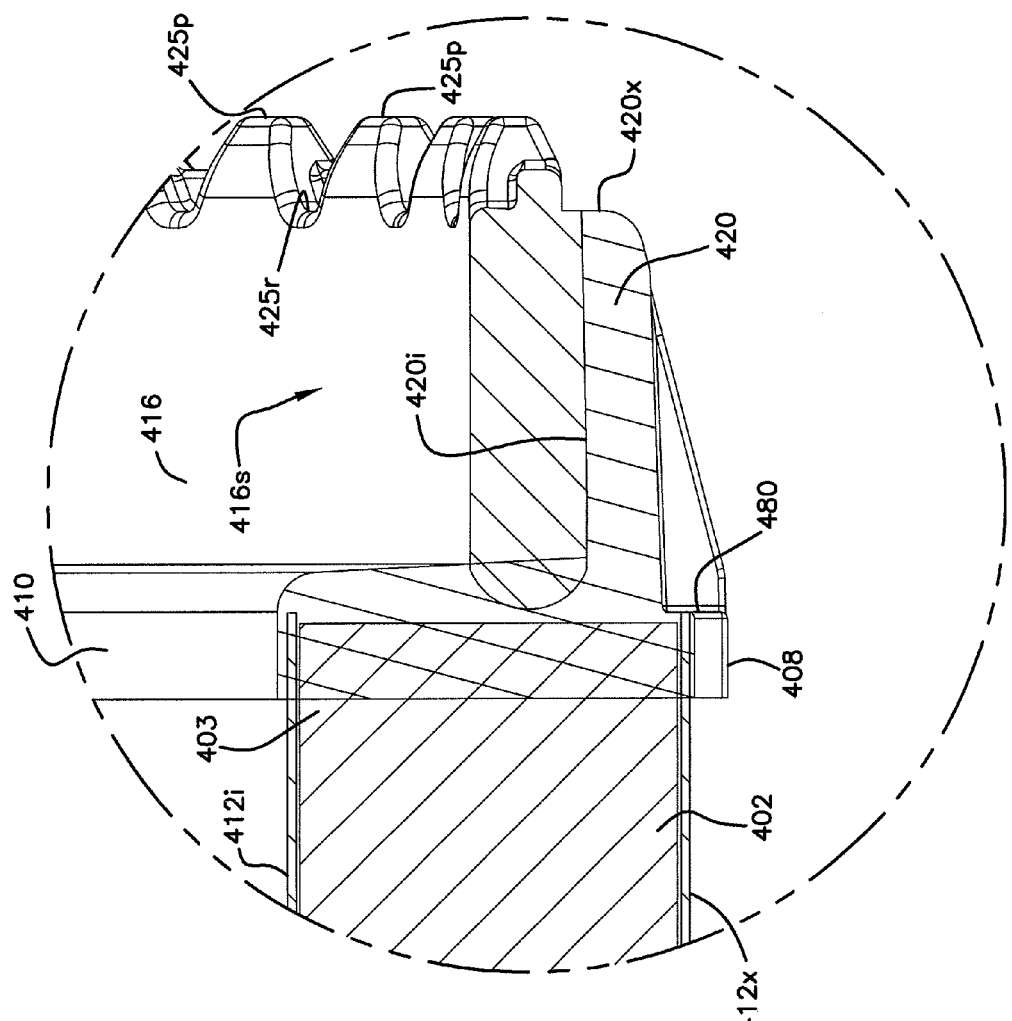

Portions of cartridge 401 are viewable in the cross-sectional view of FIG. 39 and the enlarged fragmentary view of FIG. 40. Selected portions previously discussed include: media pack 402 having end 403 and end 404; media pack exterior 402*x* and interior 402*i*; liners 412*x*, 412*i*; end piece 408 and end piece 409; seal arrangement 415 with seal member 416, seal surface 416*s* of seal support 420. Also, cushion arrangement 425 can be seen as having tip 425*t*. The tip 425*t* can be seen as extending beyond end 420*x* of support 420. It can be seen as comprising projections 425*p* that are spaced by recesses 425*r*. It is noted that end piece 408 does not include a groove analogous to groove 48, FIG. 5. This is because support was provided, during molding, in regions indicated by stand-off artifacts 480, FIGS. 38, 40 and 49.

Referring to FIGS. 39 and 40, it is noted that the surface or surface section 420*i* of support 420 against which the seal 416 is pressed, is not slanted as much toward the central axis X, FIG. 39 as surface 20*i*. Rather, in the example surface 420*i* slants less than 5° relative to axis X, typically less than 4°. Indeed, in some instances, surface 420*i* can be configured to not slant at all. However, typically, it will slant at least 0.1°, usually at least 0.3°, and often at least 0.5°.

Thus, relative to a plane perpendicular to central axis X (a plane analogous to plane Y discussed above) surface 420*i* extends at an angle of typically no less than 85°, and usually no less than 86°. Indeed, the angle of extension may be a relatively small angle or non-existent. However, typically at least a small angle of slant, for example at least 0.1°, will be preferred as it does help form a pocket to secure member 416 and it provides for convenient molding of the shape and outer surface of member 416, which would typically would be formed including a draft angle thereon for demolding.

Figure 41:
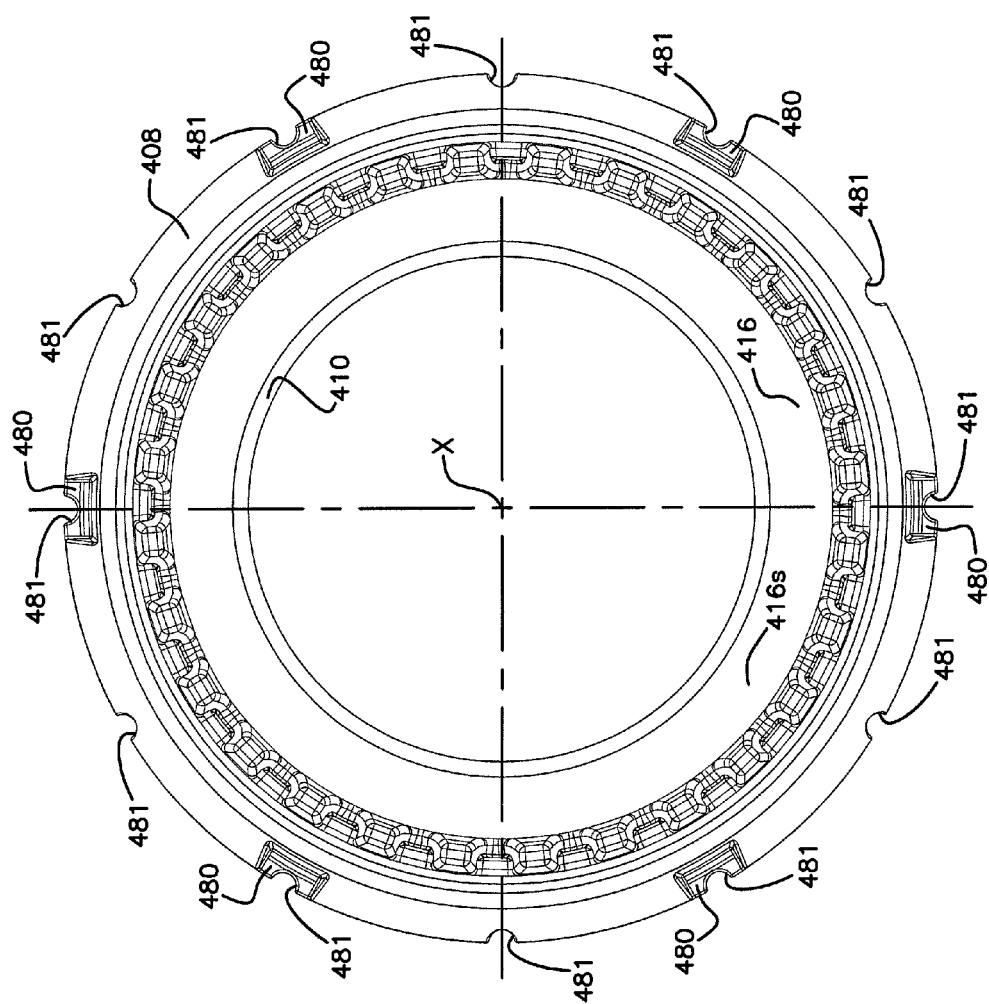

It is also noted that the variation discussed above in connection with cartridge 301 can be applied, and which different interior portions of support 420 can extend at different angles In FIG. 41, an end plan view of end piece 408 is depicted. Standoff recesses or artifacts 480 positioned around an outer perimeter of end piece 408 are shown. These would be locations where the molding included standoffs, to support the media pack when the support 420 was molded-in-place. Also, at 481 perimeter artifacts are depicted, from mold sections that were used to keep the media pack in an appropriate shape, in this instance round, during molding of end piece 408. It is noted that FIG. 41 is schematic, and depictions of an opposite end piece from end piece 408 are not shown.

In FIG. 42, a side elevational view of cartridge 401 is depicted, schematically. Opposite end pieces 408, 409 can be seen, on media pack 402*m*.

Attention is now directed to FIGS. 35-38 in connection with an approach to assembling cartridge 401. FIG. 43 is generally analogous to FIG. 17 and indicates the various molds, mold features and components that used (or formed) in the production of cartridge 401.

Figure 36:
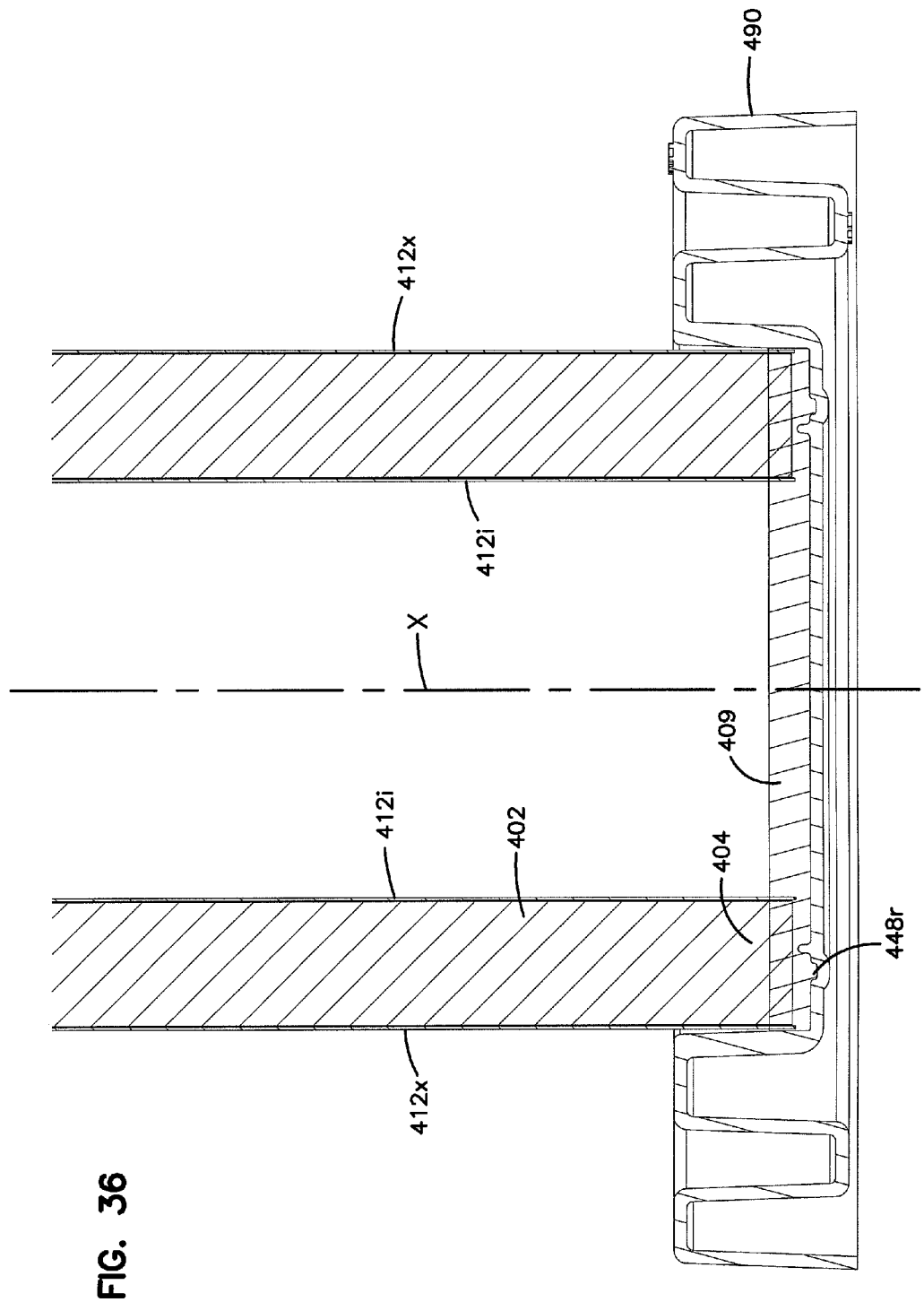

In FIG. 36, a schematic cross-sectional view is shown of the process of molding closed end piece 409. Here mold section 490 is shown, which would have appropriate resin positioned therein, to generate end piece 409. The media pack 402 is shown projecting into the mold 490, so that the molding of end piece 409 will occur directly on media end 404. Note the positioning of appropriate features in the mold 480 to form ring 448*r*.

Figure 37:
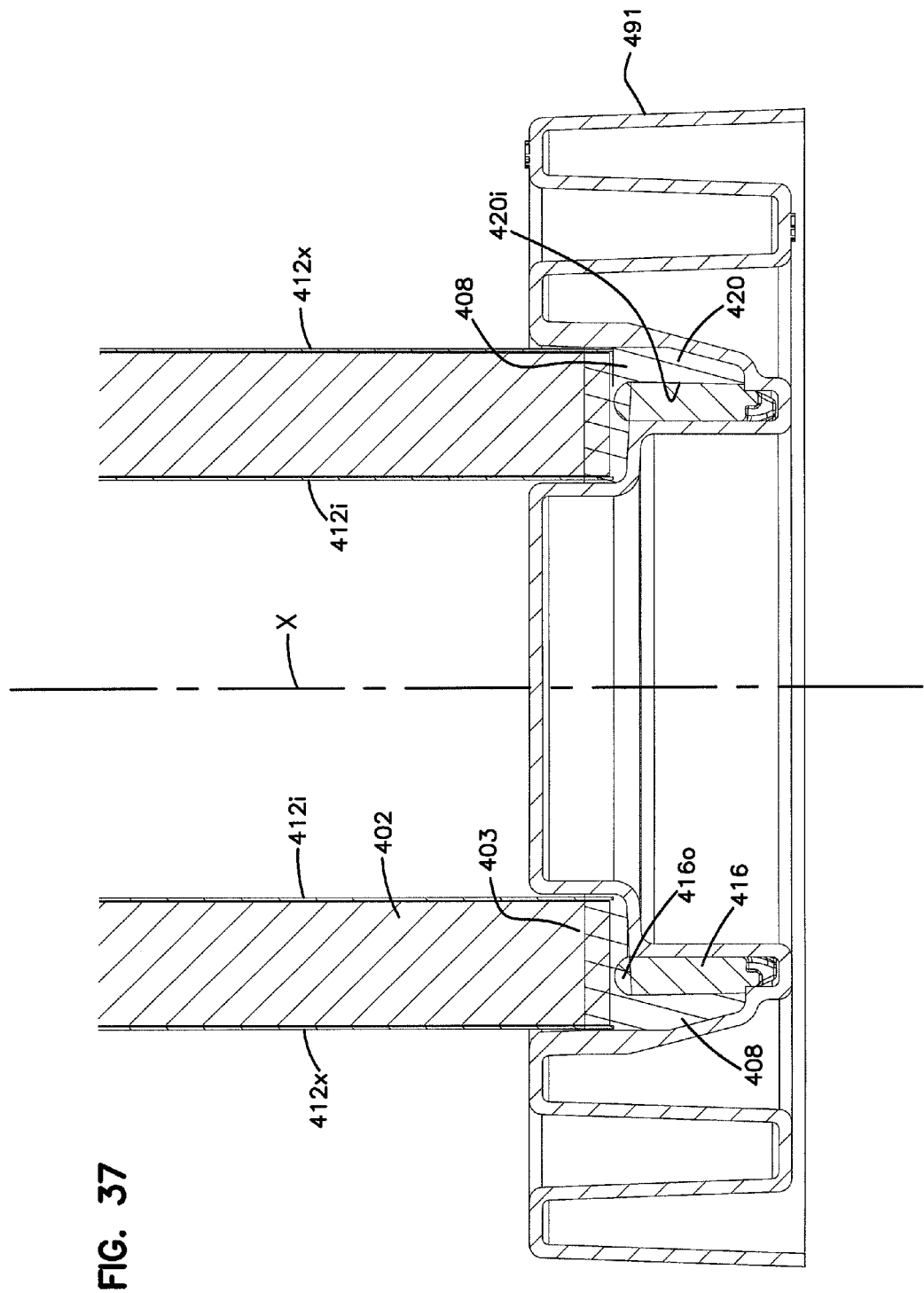

In FIG. 37 a schematic fragmentary view of a step of molding end piece 408 is depicted, the view being generally analogous to that of FIG. 15, discussed above. Seal member 416 will have been preformed and put into mold 491, along with a portion of the media pack at end 403, prior to molding section 420, with surface support 420*i*. At 416*o* overlap shows how the two urethane sections could engage.

Figure 38:
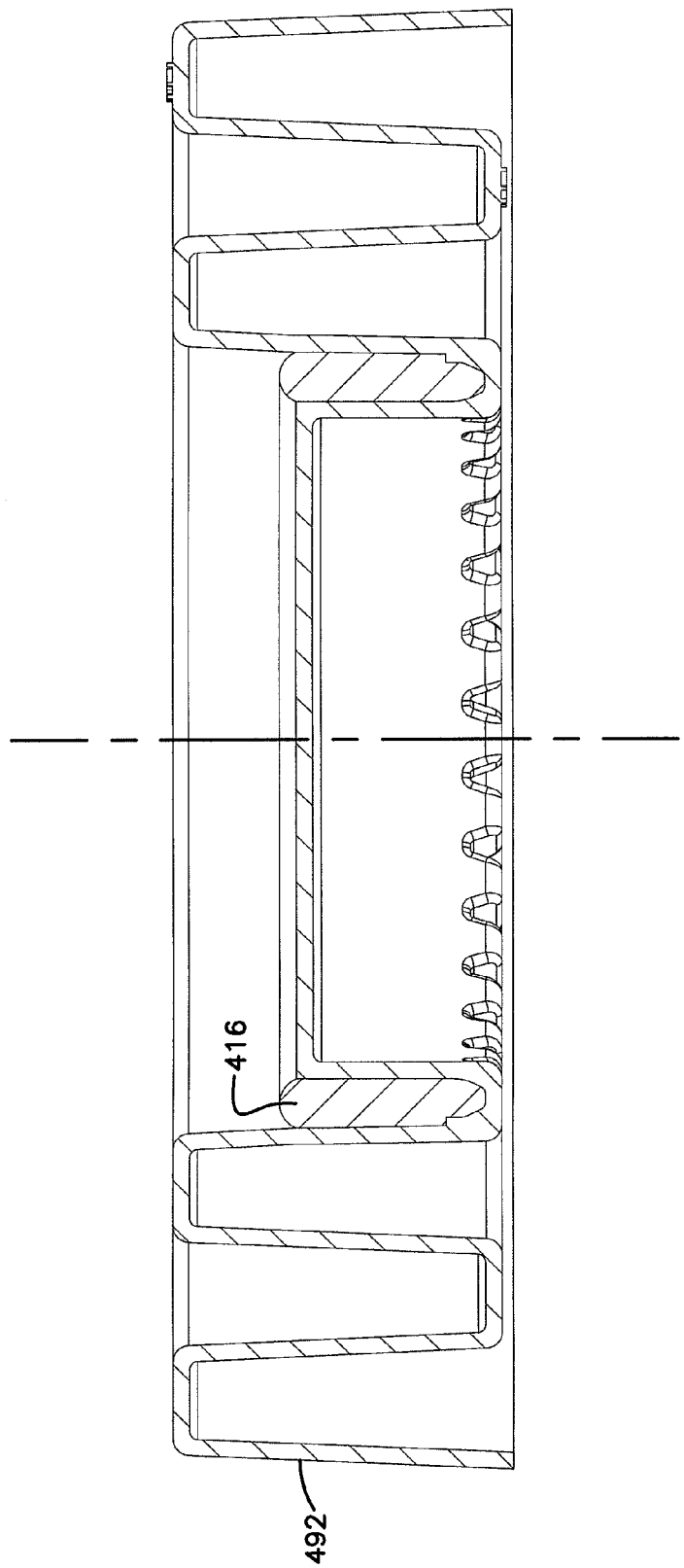

In FIG. 38, a view analogous to FIG. 13 discussed above is shown, depicting preformation of seal member 416 in mold 492 for use a preform to form end piece 408. Member 416 would be removed from mold 492 and then be inserted into mold 391, FIG. 37 during construction of the cartridge 401.

D. Some Selected Observations Concerning the Embodiments of FIGS. 20-46

The embodiments of FIGS. 20-46 were meant to indicate variations possible with the principles described above with respect to the embodiment of FIGS. 1-19. Similar materials, dimensions, surface features and shapes can be applied among the various embodiment. Thus, features shown in any one of the embodiments can be applied with features shown in the others. Further the general characterizations of dimensions, materials, shapes, etc. from one embodiment or description can be applied in the others.

Again, there is no specific requirement that the features be applied to obtain all the same advantages as can be applied with maximum application of the principles described herein.

VI. Summary and Observations

According to an aspect of the present disclosure, a filter cartridge is provided. The filter cartridge generally comprises a media pack including media, having an end. The media pack can be configured around an open filter interior.

A first end piece having a central aperture therethrough is provided on the end of the media pack. The first end piece can be molded-in-place on the end of the media pack, to completely close the end of media pack and to have media embedded therein.

The end piece generally includes an end cap section and a seal support section. The seal support section can, optionally and to advantage, be configured to define a seal recess in cooperation with the end cap section.

The seal support section projects axially from the media pack and media. In some instances the projection is not parallel to a central axis through the central aperture. In many instances, it slants either toward or away from the central aperture and axis. That is in some instances, the seal support section defines a seal support wall that slants radially in extension away from the end cap section, to define a seal recess. In alternate applications, the support can extend parallel to a central axis.

In a typical arrangement, the end cap section and the seal support section are integral with one another and molded-in-place.

A housing seal member is positioned on the first end piece, for example in the seal recess if present. Typically, it is non-removably secured within the seal recess, and configured to form a radially directed seal with a housing component when the filter cartridge is installed for use. The housing seal member can be configured to form a radially inwardly directed seal with a seal component, or a radially outwardly directed seal with a housing seal component. Typically, the seal support is positioned so that when a housing seal member forms a radially directed seal, it is compressed between the housing member and the housing seal support.

In some examples, the seal support typically defines a seal support wall or wall section that slants radially in extension away from the end cap section at an acute wall angle within the range of 30°-80°, inclusive. In another example, it is at an angle of 90°, or nearly 90°, for example (at least 85°, typically at least 86°, often 87° or more).

Typically, the end piece is molded-in-place on a first end of the media pack and defines a radial seal support, while being molded to secure the housing seal member (provided as a preformed housing seal member) in place on the cartridge and to the media pack.

Typically, the media pack (and media) surrounds and defines an open filter interior with a central axis coaxial with a central axis of the aperture through the first end piece and the seal. Typically, the end cap section extends completely across, and closes, the first end of the media pack and media. Typically, the first end cap section and seal support section are molded integral with one another. Also, typically, the media is pleated. Again, in some instances, an acute angle of extension of the support wall is within the range of 30°-80°, inclusive, in extension axially away from the media, and an end cap section relative to a plane perpendicular to a central axis. In some instances, more typically, this angle is within the range of 45°-80°, often 50°-80°, and in many instances 55°-75°, inclusive, as an example, 60°-75°, inclusive. Alternatives are described.

Typically, the housing seal member comprises a portion of a resilient, compressible member having a seal surface. The resilient, compressible, member can be configured to extend, axially, further away from the media than does the seal support, to advantage. When this is the case, typically an amount of further extension is at least 2 mm, usually at least 4 mm and often at least 5 mm.

The tip of the resilient (and typically compressible) member remote from the media can be configured to comprise a plurality of spaced projections extending, axially, away from the media. Preferably, portion of the resilient (and typically compressible) member adjacent to the tip comprises a plurality of space projections and recesses, with both portions of the projections and portions of the recesses comprising material of the resilient member extending axially further away from the media than does any portion of this seal support.

In an example described, the media or media pack has an outer perimeter and the end cap projection on the first end piece does not extend radially beyond an adjacent portion of the outer perimeter of the media pack any further than 2 mm, typically any further than 1.5 mm and preferably any further than 1 mm. This can be applied with any with the features of any of the embodiments.

Further, typically media pack has an inner perimeter, and the end cap section adjacent the first end piece does not extend radially beyond an adjacent portion of the inner perimeter of media or media pack any further than 3 mm, typically any further than 2 mm and often any further than 1.5 mm (indeed no greater than 1 mm is preferred). This can be applied with the features of any of the embodiments described.

In an example described, the first end piece comprises a molding having an as molded density of at least 0.4 g/cc; typically at least 0.46 g/cc; and often a density within the range of 0.51-0.63 g/cc, inclusive. Typically, the first end piece comprises a molding having a hardness, Shore A, of at least 30, typically at least 35, usually not greater than 75, and often within the range of 40-60, inclusive. The characteristics can be applied with any of the embodiments described.

Typically, the seal member comprises a molding having a density no greater than 0.32 g/cc, typically no greater than 0.24 g/cc. It typically comprises a molding have a hardness, Shore A, of no greater than 20, typically no greater than 18 and often within the range of 10-18, inclusive. The characteristics can be applied with any of the embodiments described.

Typically, when made together, the first end piece comprises a first molding having a first density and the seal member comprises a second molding having a second density, the first density being greater than the second density, typically at least 0.08 g/cc greater, usually at least 0.2 g/cc greater. The characteristics can be applied with any of the embodiments described.

Typically the seal member defines a seal surface, i.e. a surface that engages a portion of a housing, in use, with a length of axial extension of at least 5 mm, typically at least 10 mm, and preferably at least 12 mm, wherein the seal surface does not have a radial step in that section. Typically the seal member surrounds and defines a central cartridge axis, and the seal member defines a seal surface section that engages a housing structure to form a seal therewith in use, that extends at an angle, relative to a plane perpendicular to the cartridge central axis, of at least 80°, typically at least 83°, often at least 85°, and typically within the range of 85°-89.9°, inclusive, for example 88°-89.7°, often 89.3-89.7°. The characteristics can be applied with any of the embodiments described.

In a typical example, the housing seal member has a first portion with a first radial thickness from the seal surface to the seal support section; and, a second portion with a second radial thickness from the seal surface to the seal support section. Typically, the second radial thickness is at least 4 mm greater, usually at least 5 mm greater, than the first radial thickness. Also, typically the portion with a second radial thickness is closer to the media, than is the portion with the first radial thickness. As discussed above, an advantage of this is that it can allow for a convenient rocking of the cartridge, when engagement with the housing, to facilitate removal/installation. The characteristics can be applied with any of the embodiments described.

Typically, the first radial thickness is at least 7 mm, usually at least 9 mm.

In an example described, a central liner is provided, for example an expanded liner. In an alternate application, the central liner can be plastic. In some applications, the central liner can be avoided. In a typical application, the first end piece defines a circular outer perimeter, and a circular central aperture, although in each instance alternatives are possible.

In an example arrangement described, a second end piece is positioned on a media pack end opposite the first end piece. The second end piece can be molded-in-place, and will typically be a closed end cap, although alternatives are possible. In an example described the second end piece has a density of at least 0.4 g/cc, typically at least 0.46 g/cc, but alternatives are possible.

Typically, the first end piece comprises a thermoplastic elastomer and a seal member comprises a thermoplastic elastomer each being formed from a thermoplastic elastomer generally related to a elastomer of the other. In an example described, each is formed from polyurethane.

Herein, a filter assembly is generally described, which comprises a housing having a filter cartridge in accord with the filter cartridge characterizations described herein, removably installed in an interior of the housing and radially sealed to a housing component. The filter assembly can, for example, comprise an air cleaner assembly.

Herein, methods of forming a filter cartridge are described. The methods generally involve molding-in-place, on a media pack at a location extending between the media pack and a housing seal member, an end piece having a central aperture. When this is practiced, the end piece generally includes an end cap section secured to the media pack at the media pack first end and a radial seal support section for the housing seal member. The step of molding includes non-removably securing the housing seal member to the end piece.

In a typical approach, the step of molding comprises positioning a preformed housing seal member in a mold, along with resin for an end piece of the mold and positioning an end of the media in the mold.

Advantageous filter cartridges made in accord with this process are described. Among the various advantageous subjects disclosed are the following:

1. A filter cartridge characterized by: (a) a media pack including media having a first end; (b) an end piece having a first end of the media embedded therein and defining a radial seal support; and (c) a preformed housing seal member non-removably secured to the end piece; (i) the end piece being molded-in-place on the media while securing the preformed housing seal member in place.
2. A filter cartridge characterized by: (a) a media pack including media and having a first end; (b) a first end piece having a central aperture therethrough and an end of the media pack therein; the end piece comprising: (i) an end cap section adjacent the media pack first end; and, (ii) a seal support section defining a seal recess; (A) the seal support section projecting away from the media pack, the direction of extension typically being generally axially; and, (B) the seal support section defining a seal support wall that has a portion that slants radially in a direction of extension away from the end cap section, to define the seal recess; and, (iii) the end cap section and the seal support section being integral with one another; and, (c) a housing seal member non-removably secured within the seal recess and configured to form a radially directed seal with a housing component, when the filter cartridge is installed for use.
3. A filter cartridge characterized by: (a) a media pack comprising media and having a first end; (b) a first end piece including: (i) an open end cap section; and, (ii) a seal support defining a wall that has a portion that slants radially in extension away the end cap section at an acute wall angle of at least 30° (often within the range of 30°-80°, inclusive) to form a seal recess and, (c) a housing seal member non-removably secured within the seal recess and configured to a radially directed seal with a housing component, when the filter cartridge is installed for use.
4. A filter cartridge according to any one of characterizations 2 and 3 wherein: (a) the first end piece includes the first end of the media embedded therein.
5. A filter cartridge according to any one of characterizations 2-4 wherein: (a) the first end piece is molded in-place onto the media pack and the housing seal member.
6. A filter cartridge according to any one of characterizations 1-5 wherein: (a) the housing seal member comprises a portion of a resilient member having a seal surface; (i) resilient member extending axially, further away from the media pack than does the seal support.
7. A filter cartridge according to characterization 6 wherein: (a) the seal support extends to a seal tip remote from the media pack; and, (b) the resilient member extends to a tip remote from the media pack; (i) the tip of the resilient seal member remote from the media comprising a plurality of spaced projections extending, axially, away from the media pack.
8. A filter cartridge according to characterization 7 wherein: (a) a portion of the tip of the resilient between the spaced projections, also extends, axially, further away from the media pack then does the seal support.
9. A filter cartridge according to any one of characterized by 6-8 wherein: (a) at least a portion of the resilient member extends axially at least 5 mm beyond the seal support.
10. A filter cartridge comprising: (a) a media pack including media having a first end; (b) a first end piece having a central aperture therethrough and a seal support section defining a seal support wall that extends in a direction away from the media pack; (c) a housing seal member configured from a radially directed seal with a housing component, when the filter cartridge is installed for use; (i) the housing seal member comprising a resilient member having a tip remote from the media pack; the tip of the resilient member comprising a plurality of spaced projections; and, (ii) the spaced projections, and an end of the resilient member positioned between the spaced projections, extending axially to a location beyond the seal support, in a direction away from the media.
11. A filter cartridge according to characterization 10 wherein: (a) the seal support section defines a wall that slants radially in extension away from the media.
12. A filter cartridge according to any one of characterizations 1-11 wherein: (a) the seal support has a seal support wall that surrounds a seal recess; (b) the seal support outer wall slants radially inwardly in extension away from the end cap section; and, (c) the housing seal member is configured to form a radially inwardly directed seal with a housing component, when the filter cartridge is installed for use.
13. A filter cartridge according to any one of characterizations 1-12 wherein: (a) the media pack surrounds and defines an open filter interior.
14. A filter cartridge according to any one of characterizations 1-13 wherein: (a) the end piece includes an end cap section that extends completely across, and closes, the first end of the media pack.
15. A filter cartridge according to any one of characterizations 1-14 wherein: (a) the end piece includes an end cap section and a seal support section that are molded integral with one another.

16. A filter cartridge according to any one of characterizations 1-15 wherein: (a) the first end piece is molded-in-place.
17. A filter cartridge according to any one of characterizations 1-16 wherein: (a) the media pack surrounds and defines a central cartridge axis; and, (b) the seal support includes a support wall or wall section that extends, relative to a plane perpendicular to the central axis, at an acute angle within the range of 30°-80°, inclusive, in extension axially away from the media pack.
18. A filter cartridge according to any one of characterizations 1-17 wherein: (a) the media pack surrounds and defines a central cartridge axis; and, (b) the seal support includes a support wall that extends, relative to a plane perpendicular to the central axis, at an acute angle of at least 45° (for example within the range of 45°-80°, inclusive) in extension axially away from the media pack.
19. A filter cartridge according to any one of characterizations 1-18 wherein: (a) the media pack surrounds and defines a central cartridge axis; and, (b) the seal support includes a support wall that extends, relative to a plane perpendicular to the central axis, at an acute angle of at least 50° (for example within the range of 50°-80°, inclusive) in extension axially away from the media pack.
20. A filter cartridge according to any one of characterizations 1-19 wherein: (a) the media pack surrounds and defines a central cartridge axis; and, (b) the seal support includes a seal support wall that extends, relative to a plane perpendicular to the central axis, at an acute angle within the range of 55°-75°, inclusive, in extension axially away from the media pack.
21. A filter cartridge according to any one of characterizations 1-20 wherein: (a) the media pack surrounds and defines a central cartridge axis; and, (b) the seal support includes a seal support wall that extends, relative to a plane perpendicular to the central axis, at an acute angle within the range of 60°-75°, inclusive, in extension axially away from the media pack.
22. A filter cartridge according to any one of characterizations 1-21 wherein: (a) the media pack has an outer perimeter; and, (b) the end cap section of the first end piece does not extend radially beyond an adjacent portion of the outer perimeter of the media pack any more than 2 mm.
23. A filter cartridge according to any one of characterizations 1-22 wherein: (a) the media pack has an outer perimeter; and, (b) the end cap section of the first end piece does not extend radially beyond an adjacent portion of the outer perimeter of the media pack any more than 1.5 mm.
24. A filter cartridge according to any one of characterizations 1-23 wherein: (a) the media pack has an inner perimeter; and, (b) the end cap section of the first end piece does not extend radially beyond an adjacent portion of the inner perimeter of the media pack any more than 2 mm.
25. A filter cartridge according to any one of characterizations 1-24 wherein: (a) the media pack has an inner perimeter; and, (b) the end cap section of the first end piece does not extend radially beyond an adjacent portion of the inner perimeter of the media pack any more than 1.5 mm.
26. A filter cartridge according to any one of characterizations 1-25 wherein: (a) the first end piece comprises a molding having a density of at least 0.4 g/cc.
27. A filter cartridge according to any one of characterizations 1-26 wherein: (a) the first end piece comprises a molding having a density of at least 0.46 g/cc.
28. A filter cartridge according to any one of characterizations 1-27 wherein: (a) the first end piece comprises a molding having a density within the range of 0.51-0.63 g/cc, inclusive.
29. A filter cartridge according to any one of claims 1-28 wherein: (a) the first end piece comprises a molding having a hardness Shore A of at least 30.
30. A filter cartridge according to any one of characterizations 1-29 wherein: (a) the first end piece comprises a molding having a hardness Shore A of at least 35.
31. A filter cartridge according to any one of characterizations 1-30 wherein: (a) the first end piece comprises a molding having a hardness, Shore A, of no greater than 75.
32. A filter cartridge according to any one of characterizations 1-31 wherein: (a) the seal member comprises a molding having a density of no greater than 0.32 g/cc.
33. A filter cartridge according to any one of characterizations 1-32 wherein: (a) the seal member comprises a molding having a hardness, Shore A, of no greater than 20.
34. A filter cartridge according to any one of characterizations 1-33 wherein: (a) the seal member comprises a molding having a hardness, Shore A, of no greater than 18.
35. A filter cartridge according to any one of characterizations 1-34 wherein: (a) the seal member comprises a molding having hardness, Shore A, within the range of 10-18, inclusive.
36. A filter cartridge according to any one of characterizations 1-35 wherein: (a) the first end piece comprises a first molding having a first density; and, (b) the seal member comprises a second molding having a second density; (i) the first density being greater than the second density.
37. A filter cartridge according to characterization 36 wherein: (a) the first density is at least 0.08 g/cc greater than the second density.
38. A filter cartridge according to characterization 37 wherein: (a) the first density is at least 0.2 g/cc greater than the second density.
39. A filter cartridge according to any one of characterizations 1-38 wherein: (a) the seal member defines a seal surface having a seal surface section with a length of axial extension of at least 10 mm without a radial step therein.
40. A filter cartridge according to any one of characterizations 1-38 wherein: (a) the seal member defines a seal surface having a seal surface section with a length of axial extension of at least 12 mm without a radial step therein.
41. A filter cartridge according to any one of characterizations 1-40 wherein: (a) the media surrounds and defines a central cartridge axis; and, (b) the seal member defines a seal surface that extends at an angle, relative to a plane perpendicular to the central cartridge axis, of at least 80°.
42. A filter cartridge according to any one of characterizations 1-41 wherein: (a) the media surrounds and defines a central cartridge axis; and, (b) the central seal surface extends at an angle, relative to a plane perpendicular to the central cartridge axis, within the range of 85°-89.9°, inclusive.
43. A filter cartridge according to any one of characterizations 1-42 wherein: (a) the housing seal member has a first portion with a first radial thickness to the seal support section; and, (b) the housing seal member has a second portion with a second radial thickness to the seal support section; (i) the second radial thickness being at least 4 mm greater than the first radial thickness.

44. A filter cartridge according to any one of characterizations 1-43 wherein: (a) the housing seal member has a first portion with a first radial thickness to the seal support section; and,
(b) the housing seal member has a second portion with a second radial thickness to the seal support section; (i) the second radial thickness being at least 5 mm greater than the first radial thickness.

45. A filter cartridge according to any one of characterizations 43 and 44 wherein: (a) the first radial thickness is at least 7 mm.

46. A filter cartridge according to any one of characterizations 43-45 wherein: (a) the first radial thickness is at least 9 mm.

47. A filter cartridge according to any one of characterizations 1-46 wherein: (a) the media is pleated.

48. A filter cartridge according to any one of characterizations 1-47 wherein: (a) the media surrounds a central liner.

49. A filter cartridge according to characterization 48 wherein: (a) the central liner is a metal liner.

50. A filter cartridge according to any one of characterizations 1-49 wherein: (a) the first end piece defines a circular outer perimeter.

51. A filter cartridge according to any one of characterizations 1-50 wherein: (a) the first end piece defines a circular central aperture.

52. A filter cartridge according to any one of characterizations 1-51 wherein: (a) a second end piece is positioned on a media end opposite the first end piece.

53. A filter cartridge according to characterization 52 wherein: (a) the second end piece has an end of the media embedded therein and is molded-in-place.

54. A filter cartridge according to any one of characterizations 52 and 53 wherein: (a) the second end piece is a closed end cap.

55. A filter cartridge according to any one of characterizations 52-54 wherein: (a) the second end piece has a density of at least 0.4 g/cc.

56. A filter cartridge according to any one of characterizations 52-55 wherein: (a) the second end piece has a density of 0.46 g/cc.

57. A filter cartridge according to any one of characterizations 1-56 wherein: (a) the first end piece comprises polyurethane; and, (b) the housing seal member comprises polyurethane.

58. A filter assembly comprising: (a) a housing; and, (b) a filter cartridge according to any one of claims 1-57 operably positioned within the housing.

59. A filter assembly according to characterization 58 wherein: (a) the housing includes a seal flange; and, (b) the filter cartridge is configured with a radially inwardly directed seal positioned around the seal flange.

60. A filter assembly according to claim 56 wherein: (a) the filter housing includes a seal flange; and, (b) the filter cartridge is configured with a radially outwardly directed and positioned surrounded by the seal flange.

61. A method of forming a filter cartridge; the method characterized by: (a) molding molded-in-place end piece, on a media at a location extending between the media and a housing seal member, the end piece having a central aperture and comprising: (i) an end cap section secured to the media at a media first end; and, (ii) a radial seal support section for the housing seal member; (b) the step of molding including non-removably securing the housing seal member to the end piece.

62. A method according to characterization 60 wherein: (a) the step of molding comprises: (i) positioning a preformed housing seal member, an end of the media and resin for the end piece in a mold.

63. A filter cartridge prepared according to any one of characterizations 61 and 62.

64. A filter cartridge according to claim 2 wherein: (a) the seal support sections extends radially at an acute angle within the range of 30°-80°, inclusive, to form the seal recess.

65. A filter cartridge according to characterization 2 wherein: (a) the housing seal member is preformed; and, (i) the first end piece is an end piece molded-in-place on the media while securing the preformed housing seal member in place.

66. A filter cartridge according to characterization 2 wherein: (a) the housing seal member comprises a portion of a resilient member having a seal surface; (i) the resilient member extending, axially, further away from the media pack than does the seal support.

67. A filter cartridge according to characterization 64 wherein: (a) the seal support extends to a seal support tip remote from the media pack; and, (b) the resilient member extends to a tip remote from the media pack; (i) the tip of the resilient seal member remote from the media comprises a plurality of spaced projections extending, axially, away from the media pack.

68. A filter cartridge according to characterization 2 wherein: (a) a portion of the tip of the resilient member between the spaced projections, also extends, axially, further away from the media pack then does the seal support.

69. A filter cartridge according to characterization 68 wherein: (a) the seal support wall slants radially inwardly in extension away from the end cap section; and, (b) the housing seal member is configured to form a radially inwardly directed seal with a housing component, when the filter cartridge is installed for use.

70. A filter cartridge according to characterization 68 wherein: (a) the media pack surrounds and defines an open filter interior.

71. A filter cartridge according to characterization 68 wherein: (a) the end piece includes an end cap section that extends completely across, and closes, the first end of the media pack.

72. A filter cartridge according to characterization 2 wherein: (a) the first end piece includes an end cap section and a seal support section that are molded integral with one another.

73. A filter cartridge according to any one of characterizations 1-57 wherein: (a) the media pack surrounds and defines a central cartridge axis; and, (b) the seal support includes a support wall that extends, relative to a plane perpendicular to the central axis, at an acute angle within the range of 45°-80°, inclusive, in extension axially away from the media pack.

74. A filter cartridge according to characterization 2 wherein: (a) the media pack has an outer perimeter; and, (b) the end cap section of the first end piece does not extend radially beyond an adjacent portion of the outer perimeter of the media pack any more than 2 mm.

75. A filter cartridge according to characterization 2 wherein: (a) the media pack has an inner perimeter; and, (b) the end cap section of the first end piece does not extend radially beyond an adjacent portion of the inner perimeter of the media pack any more than 2 mm.

76. A filter cartridge according to characterization 2 wherein:
(a) the first end piece comprises a molding having a density of at least 0.4 g/cc.

77. A filter cartridge according to characterization 76 wherein: (a) the seal member comprises a molding having a density of no greater than 0.32 g/cc.

78. A filter cartridge according to characterization 2 wherein:
(a) the first end piece comprises a first molding having a first density; and, (b) the seal member comprises a second molding having a second density; (i) the first density being greater than the second density.

What is claimed is:

1. A filter cartridge comprising:
(a) a media pack including media having a first end;
(b) a first end piece having a central aperture therethrough and a seal support section defining a seal support wall that extends in a direction away from the media pack;
  (i) the seal support section defines a wall that slants radially in extension away from the media; and,
(c) a housing seal member configured from a radially directed seal with a housing component, when the filter cartridge is installed for use;
  (i) the housing seal member comprising a resilient member having a tip remote from the media pack; the tip of the resilient member comprising a plurality of spaced projections; and,
  (ii) the spaced projections, and an end of the resilient member positioned between the spaced projections, extending axially to a location beyond the seal support, in a direction away from the media.

2. A filter cartridge according to claim 1 including:
(a) a preformed housing seal member non-removably secured to the first end piece;
  (i) the first end piece being molded-in-place on the media while securing the preformed housing seal member in place.

3. A filter cartridge according to claim 2 wherein:
(a) the housing seal member comprises a portion of a resilient member having a seal surface;
  (i) the resilient member extending, axially, further away from the media pack than does the seal support.

4. A filter cartridge according to claim 3 wherein:
(a) the seal support extends to a seal support tip remote from the media pack; and,
(b) the resilient member extends to a tip remote from the media pack;
  (i) the tip of the resilient seal member remote from the media comprising a plurality of spaced projections extending, axially, away from the media pack.

5. A filter cartridge according to claim 4 wherein:
(a) a portion of the tip of the resilient member between the spaced projections, also extends, axially, further away from the media pack then does the seal support.

6. A filter cartridge according to claim 2 wherein:
(a) the first end piece comprises a first molding having a first density; and,
(b) the seal member comprises a second molding having a second density;
  (i) the first density being greater than the second density.

7. A filter cartridge according to claim 2 wherein:
(a) the seal member defines a seal surface having a seal surface section with a length of axial extension of at least 10 mm without a radial step therein.

8. A filter cartridge according to claim 2 wherein:
(a) the housing seal member has a first portion with a first radial thickness to the seal support section; and,
(b) the housing seal member has a second portion with a second radial thickness to the seal support section;
  (i) the second radial thickness being at least 4 mm greater than the first radial thickness.

9. A filter cartridge according to claim 2 wherein:
(a) the seal support extends at an acute wall angle of at least 85°.

10. A filter cartridge according to claim 1 wherein:
(a) a seal support section defines a wall that has a portion that slants radially in extension away from the end cap section at an acute wall angle of at least 30°.

11. A filter cartridge according to claim 10 wherein:
(a) the first end piece is molded-in-place onto the media pack and the housing seal member.

12. A filter cartridge according to claim 10 wherein:
(a) the seal support extends at an acute wall angle of at least 85°.

13. A filter cartridge according to claim 1 wherein:
(a) the seal support has a seal support wall that surrounds a seal recess;
(b) the seal support outer wall slants radially inwardly in extension away from the end cap section; and,
(c) the housing seal member is configured to form a radially inwardly directed seal with a housing component, when the filter cartridge is installed for use.

14. A filter cartridge according to claim 13 wherein:
(a) the media pack surrounds and defines an open filter interior.

15. A filter cartridge according to claim 1 wherein:
(a) the first end piece is molded-in-place.

16. A filter cartridge according to claim 1 wherein:
(a) the media pack has an outer perimeter; and,
(b) the end cap section of the first end piece does not extend radially beyond an adjacent portion of the outer perimeter of the media pack any more than 2 mm.

17. A filter cartridge according to claim 1 wherein:
(a) the seal support extends at an acute wall angle of at least 85°.

18. A filter assembly comprising:
(a) a housing; and,
(b) a filter cartridge according to claim 1 operably positioned within the housing.

19. A filter assembly according to claim 18 wherein:
(a) the housing includes a seal flange; and,
(b) the filter cartridge is configured with a radially inwardly directed seal positioned around the seal flange.

* * * * *